US012776893B2

(12) United States Patent
Fiske

(10) Patent No.: US 12,776,893 B2
(45) Date of Patent: Oct. 27, 2026

(54) HIDING SIGNALS IN NOISE

(71) Applicant: Michael Stephen Fiske, San Francisco, CA (US)

(72) Inventor: Michael Stephen Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 137 days.

(21) Appl. No.: 18/892,345

(22) Filed: Sep. 21, 2024

(65) Prior Publication Data

US 2025/0038947 A1 Jan. 30, 2025

Related U.S. Application Data

(63) Continuation-in-part of application No. 17/516,722, filed on Nov. 2, 2021, now Pat. No. 12,124,850, and a continuation-in-part of application No. 16/442,455, filed on Jun. 15, 2019, now Pat. No. 11,171,934, and a continuation-in-part of application No. 14/953,300, filed on Nov. 28, 2015, now Pat. No. 10,360,395.

(51) Int. Cl.
*H04L 9/30* (2006.01)
*H04L 9/00* (2022.01)

(52) U.S. Cl.
CPC ............ *H04L 9/003* (2013.01); *H04L 9/3066* (2013.01)

(58) Field of Classification Search
CPC .............................. H04L 9/003; H04L 9/3066
See application file for complete search history.

(56) References Cited

U.S. PATENT DOCUMENTS 12,316,754 B1 * 5/2025 Stapleton .................. H04L 9/32
12,425,189 B1 * 9/2025 Lablans .................. G06F 7/724
12,463,817 B1 * 11/2025 Dittmer ................. H04L 9/3221
12,476,789 B1 * 11/2025 Lablans ................ H04L 9/0631
2005/0175180 A1 * 8/2005 Venkatesan ........... H04L 1/0057 380/268
2007/0130455 A1 * 6/2007 Elliott ................... H04L 9/0858 713/150
2008/0089518 A1 * 4/2008 Reznik ................ H04W 12/041 380/268
2008/0266358 A1 * 10/2008 Cruz-Uribe .......... B41J 2/14072 347/51
2012/0045053 A1 * 2/2012 Qi ......................... H04L 9/0662 380/252
2019/0037183 A1 * 1/2019 Xu ..................... G03B 21/2033
2020/0328886 A1 * 10/2020 Newton ................ H04L 9/0819
2022/0058022 A1 * 2/2022 Fiske .................. G06F 9/30058
2024/0322100 A1 * 9/2024 Templier .............. H10H 20/857
2025/0102636 A1 * 3/2025 Ito ......................... G01S 17/931
2025/0184132 A1 * 6/2025 Rao ........................ G06N 10/80
(Continued)

*Primary Examiner* — Stephen T Gundry

(57) ABSTRACT

A new machine procedure and electronic circuitry are provided that hide one or more signals inside noise. In an embodiment, a random nonce helps unpredictably move the hiding locations of the signals. In an embodiment, the quantum complexity is related to the complexity of Grover's algorithm so that the hiding procedure is resistant to quantum computers. In some embodiments, public keys are hidden in the noise. In some embodiments, quantum randomness generates random noise and a random nonce, using photonic emission with a light emitting diode, and flip-flops. In some embodiments, the nonce is hidden in the noise.

20 Claims, 31 Drawing Sheets

(56) References Cited

U.S. PATENT DOCUMENTS

2025/0192997 A1* 6/2025 Cambou ............... H04L 9/0858
2025/0192998 A1* 6/2025 Medard ..................... H04L 9/00
2025/0267152 A1* 8/2025 Gvili ..................... H04L 9/0625
2025/0286705 A1* 9/2025 Wright .................. H04L 9/0838
2025/0307437 A1* 10/2025 Peatfield ................. G06F 21/73
2025/0379736 A1* 12/2025 Martire ................. G06F 21/602
2026/0005859 A1* 1/2026 Abram .................... H04L 9/008
2026/0039456 A1* 2/2026 Varcoe .................. H04L 9/0838

* cited by examiner

120

160

Hidden Key

Hidden Data

Hidden Instruction

Somewhat Biased

More Biased

Hiding 128 Bits

FIG. 13

Eve sees $(m, n)$ scatter $\mathcal{S} = (s_1 \ldots s_n)$

| Event Name | Event Probability | Event Description |
| --- | --- | --- |
| $B_{i,j}$ | $2^{-m}$ | $k_1 k_2 \ldots k_m$ is the $i$th data in $E_{j,m}$ |
| $R_i$ | $\binom{\rho}{i} 2^{-\rho}$ | $\eta_1(r_1 r_2 \ldots r_\rho) = i$ |
| $A_i$ | $\binom{n}{i} 2^{-n}$ | $\eta_1(s_1 \ldots s_n) = i$ |

FIG. 14

Sum Changed to a Product

```
Fiskesoftware@Michaels-MacBook-Air C_program %  ./ADD

2 3 5

result = 10. address of addition  =  1 0 1 0 1 1 0 0 0 1  0  1 0 0 0 0

result = 30. address of multiply  =  1 0 1 0 1 1 0 0 0 1  1  1 0 0 0 0
```

FIG. 16

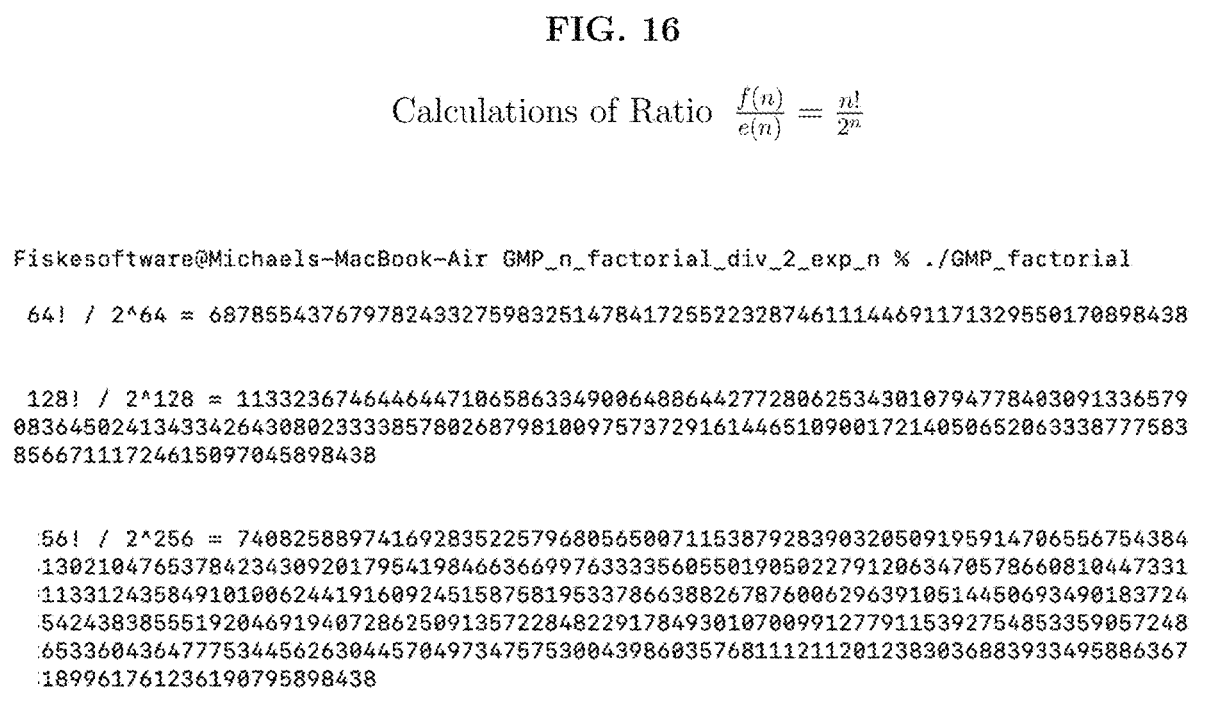

Calculations of Ratio $\frac{f(n)}{e(n)} = \frac{n!}{2^n}$

```
Fiskesoftware@Michaels-MacBook-Air GMP_n_factorial_div_2_exp_n % ./GMP_factorial

 64! / 2^64 = 6878554376797824332759832514784172552232874611144691171329550170898438


 128! / 2^128 = 1133236746446447106586334900648864427728062534301079477840309133657
9
0836450241343342643080233338578026879810097573729161446510900172140506520633387775
83
85667111724615097045898438


 56! / 2^256 = 74082588974169283522579680565007115387928390320509195914706556754384
 1302104765378423430920179541984663669976333356055019050227912063470578660810447331
 1133124358491010062441916092451587581953378663882678760062963910514450693490183724
 5424383855519204691940728625091357228482291784930107009912779115392754853359057248
 6533604364777534456263044570497347575300439860357681112112012383036883933495886367
 18996176123619079589843 8
```

FIG. 17

Instruction Order

| Block Index | Instruction Name | Instruction Type | Test $r \leq c$ | Gamma Index |
|---|---|---|---|---|
| 1 | $S_{j_1}$ | Valid | True | $\gamma(j_1)$ |
| 2 | $D_{r_1}$ | Dummy | False | $\gamma(r_1)$ |
| ... | | | | |
| $\gamma^{-1}(1)$ | $S_1$ | Valid | True | $\gamma(1)$ |
| ... | | | | |
| $b$ | $D_{r_{k-1}}$ | Dummy | False | $\gamma(r_{k-1})$ |

$j_i = \gamma^{-1}(i)$ and $r_i = \gamma^{-1}(i)$.

16 Bit Butterfly Network

D Flip-flop

LED flip-flop circuit 2100

HIDING SIGNALS IN NOISE

RELATED APPLICATIONS

This application claims priority benefit of U.S. Provisional Patent Application Ser. No. 62/085,338, entitled "Hiding Data Transmissions in Random Noise", filed Nov. 28, 2014, which is incorporated herein by reference; this application claims priority benefit of U.S. Provisional Patent Application Ser. No. 62/092,795, entitled "Hiding Data Transmissions in Random Noise", filed Dec. 16, 2014, which is incorporated herein by reference; this application claims priority benefit of U.S. Non-provisional patent application Ser. No. 14/953,300, entitled "Hiding Information in Noise", filed Nov. 28, 2015, which is incorporated herein by reference. This application claims priority benefit of U.S. Non-provisional Patent 10,360,395, entitled "Hiding Information in Noise", issued Jul. 23, 2019, which is incorporated herein by reference. This application claims priority benefit of U.S. Non-provisional Patent 10,356,061, entitled "Hiding a Public Key Exchange in Noise", issued Jul. 16, 2019, which is incorporated herein by reference.

This application claims priority benefit of U.S. Non-provisional Patent 11,171,934, entitled "Dynamically Hiding Information in Noise", issued Nov. 9, 2021, which is incorporated hereing by reference. This application claims priority benefit of U.S. Provisional Patent Application Ser. No. 63/210,500, entitled "Hiding Stable Machine Instructions in Noise", filed Jun. 15, 2021, which is incorporated herein by reference. This application is a continuation-in-part of U.S. Non-provisional Patent Application with Ser. No. 17/516,722, entitled "Hiding Stable Machine Instructions in Noise", filed Nov. 2, 2021.

BACKGROUND—FIELD OF INVENTION

The present invention relates broadly to protecting the privacy of computer and machine instructions, information and devices. The processes and device are generally used to maintain the privacy of information transmitted through communication and transmission systems, and maintain the privacy of the computer instructions. For example, the hiding processes may be used to protect the metadata of a phone call; in some embodiments, the phone call may be transmitted via voice over IP (internet protocol) with a mobile phone. These processes and devices also may be used to hide passive data stored on a computer or another physical device such as a tape drive. In some embodiments, symmetric cryptographic methods and machines are also used to supplement the hiding process.

In an embodiment, the information (data) is hidden by a sending agent, called Alice. Alice transmits the hidden data to a receiving agent, called Bob. The receiving agent, Bob, applies an extraction process or device. The output of this extraction process or device is the same information (data) that Alice gathered before hiding and sending it. Eve is the name of the agent who is attempting to obtain the information or data. One of Alice and Bob's primary objectives is to assure that Eve cannot capture the private information that was hidden and transmitted between them.

In another embodiment, Alice desires to hide data and securely store the hidden data somewhere and retrieve it and access the hidden data at a later time. The output of this extraction process or device is the same information (data) that Alice gathered before hiding and storing it.

In some embodiments of our invention we describe a computing machine that is structurally stable to small changes made to its program instructions. Our procedures use quantum randomness to build unpredictable stable instructions and use quantum randomness to generate noise such that the program instructions are hidden in the noise. In some embodiments, our procedures can execute just before running a program so that the computing task can be performed with a different representation of its program instructions during each run. In some embodiments, our invention expands the engineering method of stability to a cryptographically stable machine with an adversary; our invention describes cryptographically stable computing machines that are resistant to malware sabotage.

BACKGROUND—PRIOR ART

The subject matter discussed in this background section should not be assumed to be prior art merely as a result of its mention in the background section. Similarly, a problem mentioned in the background section or associated with the subject matter of the background section should not be assumed to have been previously recognized in the prior art. The subject matter in the "Summary and some Advantages of Invention" section represents different approaches, which in and of themselves may also be inventions, and various problems, which may have been first recognized by the inventor.

In information security, a fundamental problem is for a sender, Alice, to securely transmit a message M to a receiver, Bob, so that the adversary, Eve, receives no information about the message. In Shannon's seminal paper [2], his model assumes that Eve has complete access to a public, noiseless channel: Eve sees an identical copy of ciphertext C that Bob receives, where C(M, K) is a function of message M lying in message space $\mathcal{M}$ and secret key K lying in key space $\mathcal{K}$.

In this specification, the symbol P will express a probability. The expression P(E) is the probability that event E occurs and it satisfies $0 \le P(E) \le 1$. For example, suppose the sample space is the 6 faces of die and E is the event of rolling a 1 or 5 with that die and each of the 6 faces is equally likely. Then $$P(E) = \frac{2}{6} = \frac{1}{3}.$$

The conditional probability $$P(A \mid B) = \frac{P(A \cap B)}{P(B)}.$$

$P(A \cap B)$ is the probability that event A occurs and also event B occurs. The conditional probability $P(A|B)$ expresses the probability that event A will occur, under the condition that someone knows event B already occurred. The expression that follows the symbol "|" represents the conditional event. Events A and B are independent if $P(A \cap B) = P(A)P(B)$.

Expressed in terms of conditional probabilities, Shannon [2] defined a cryptographic method to be perfectly secret if $P(M) = P(M \mid \text{Eve sees ciphertext } C)$ for every cipher text C and for every message M in the message space $\mathcal{M}$. In other words, Eve has no more information about what the message M is after Eve sees ciphertext C pass through the public channel. Shannon showed for a noiseless, public channel that the entropy of the keyspace $\mathcal{K}$ must be at least as large as the message space $\mathcal{M}$ in order to achieve perfect secrecy.

Shannon's communication secrecy model [2] assumes that message sizes in the message space are finite and the same size. Shannon's model assumes that the transformations (encryption methods) on the message space are invertible and map a message of one size to the same size. Shannon's model assumes that the transformation applied to the message is based on the key. In the prior art, there is no use of random noise that is independent of the message or the key. In the prior art, there is no notion of being able to send a hidden or encrypted message inside the random noise where Eve is not necessarily revealed the size of the message. In the prior art, there is no notion of using random noise to hide the secret channel and transmitting a key inside this channel that is indistinguishable from the noise.

Quantum cryptography was introduced by Weisner and eventually published by Bennett, Brassard, et al. [3, 4]. Quantum cryptography based on the uncertainty principle of quantum physics: by measuring one component of the polarization of a photon, Eve irreversibly loses her ability to measure the orthogonal component of the polarization. Unfortunately, this type of cryptography requires an expensive physical infrastructure that is challenging to implement over long distances [22, 23]. Furthermore, Alice and Bob still need a shared, authentication secret to successfully perform this quantum cryptography in order to assure that Eve cannot corrupt messages about the polarization bases, communicated on Alice and Bob's public channel.

4 BACKGROUND: The Malware Problem in Prior Art

Malware plays a critical role in breaching computer systems. Cybersecurity research has primarily focused on malware detection [7, 8, 9, 10]. It is unlikely that malware detection methods can solely provide an adequate solution to the malware problem: There does not exist a register machine algorithm that can detect all malware [11]. Furthermore, some recent malware implementations use NP problems to encrypt and hide the malware [13]. Overall, detection methods are currently up against fundamental limits in theoretical computer science [14].

During a 20 year study, the DARPA program, CRASH [24], compared the number of lines of source code in security software versus malware. Security code grew from about 10,000 to 10 million lines; while malware code was almost constant at 125 lines. This study found that an almost constant number of lines of malware code can hijack a computer program, independent of the security software's size.

The instability of register machine [25, 26] computers enables malware to sabotage the purpose of a computer program, by making small changes to one or more instructions in an original, uninfected program. Programming languages such as C, Java, Lisp and Python rely upon branching instructions. After a branching instruction of a register machine program has been sabotaged, the malware can start executing. Even if there is a routine (in hardware and/or software) to verify that the program is executing properly, this verification routine may never execute. The sequential execution of unstable register machine instructions cripples the program from protecting itself.

5 Advantages and Novelty over Prior Art

The prior art in mathematical research, computer science, and electrical engineering has not attempted to design malware resistant computation based on structural stability. For over 80 years, dynamical systems has extensively studied structural stability [27, 28, 29, 30] on phase spaces [31], containing an uncountable number of states. (A space X is uncountable [32] if X contains an infinite number of states and there does not exist a one-to-one correspondence between X and the natural numbers $\mathbb{N}=\{0, 1, 2, 3, 4, 5, 6, 7, \ldots, \}$.)

During the execution of a register machine [25, 26], the machine's state at any moment lies in a discrete space, containing a countable number of states. (A space X is countable if there exists a one-to-one correspondence between X and $\mathbb{N}$.) Based on dynamical systems and information theory, a novelty of our invention(s) introduces mathematical and computational tools to build a structurally stable sequential machine. Structurally stable means the sequential machine is resistant to small changes to the program instructions. Our invention(s) are inspired by the Red Queen hypothesis in evolutionary biology: organisms evolve using robustness, unpredictability and variability to hinder infection from parasites. In some embodiments, a novel part of our invention(s) expands the engineering method of stability to a cryptographically stable machine with an adversary; our invention describes cryptographically stable computing machines that are resistant to malware sabotage.

6 SUMMARY and some ADVANTAGES

In some parts of the prior art, conventional wisdom believes that hiding data in the open cannot provide adequate information security. The invention(s), described herein, demonstrate that our process of hiding data (hiding signal) inside noise or hiding machine instructions inside noise can be quite effective. A process for hiding machine instructions inside of random noise is demonstrated and described. A process for hiding data (signal) inside of random noise is also demonstrated and described. In some embodiments, the data hidden (signal hidden) is a key. In some embodiments, the data (signal) hidden is a public key. In some embodiments, the data hidden is encrypted data. In some embodiments, the data hidden is encrypted data that was first encrypted by a block cipher. In some embodiments, the instructions hidden are hidden instructions that were first encrypted by a block cipher. In some embodiments, the data hidden is encrypted data that was first encrypted by a stream cipher. In some embodiments, the hidden data may be hidden metadata that is associated with the TCP/IP infrastructure [1] used to transmit information.

The invention(s) described herein are not bound to Shannon's limitations [2] because they use noise, rather than seek to eliminate noise. When the data generation and random noise have the same probability distribution or both have a uniform probability distribution, and the signal size is fixed, the security of the signal transmission can be made arbitrarily close to perfect secrecy—where arbitrarily close is defined in section 10.11—by increasing the noise size. The processes, devices and machines described herein are practical; they can be implemented with current TCP/IP infrastructure acting as a transmission medium and a random noise generator providing the random noise and signal generation.

In an embodiment, a hiding procedure hides a signal inside of noise, created by a quantum random number generator (QRNG). The randomness of a QRNG relies upon the uncertainty principle [18]. Our methods assume the QRNG obeys randomness properties 1 and 2. Our circuits using a light emitting diode passed statistical tests that validate randomness properties 1 and 2.

Randomness Property 1. No bias. For each i, the outcome $x_i$ of bit sequence $(x_1x_2 \ldots)$, created by a source of randomness and measured by a sensor, has probabilities $$P(x_i = 1) = P(x_i = 0) = \frac{1}{2}.$$

Randomness Property 2. Independence. For each i, measurement outcome $x_i$ is independent of its history. No correlation exists between distinct outcomes. Conditional probability $$P(x_i = 0 \mid x_1 = b_1, \ldots, x_{i-1} = b_{i-1}) = \frac{1}{2}$$

for all $b_j$ in {0,1}.

$$P(x_i = 1 \mid x_1 = b_1, \ldots, x_{i-1} = b_{i-1}) = \frac{1}{2}$$

for all $b_j$ in {0,1}.

A fundamental advance in our embodiments and inventions is that if an m-bit signal and ρ bits of noise satisfy randomness properties 1 and 2, the signal can be hidden arbitrarily close to perfect secrecy, as $\rho \to \infty$. The closeness to perfect secrecy can be efficiently computed. Another advance is a post-quantum key exchange with much smaller key sizes. And another fundamental advance is that the quantum complexity is comparable to Grover's quantum algorithm that performs database search: consequently, our hiding procedure protects signals, data, and keys against quantum computers with vast computational capabilities.

If the signal is plaintext M, then encrypt M before hiding so that the encrypted plaintext has a uniform probability distribution on message space $\mathcal{M}$. If the signal is a cryptography key K, then transforming K is not always necessary because in many embodiments choosing K from keyspace $\mathcal{K}$ already satisfies randomness properties 1 and 2.

Overall, our invention(s) that hide signals, machine instructions (opcodes and operands), data and keys inside random noise exhibits the following favorable security properties.

- Our hiding process that uses a scatter map is O(n), where n is the total number of signal bits plus noise bits plus nonce bits.
- For a fixed signal size m bits and ρ=n−m bits of random noise, as $p \to \infty$, the security of the hidden data can be made arbitrarily close to perfect secrecy. In some applications, the signal size can also be kept secret and is not revealed to Eve. From the binomial distribution, the closeness to perfect secrecy can be efficiently computed.
- A scatter map can be reused when both the signal generation and noise generation have the same or uniform probability distribution and a new signal, new noise, and new nonce are created for each transmission. The reuse property enables a practical process of hiding data that is first encrypted by a block or stream cipher. The complexity of finding this hidden encrypted data can be substantially greater than the computational complexity of the underlying block or stream cipher. See section 10.14.
- Another advantage over the prior art is a post-quantum key exchange with much smaller key sizes.
- Our hiding process uses a noiseless, public channel, which means it can implemented with our current Transmission Control Protocol/Internet Protocol internet infrastructure (TCP/IP). No expensive, physical infrastructure [22, 23] is needed to create noisy channels. No expensive, new infrastructure is needed to create, transmit and maintain polarized photons, as is required by the prior art of quantum cryptography [3, 21]. Quantum hardware that performs BB84 [3, 21] requires an expensive, special fiber optics infrastructure and endpoint devices that create polarized photons. An endpoint device with short range, that is too large for an Iphone or an IoT (Internet of Things) device [16], costs over $600. Traditional fiber optics cable costs $15k to $60k per mile for underground installation and $10k to $25k per mile for aerial installation [15]. Our quantum random electronic circuit can be manufactured in high volume for substantially less than one U.S. dollar.
- Alice and Bob possess their sources of randomness. This system design decentralizes the security to each user. Decentralization helps eliminate potential single points of failure, and backdoors in the transmission medium that may be outside the inspection and control of Alice and Bob [19].
- In an embodiment where Alice wishes to store her hidden data, the inventions described herein have an additional advantage over the prior art of cryptography. In the inventions described herein, Eve does not know the size of the hidden data or the number of hidden instructions in the hidden program. The noise size can be substantially larger than the data or program size so that hidden data or hidden program instructions could be a telephone number in one case and the whole sequence of DNA of human chromosome 4 (four) in a second embodiment of hiding. Typically in the prior art, an encryption preserves the file size or voice packet size.
- In an embodiment Alice executes her machine instructions in Protected Machine Hardware and Eve is not able to sabotage Alice's machine instructions with malware.

6.1 Comparison to Prior Art Methods of Protecting Computation

Fully homomorphic encryption (FHE) [34] is a method for protecting Alice's computations on data in the cloud. FHE DOES NOT address the protection of the computer's operations that stores the private FHE key. In other words, FHE defers the malware problem to the user's local computer; FHE does not address how to hinder malware on the local computer. Furthermore, some FHE keys are 1 Gigabyte and the plaintext-to-ciphertext expansion is 10,000 to 1 for just 100 bits of security [35, 36]. These memory requirements are not economically feasible for protecting instructions in hardware.

In [37], they present a general approach to addressing code-injection attacks in scripting and interpreted languages (e.g., web-based SQL injection), by randomizing the instructions. In [37], they do not address malware attacks at the machine instruction (physical hardware) level; there is no notion nor use of stability to build instruction opcodes and operands that are resistant to small changes.

Secure multi-party computation (MPC) [38, 39] enables a group to jointly perform a computation without disclosing any participant's private inputs. MPC does not address when Alice does not trust her own machine, or the machine instructions executed on her machine. Overall, none of these prior art methods address the malware problem, described in section 4.

7 Motivating Stable Computation

In the prior art, register machines execute one instruction at a time [26, 25]. Even if there is a procedure to assure that the register machine program is executing correctly, this friendly procedure may never execute due to just one rogue branch instruction. Typical programming languages (e.g., C, Fortran, Java, Lisp and Python) are Turing complete and depend upon branching instructions. While conditional branching instructions are not required for universal computation, Rojas's methods still use unconditional branching and program self-modification. Moreover, about 75% to 80% of the control flow instructions, executed on register machines, are conditional branch instructions. (See figure A.14 in [26].)

These observations suggest that a computer program's purpose can be subverted because the register machine behavior is not always invariant when small changes are made to one or more instructions. In contrast, the nervous systems of some organisms do not seem to share this weakness [41, 42].

Overall, the purpose of our invention(s) of stable computation are based on the following design principle: if a small or moderate change is made to a register machine program, then the program's purpose is stable; if a large change is made, the program can no longer execute. Our principle is partly based on the observation that it is generally far more difficult to detect if a small change has altered the purpose of a program. With a small change, the tampered register machine program still can execute, but does not perform the task that the original program was designed to accomplish. (Our unstable C program provides an example of a small 1-bit change.) For this reason, our invention(s) create stable computation that is also incomprehensible to malware authors so that it is far more challenging for malware to subvert the program without completely destroying its functionality.

8 An Unstable C Program

We demonstrate unstable computation with C source code [43] that adds 3 integers. This C code shows how small changes to the address of only one instruction can substantially alter the program's behavior.

```
#include <stdio.h>
#define NUM_BITS   16
int pow2[NUM_BITS] = {0x8000, 0x4000, 0x2000, 0x1000, 0x800, 0x400, 0x200, 0x100,
                      0x80, 0x40, 0x20, 0x10, 0x8, 0x4, 0x2, 0x1};
int addition(int   a,   int b)   {
   return (a + b);
}
int multiply(int   a,   int b)   {
   return (a * b);
}
int exec_op(int* num, int n, int (*op) (int, int)) {
   int   i, v = num[0];
   for(i = 1; i < n; i++)
   {
      v = op(v, num[i]);
   }
   return v;
}
void print_numbers(int* v, int n) {
   int k;
   printf ("\n");
   for(k = 0; k < n; k++)
   {
      printf("%d   ", v[k] );
   }
}
void print_binary(unsigned int v)
{
   int k;
   for(k = 0; k < NUM_BITS; k++)
   {
      if (v / pow2[k])   printf("1 ");
      else               printf("0 ");
      v %= pow2[k];
   }
   printf("\n");
}
int bop(int* m, int n, char* f, int (*op) (int, int))
{
   int v = exec_op(m, n, op);
   printf ("\nresult = %d. address of %s = ", v, f);
   print_binary((unsigned int) op);
   return 0;
}
int main(int argc, char* argv[ ])
{
   int num [3] = {2, 3, 5};
   print_numbers (num, 3);
   printf("\n");
```

-continued

```
    bop(num, 3, "addition", addition);
    bop(num, 3, "multiply", multiply);
    return 0;
}
```

FIG. 14 shows an execution of the compiled C program: ADD. The sum of the members 2+3+5 is converted to the product 2*3*5, by flipping only one bit of the address of instruction addition. This C program exhibits unstable computation because a small change (flipping one bit) in the C program causes a substantial change to the outcome of its computation: namely, a sum equal to 10 is changed to a product equal to 30.

9 DESCRIPTION of FIGURES

In the following figures, although they may depict various examples of the invention, the invention is not limited to the examples depicted in the figures.

Figure 1A:
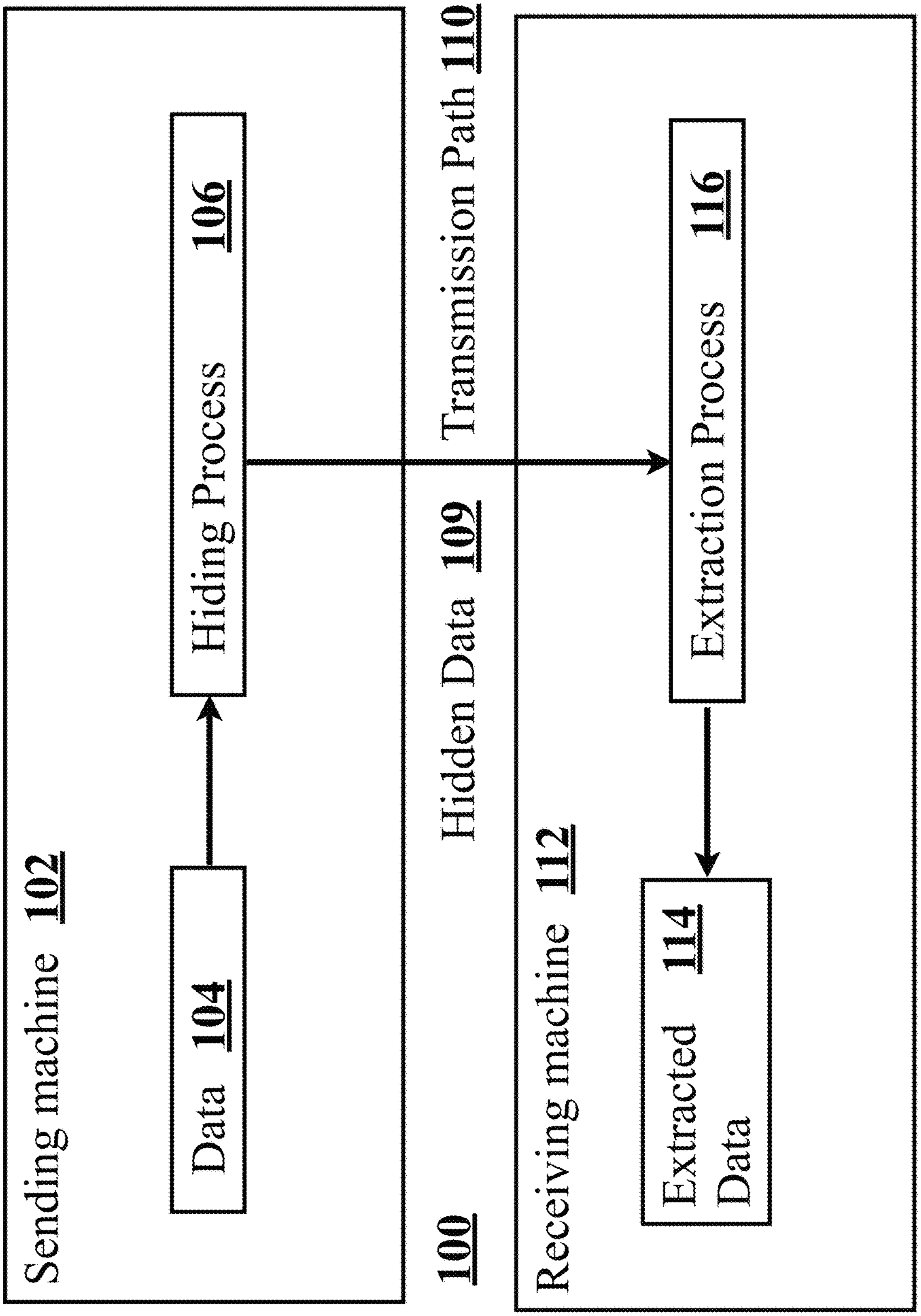
FIG. 1A shows an embodiment of an information system for sending and receiving hidden information or data. In some embodiments, the hidden information represents hidden machine instructions.
Figure 1B:
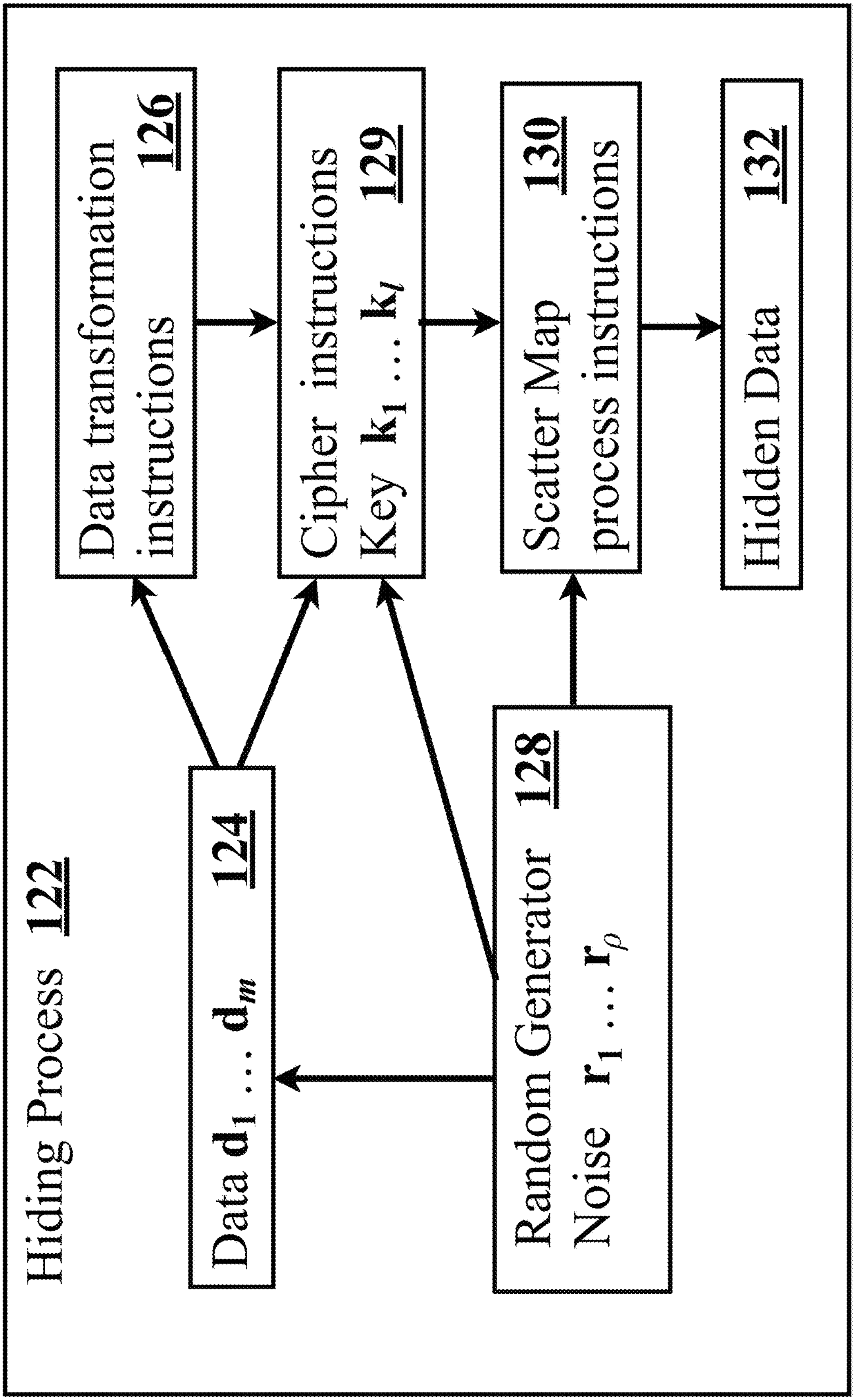
FIG. 1B shows an embodiment of a process for hiding information that can be used in the embodiment of FIG. 1A.
Figure 1C:
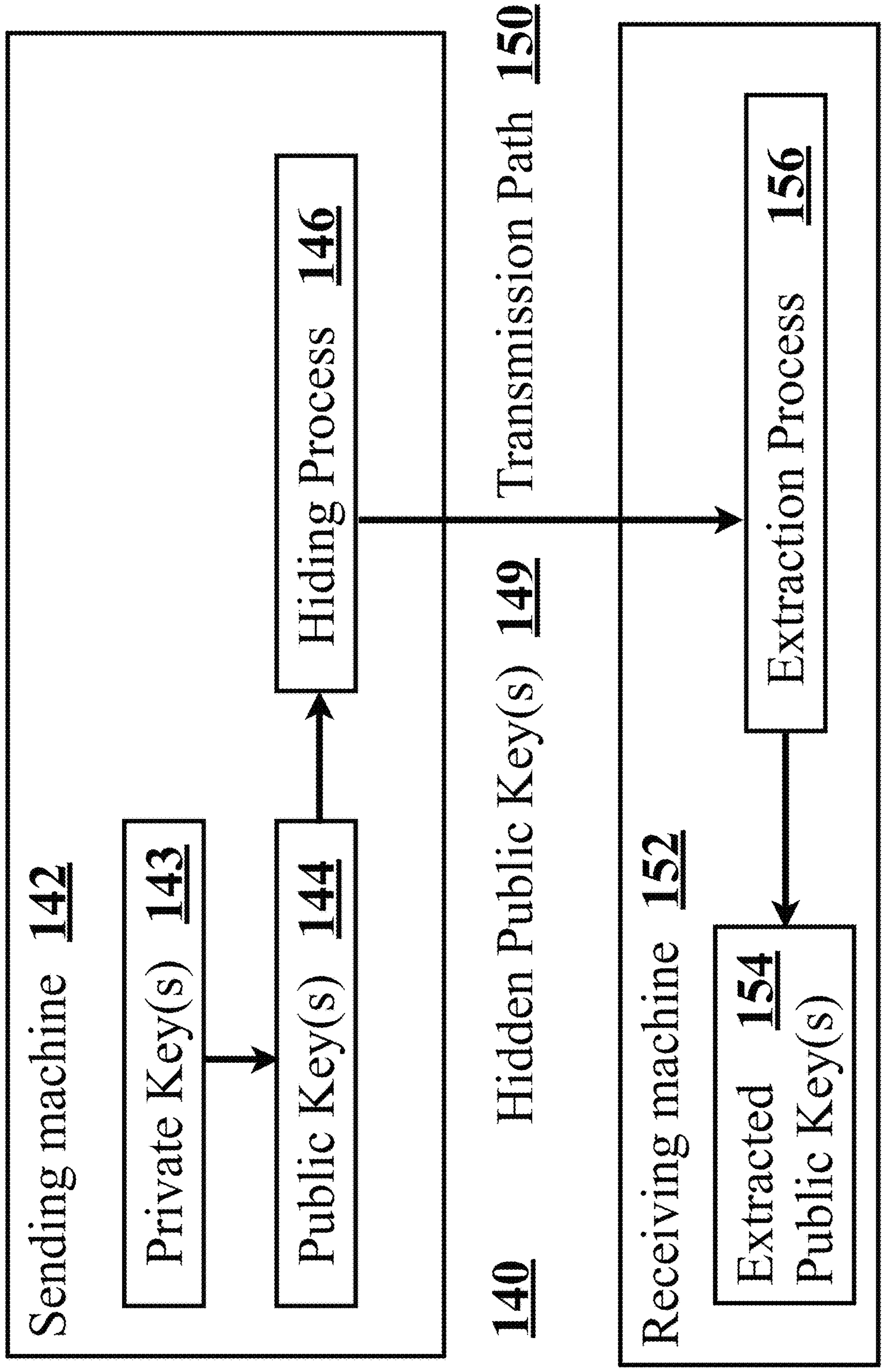
FIG. 1C shows an embodiment of an information system for sending and receiving hidden public keys.
Figure 1D:
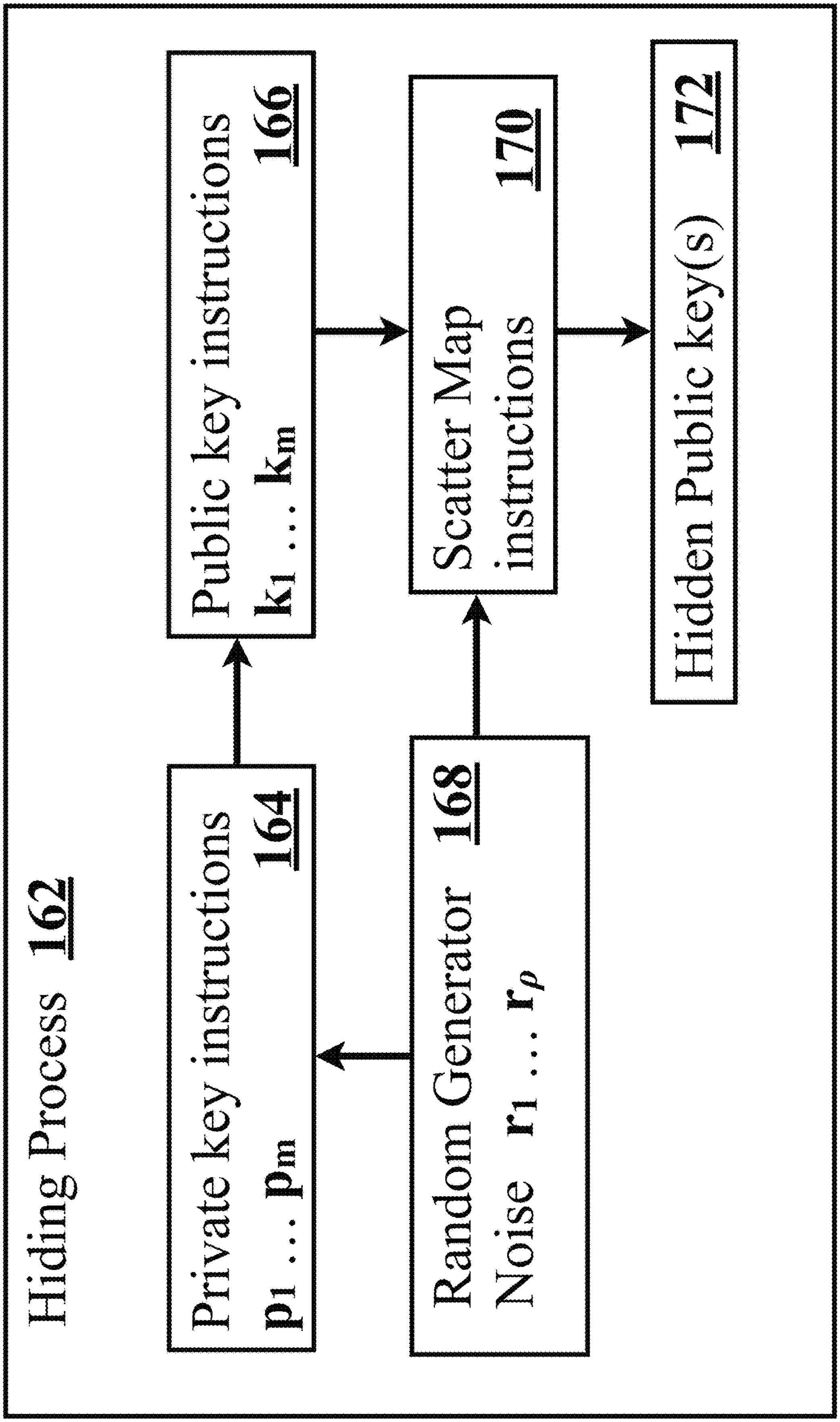
FIG. 1D shows an embodiment of a process for hiding public keys that can be used in the embodiment of FIG. 1C.
Figure 1E:
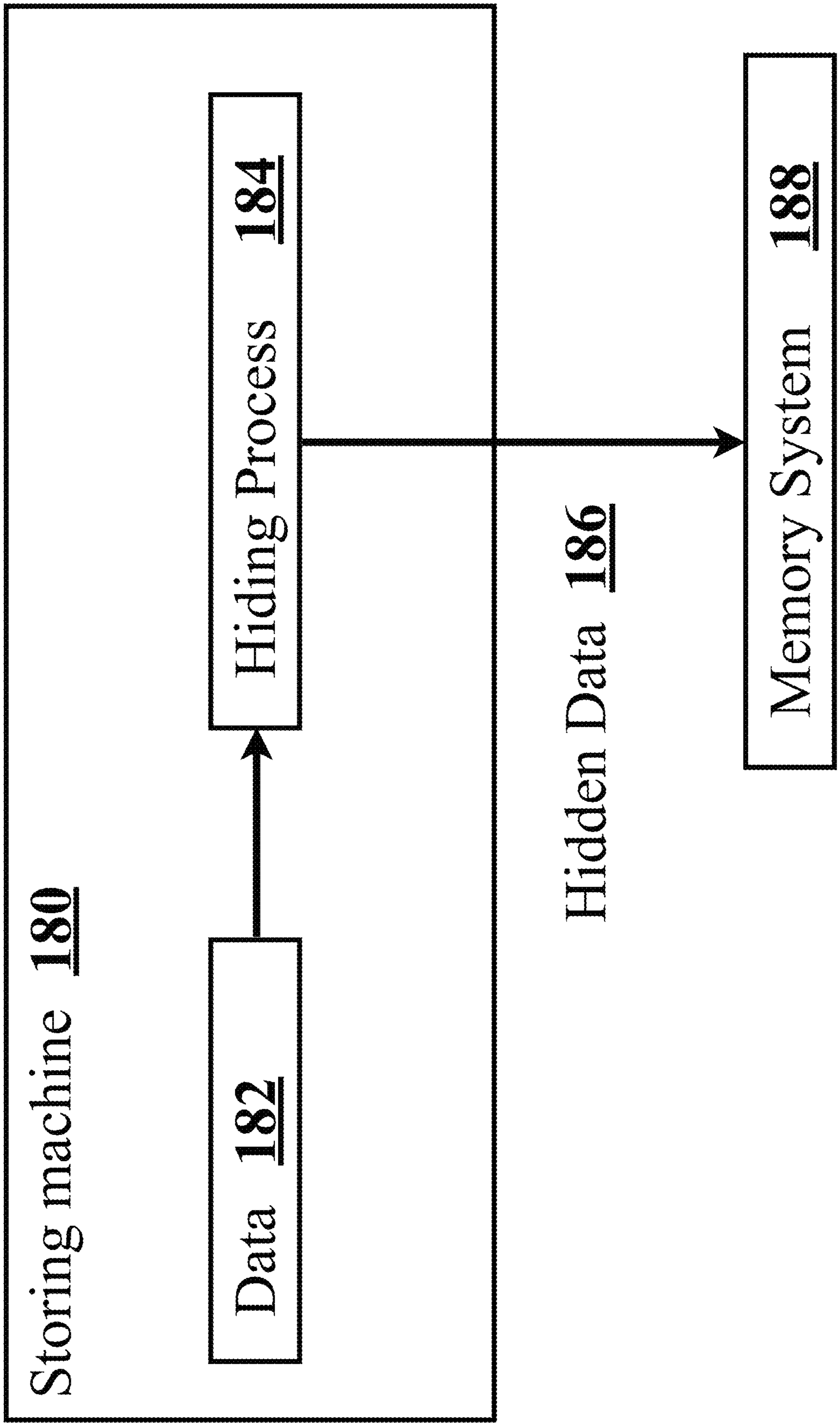

FIG. 1E shows an embodiment of storing machine 180 that executes hiding process 184 to hide data 182 and store hidden data 186 in memory system 188.

Figure 1F:
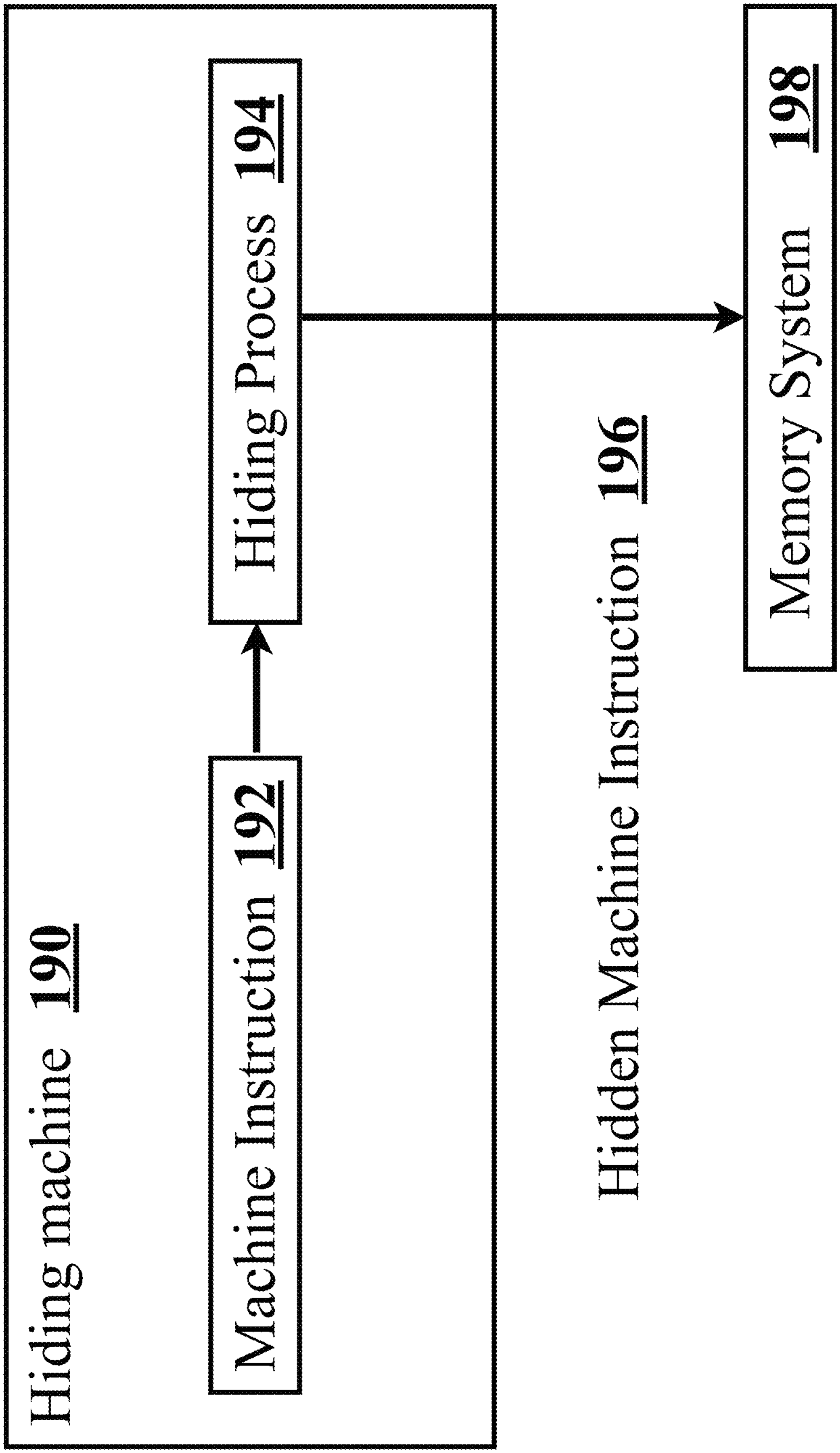

FIG. 1F shows an embodiment of hiding machine 190 that executes hiding process 194 to hide machine instruction 192 and store hidden machine instruction 196 in memory system 198.

Figure 2A:
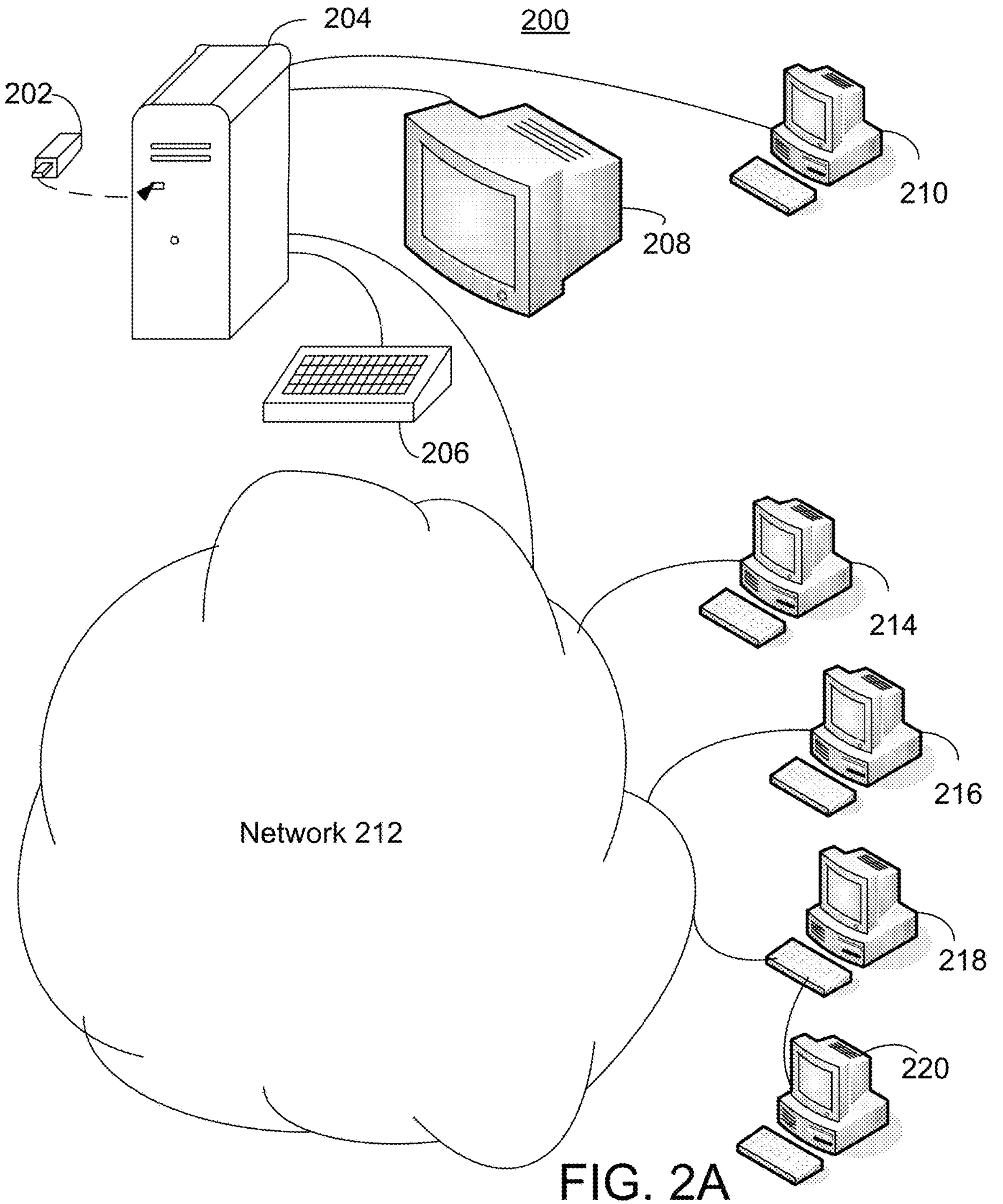

FIG. 2A shows an embodiment of a computer network transmitting hidden data or keys, hidden encrypted data or hidden metadata. In some embodiments, the transmission may be over the Internet or a part of a network that supports an infrastructure such as the electrical grid, a financial exchange, or a power plant, which can be used with the embodiment of FIG. 1A.

Figure 2B:
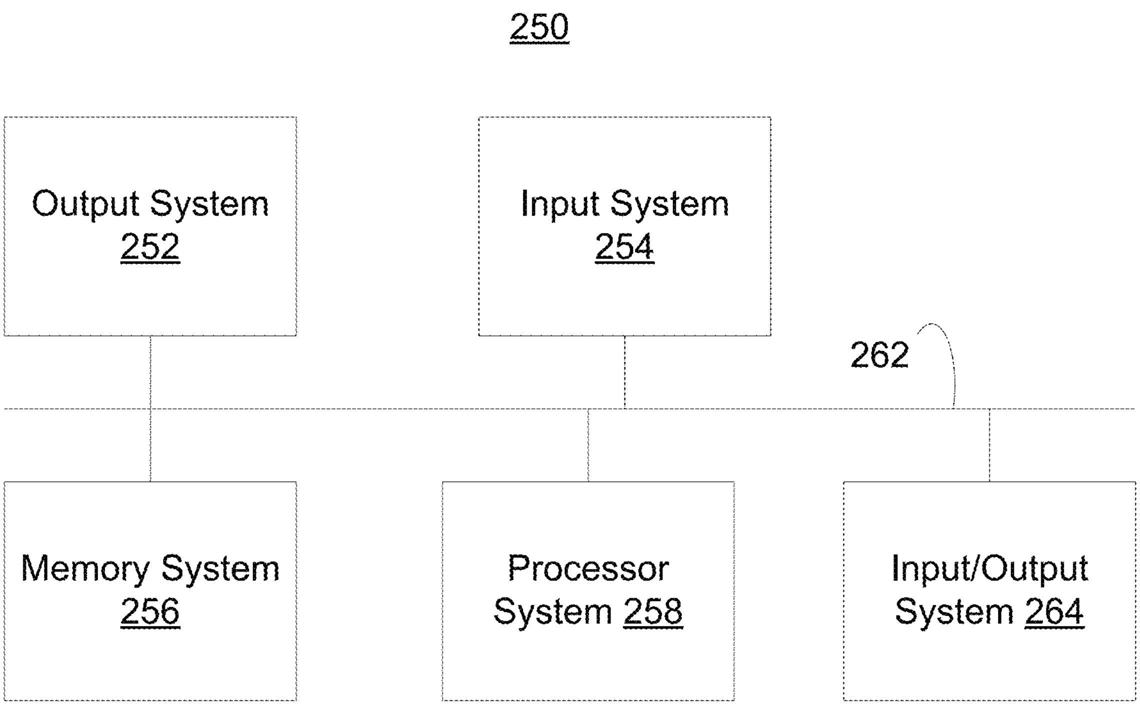

FIG. 2B shows an embodiment for hiding information, which includes a processor, memory and input/output system, that may be sending and/or receiving machines of FIG. 1A.

Figure 3A:
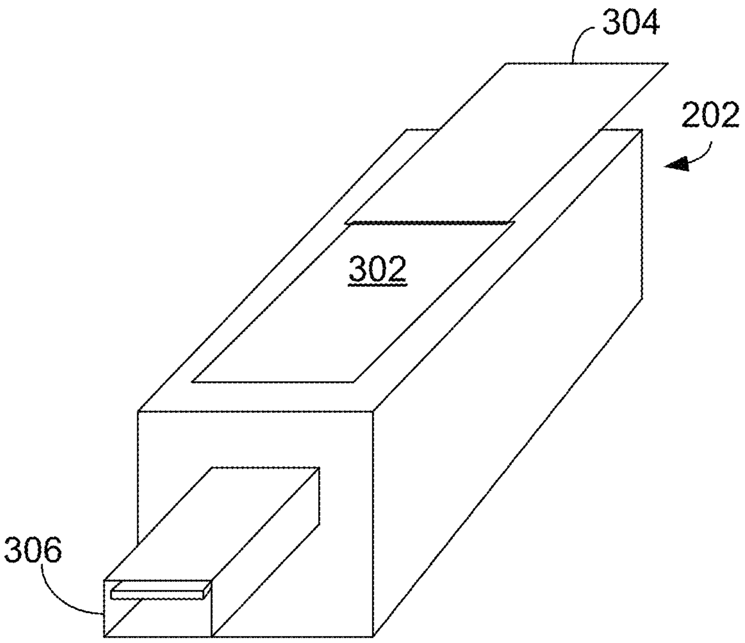

FIG. 3A shows an embodiment of a USB drive that can act as a sending machine and receiving machine to store and protect a user's data.

Figure 3B:
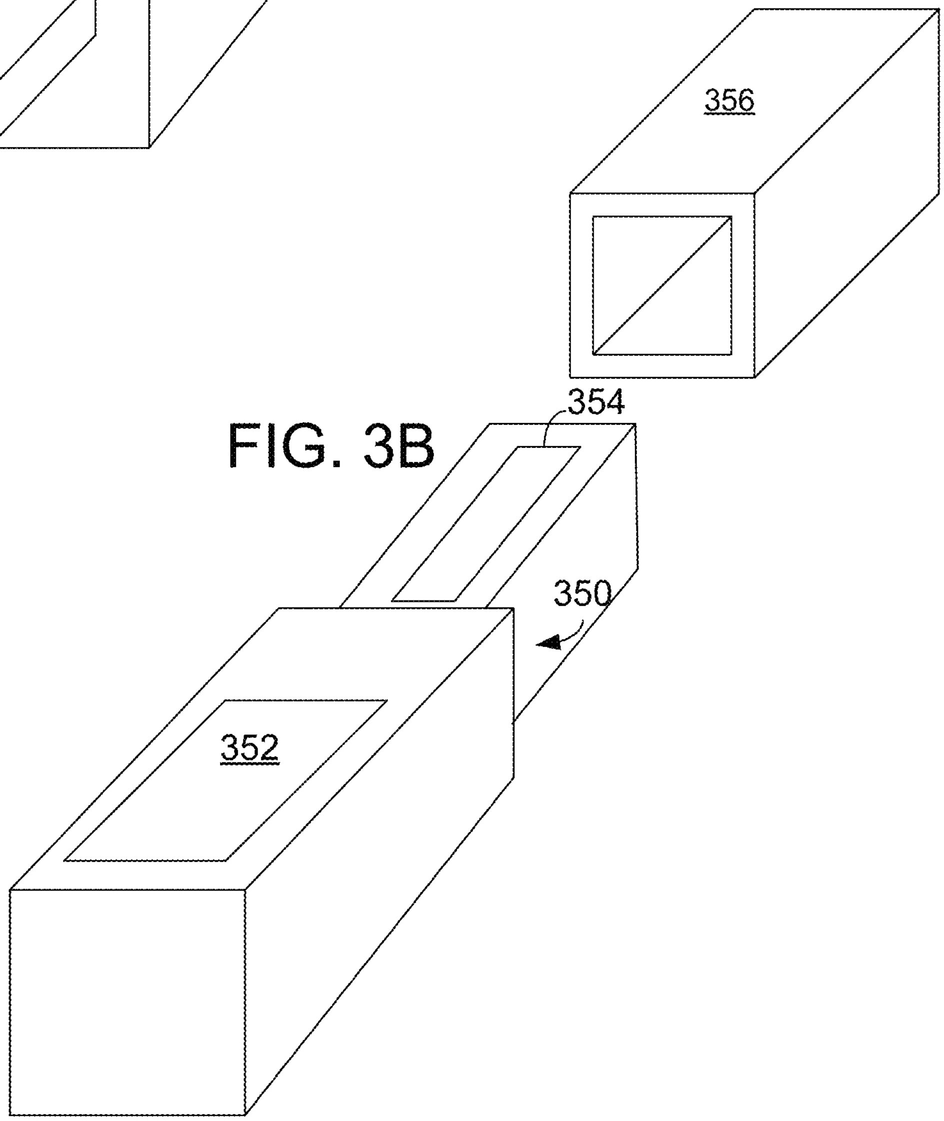

FIG. 3B shows an embodiment of an authentication token, which may include the sending and/or receiving machines of FIG. 1A, that contains a computer processor that can hide data or hide keys.

Figure 4:
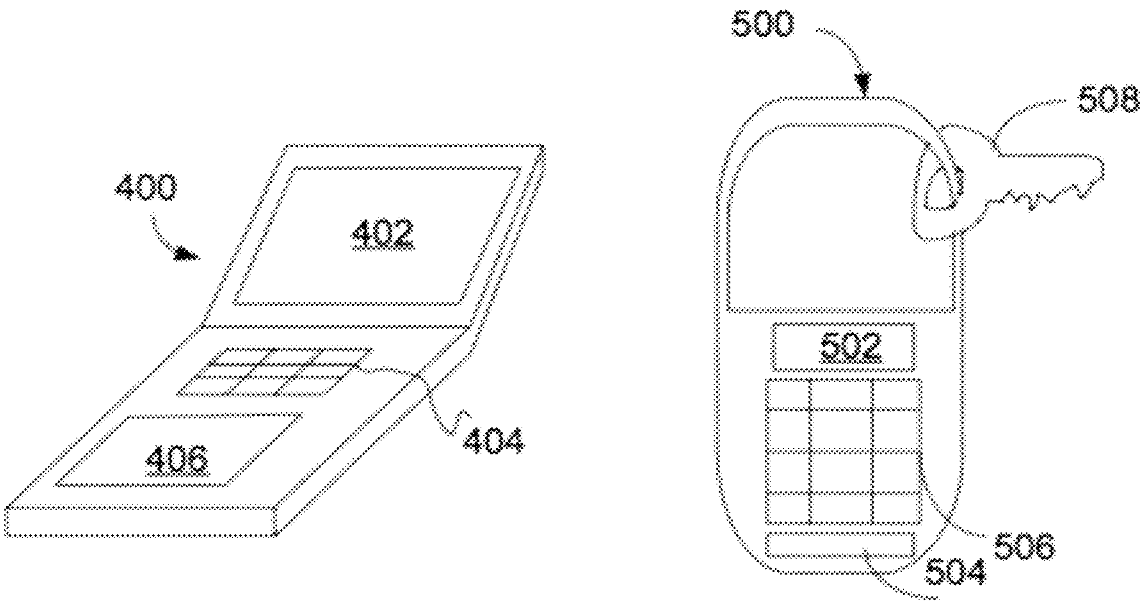

FIG. 4 shows a mobile phone embodiment 400 that hides wireless voice metadata and extracts wireless voice data that was hidden, which may include the sending and/or receiving machines of FIG. 1A. The mobile phone 500 is an embodiment that sends wireless hidden metadata, hidden encrypted data, or hidden keys to an automobile, which may include the sending and/or receiving machines of FIG. 1A.

Figure 5:
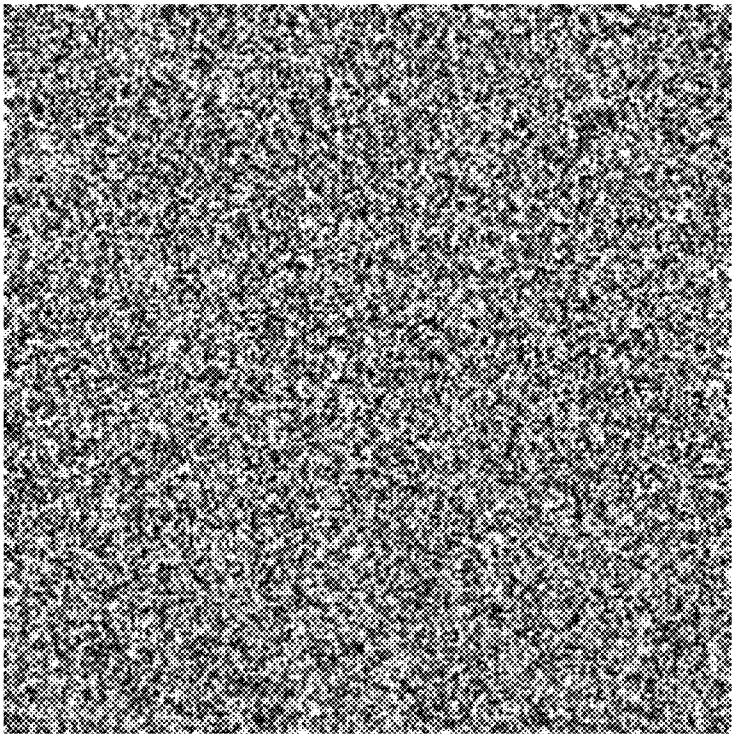

FIG. 5 shows key(s) hidden in random noise where the probability distribution of the key is the same as the probability distribution of the noise.

Figure 6A:
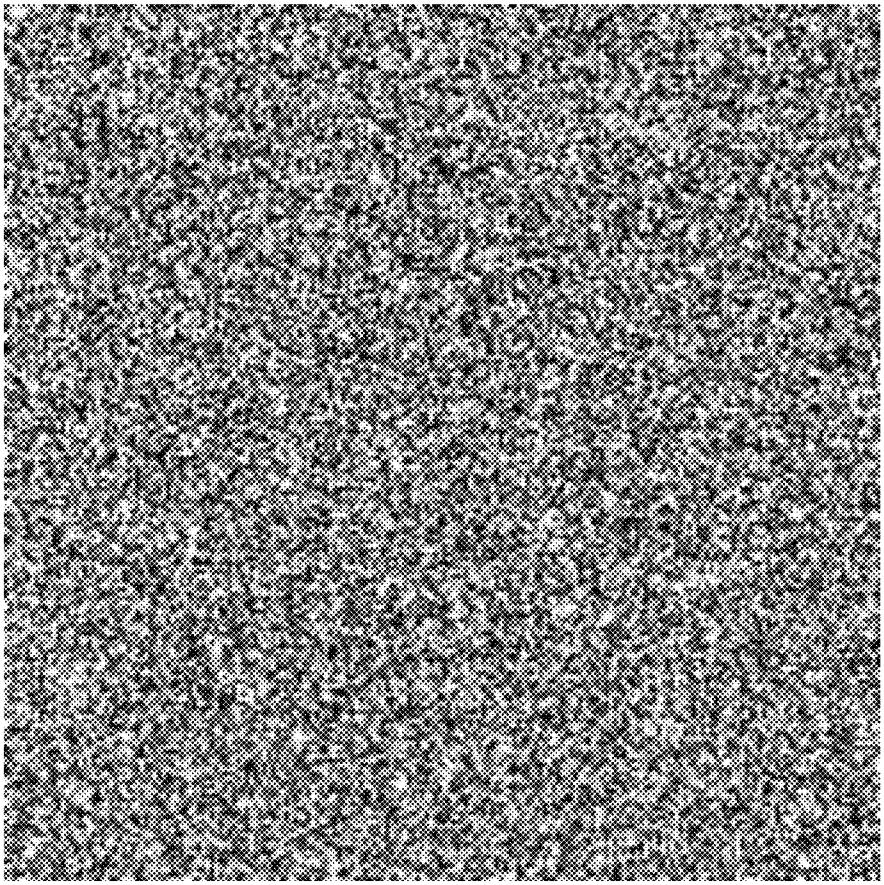

FIG. 6A shows data hidden in random noise where the probability distribution of the data is the same as the probability distribution of the noise.

Figure 6B:
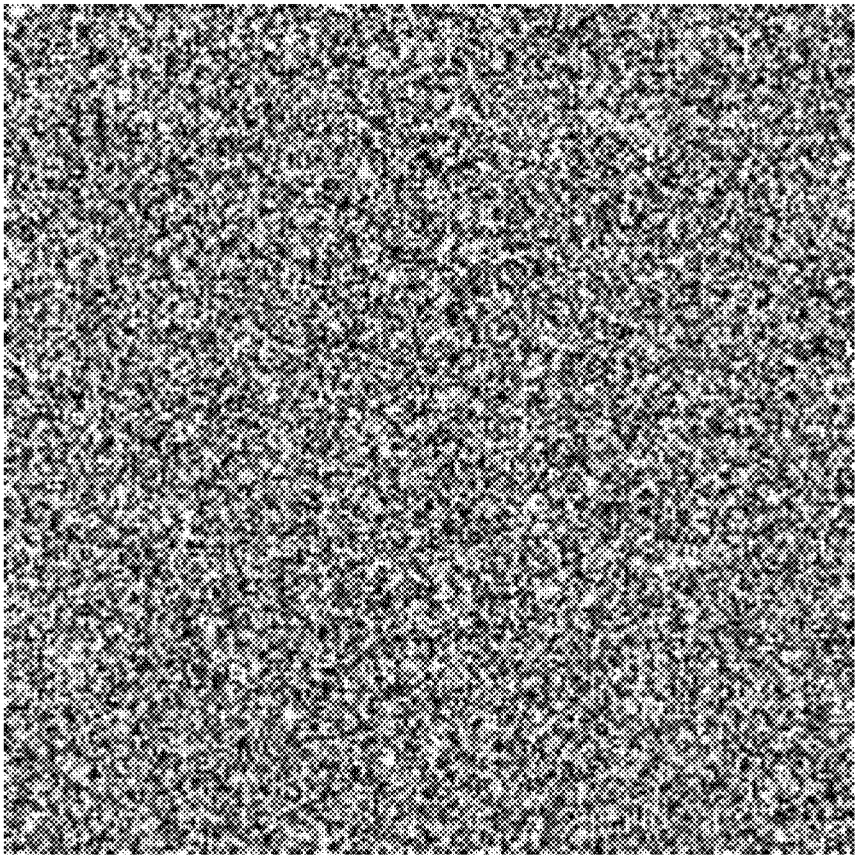

FIG. 6B shows a machine instruction hidden in random noise where the probability distribution of the machine instruction is the same as the probability distribution of the noise.

Figure 7:
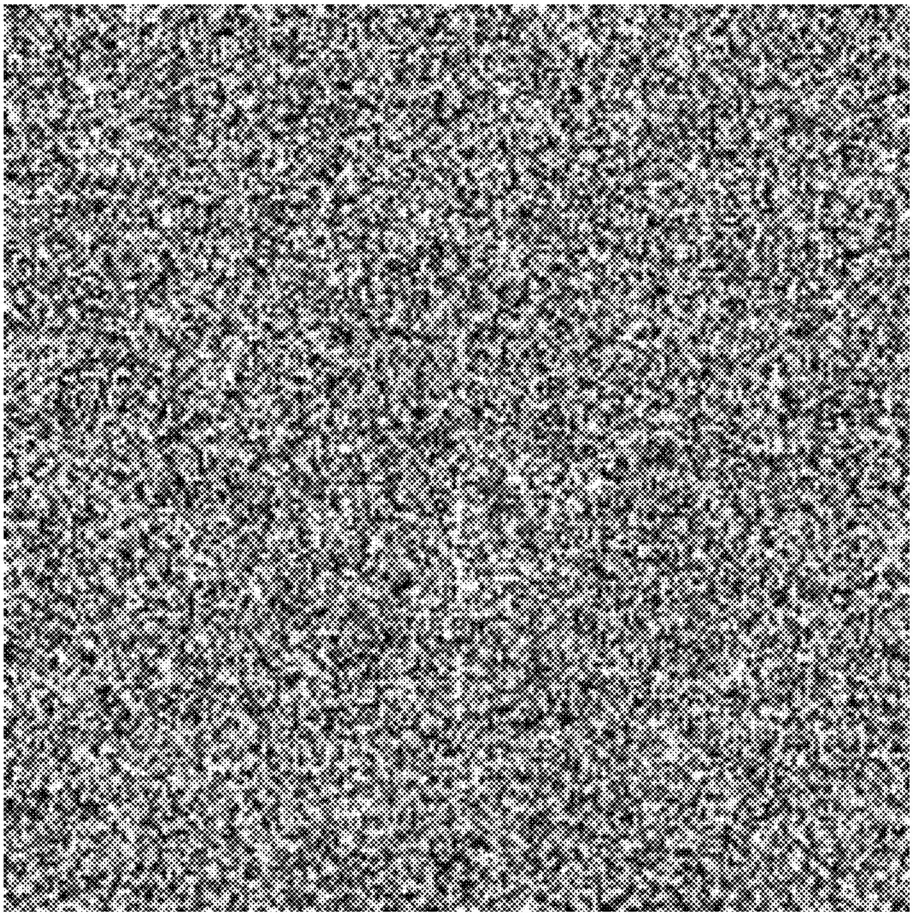

FIG. 7 shows a key hidden in random noise where the probability distribution of the key and the noise are not the same. The probability distribution of the key is somewhat biased.

Figure 8:
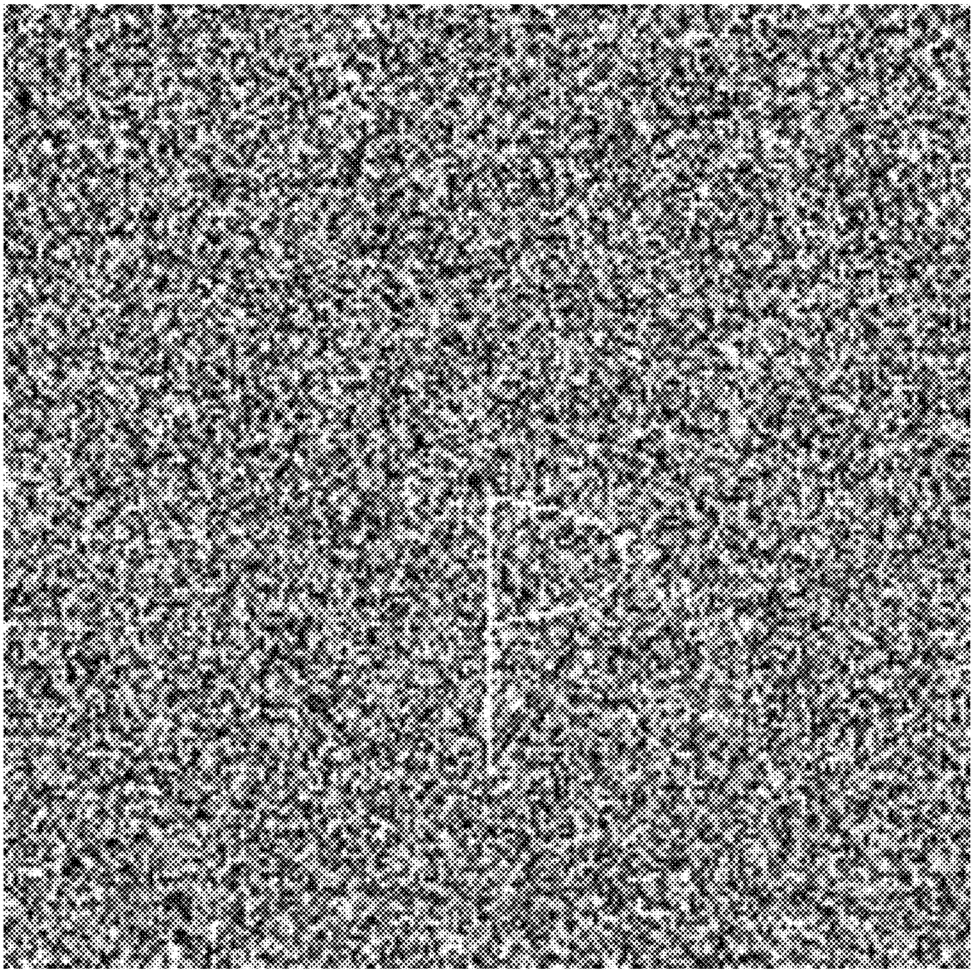

FIG. 8 shows data hidden in random noise where the probability distribution of the data and the noise are not the same. The probability distribution of the data is more biased.

Figure 9A:
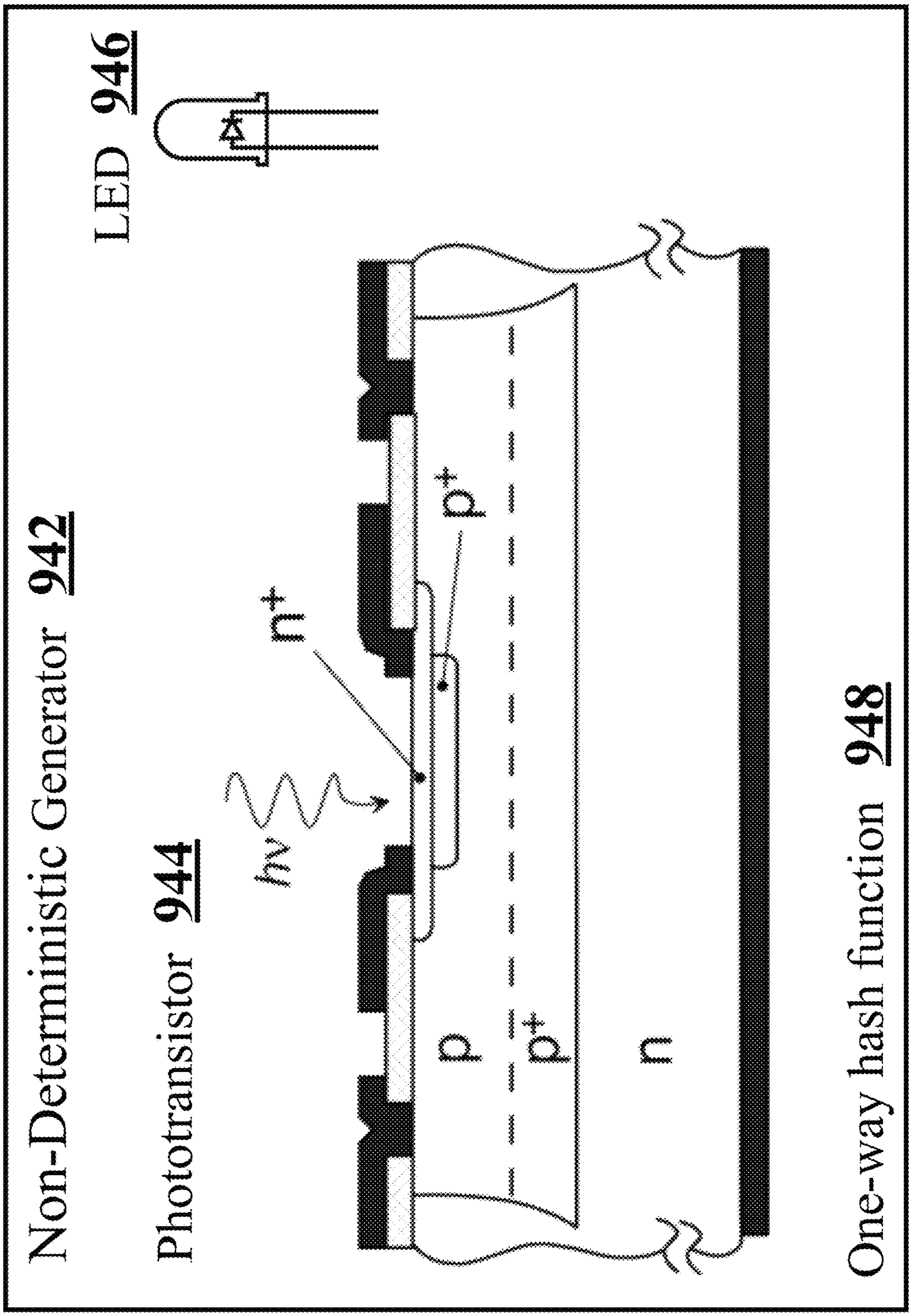

FIG. 9A shows an embodiment of a non-deterministic generator, based on quantum randomness. Non-deterministic generator 942 is based on the behavior of photons to help generate noise and in some embodiments one or more keys. Non-deterministic generator 942 contains a light emitting diode 946 that emits photons and a phototransistor 944 that absorbs photons.

Figure 9B:
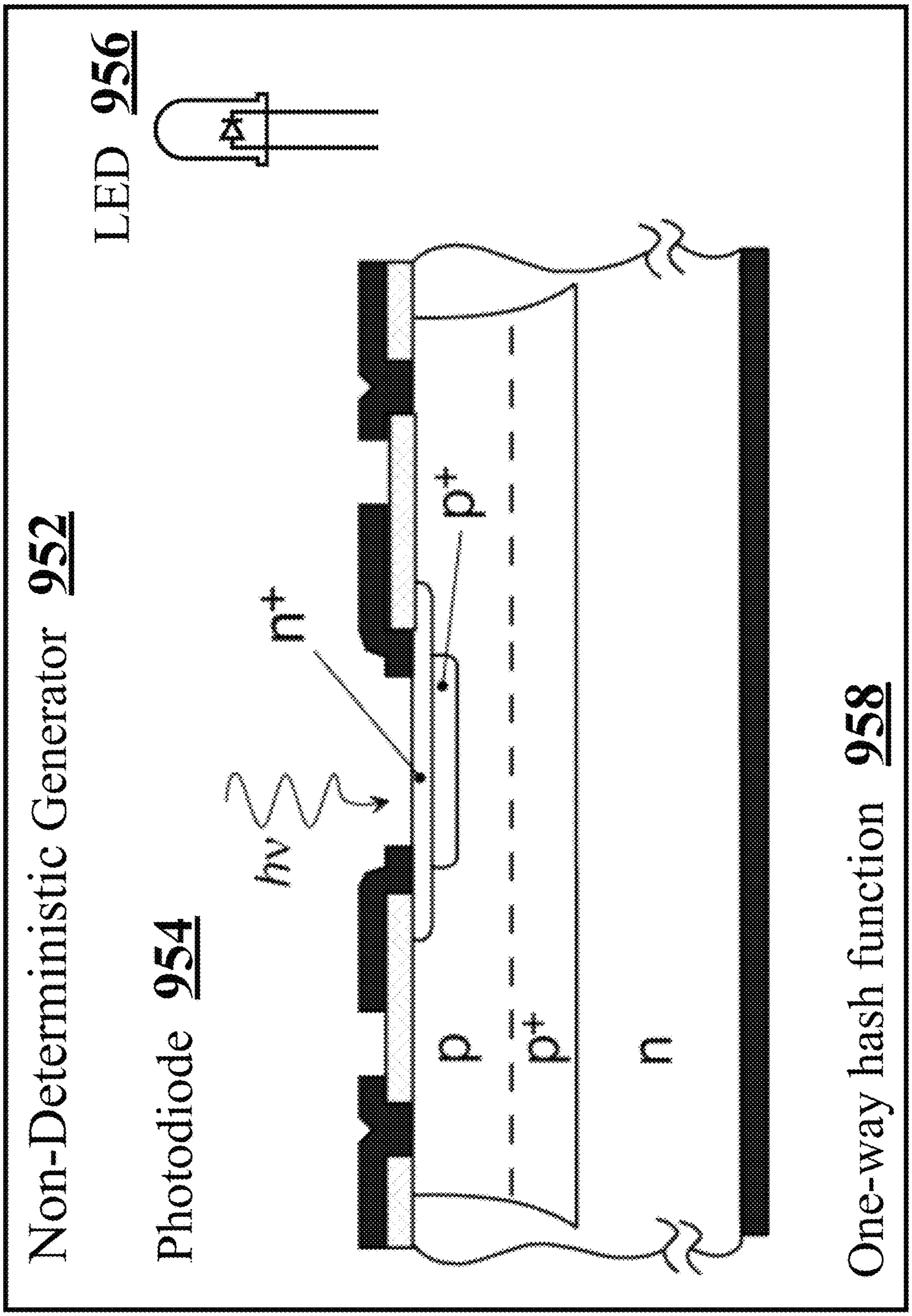

FIG. 9B shows an embodiment of a non-deterministic generator, based on quantum randomness. Non-deterministic generator 952 is based on the behavior of photons to help generate noise and in some embodiments one or more keys. Non-deterministic generator 952 contains a light emitting diode 956 that emits photons and a phototdiode 954 that absorbs photons.

Figure 9C:
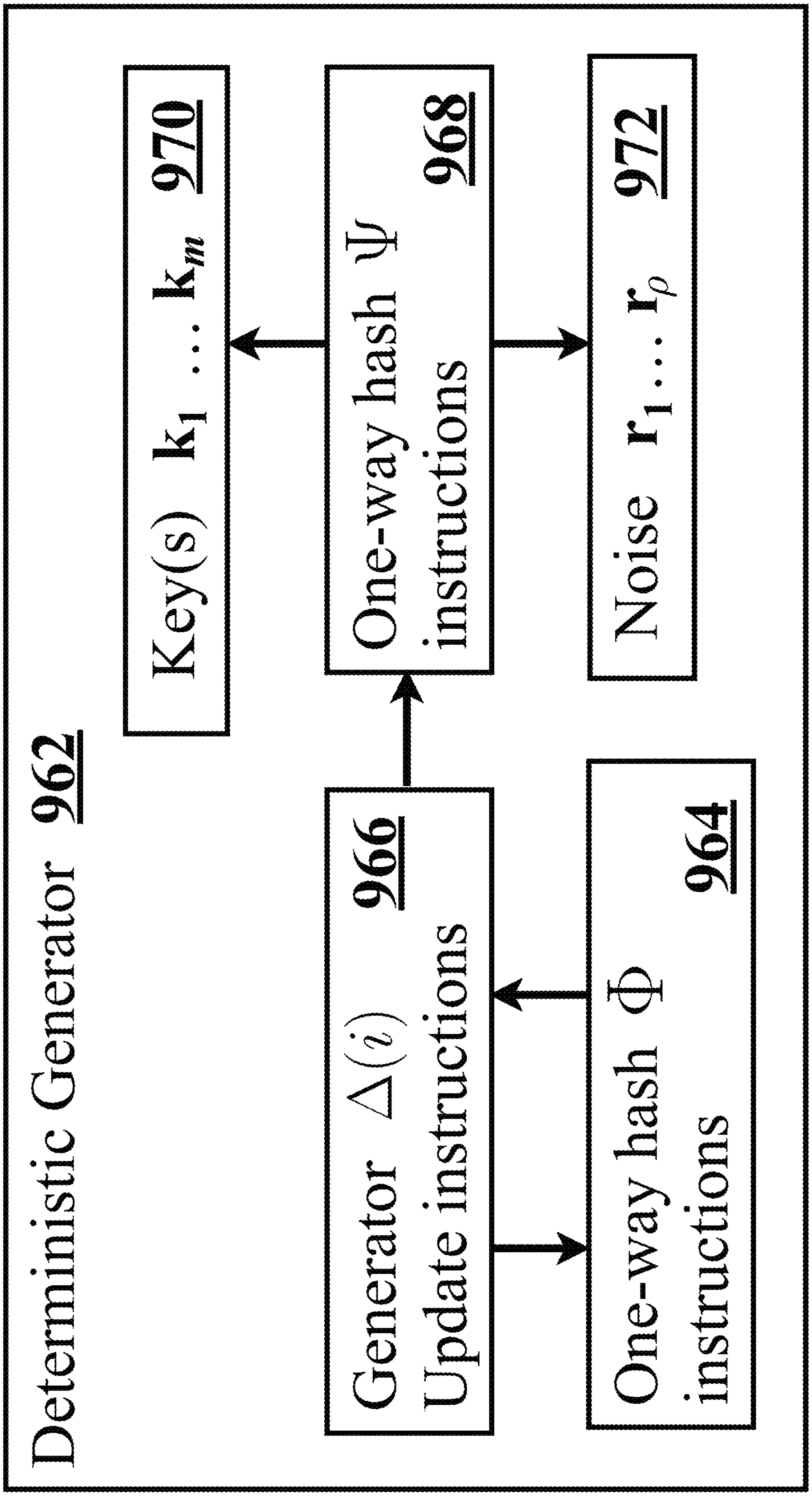

FIG. 9C shows an embodiment of a deterministic generator 962, implemented with a machine. Deterministic generator 962 may generate one or more keys 970 or noise 972. Deterministic generator 962 has generator update instructions 966, one-way hash instructions 964 and one-way hash instructions 968.

Figure 9D:
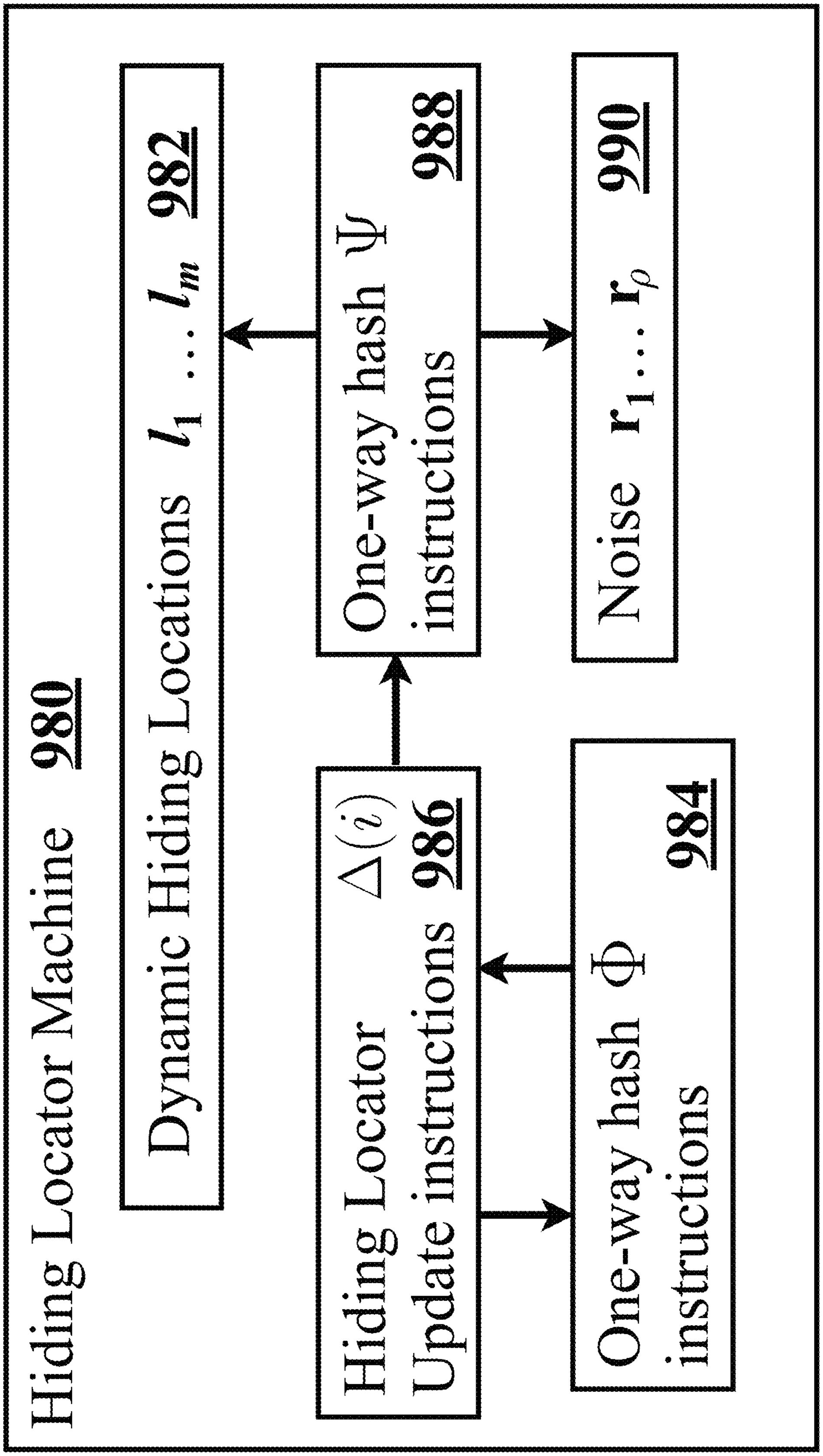

FIG. 9D shows an embodiment of a hiding locator machine 980 with dynamic hiding locations 982, one-way hash Φ instructions 988, hiding locator instructions 986, one-way hash Ψ instructions 988, and noise 990.

Figure 10:
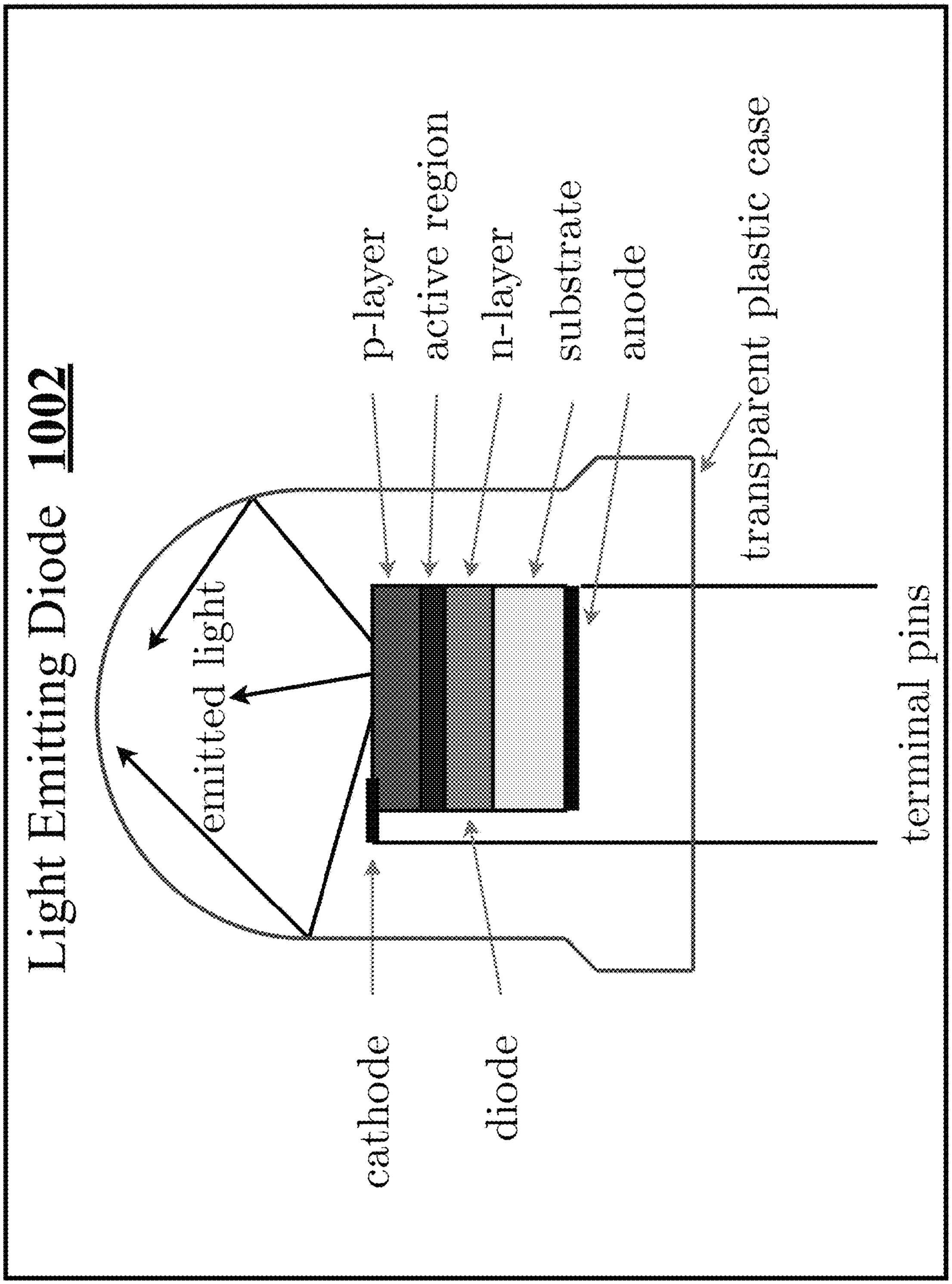

FIG. 10 shows a light emitting diode, which emits photons and in some embodiments is part of the random number generator. The light emitting diode contains a cathode, a diode, an anode, one terminal pin connected to the cathode and one terminal pin connected to the anode, a p-layer of semiconductor, an active region, an n-layer of semiconductor, a substrate and a transparent plastic case.

Figure 11:
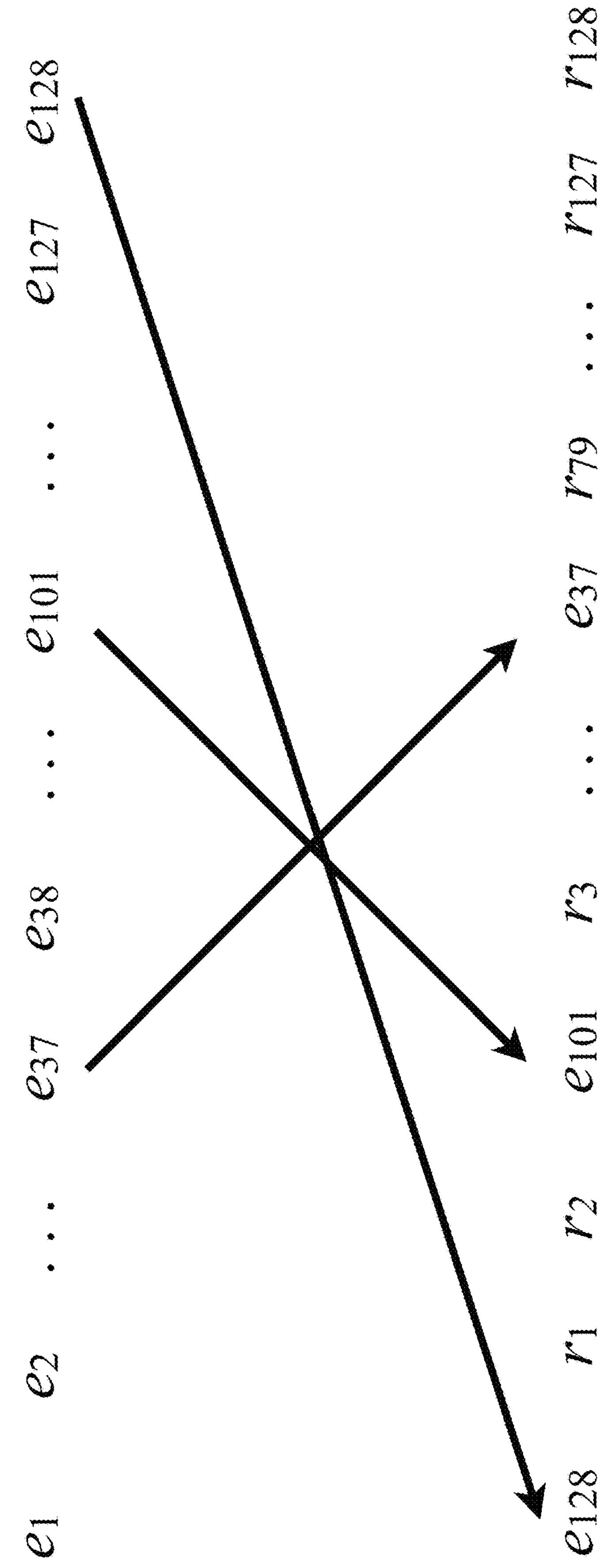

FIG. 11 shows a scatter map that hides 128 bits of data inside of 128 bits of noise. In an embodiment, the data is a 128 bit public key.

Figure 12:
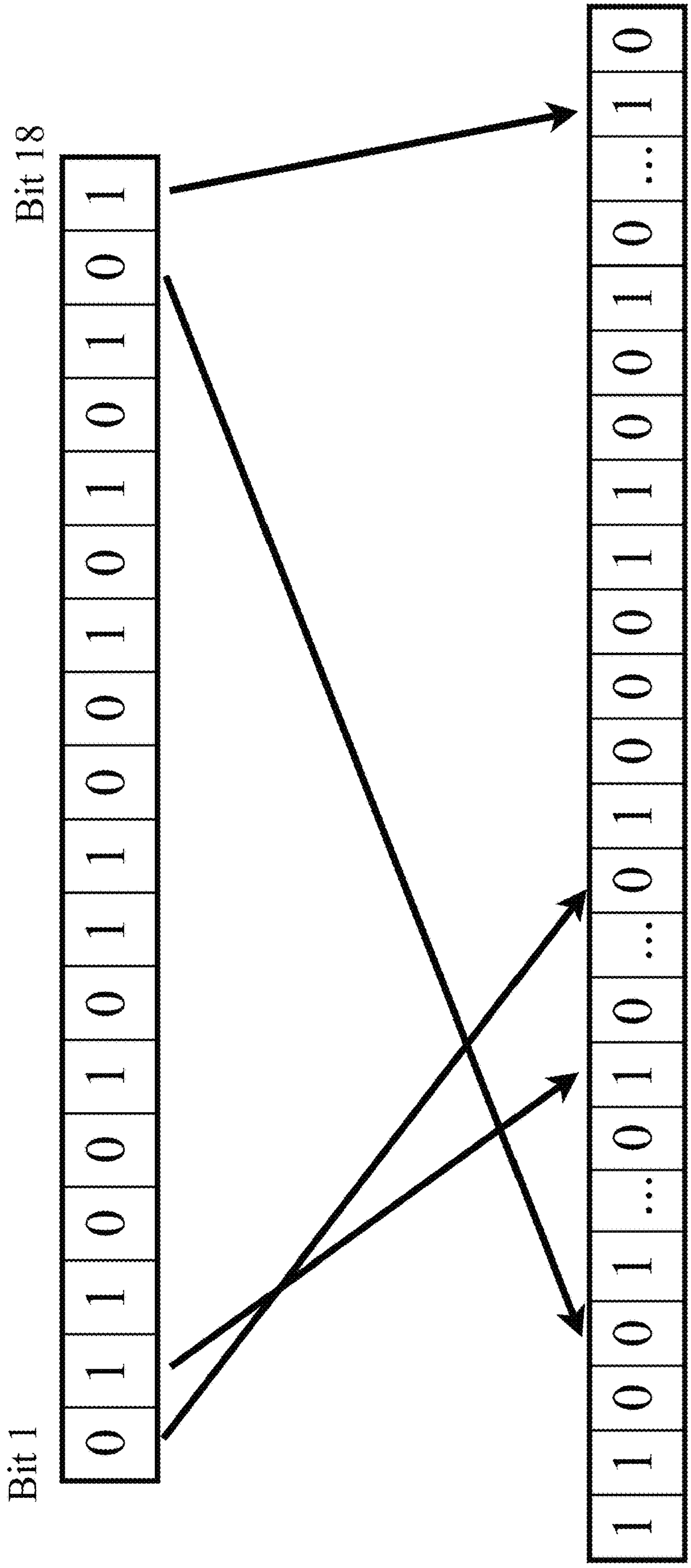

FIG. 12 shows a data transformation that transforms 18 bits of data to a larger sequence of data.

FIG. 13 shows probabilities after Eve observes a hidden key or hidden data inside random noise. The hidden key or hidden noise is represented as S.

FIG. 14 shows an execution of the compiled C program: ADD, where the adversary Eve only has to flip one bit of one machine instruction to sabotage the program so that it multiplies insteads of adds.

Figure 15:
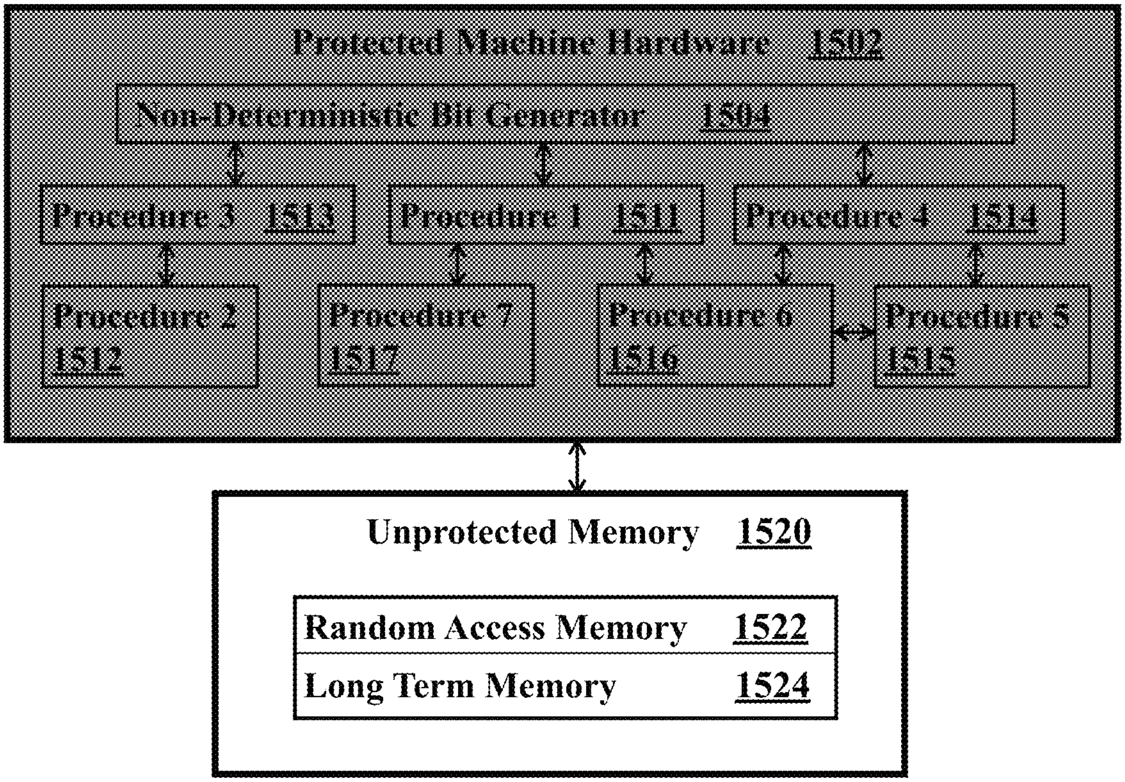

FIG. 15 shows Protected Machine Hardware (blue region) such that the adversary Eve cannot access and sabotage the instructions in this region of the computer hardware.

FIG. 16 shows the ratio of n! (factorial) to $2^n$ for register sizes of n=64 bits, n=128 bits, and n=256 bits. The big numbers following the symbol '=' represent the calculation of $$\frac{n!}{2^n}$$

for n=64, n=128, and n=256.

FIG. 17, titled Instruction Order, shows a table representing how a block of machine instructions $S_{j1}$, $S_{j2}$, . . . have been hidden in dummy instructions $D_{r1}$, $D_{r2}$, . . . after Procedure 7 is executed.

Figure 18:
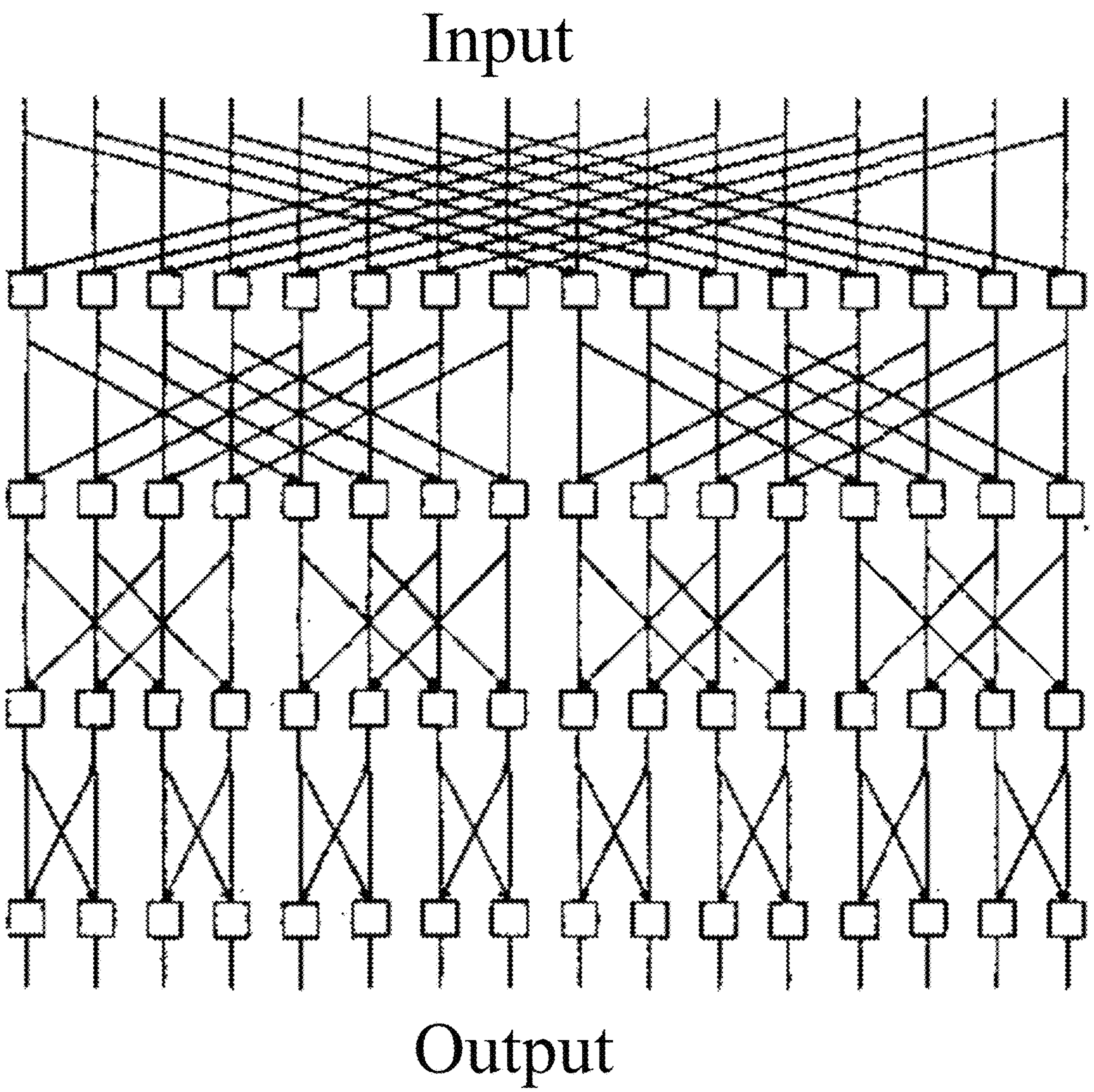

FIG. 18, titled 16 Bit Butterfly Network, shows a Butterfly network in hardware implementing a permutation of bits.

Figure 19:
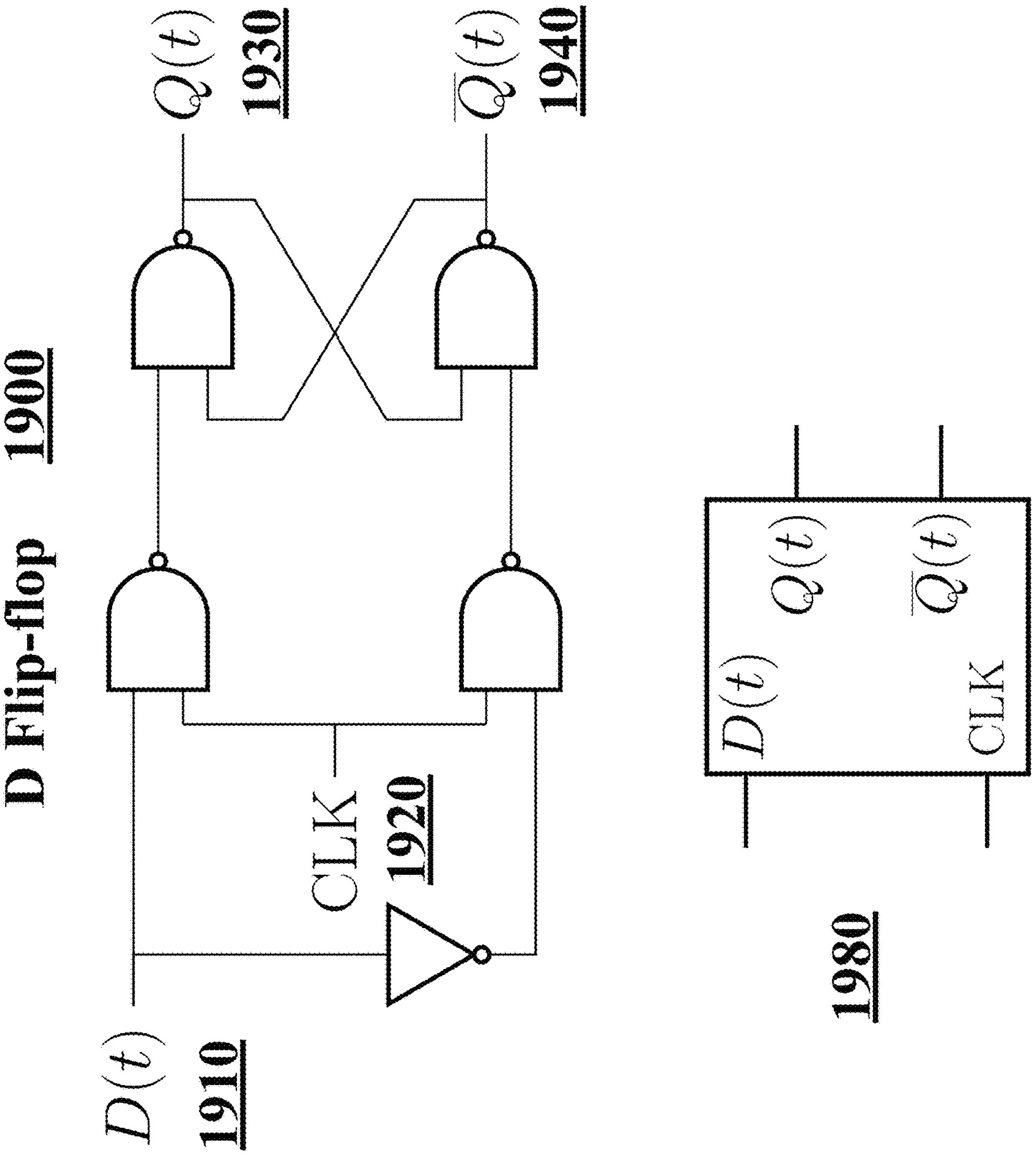

FIG. 19, titled D Flip-flop, shows a D flip-flop composed of four NAND gates and one NOT gate. CLK is a clock input. D(t) is the data input. Q(t) is an output line. $\overline{Q}(t)$ is also an output where $\overline{Q}(t)=0$ if and only if Q(t)=1; $\overline{Q}(t)=1$ if and only if Q(t)=0. Below the circuit diagram of the D flip-flop is a compact representation of the D flip-flop that omits the gates and circuit connectivity between the gates.

Figure 20:
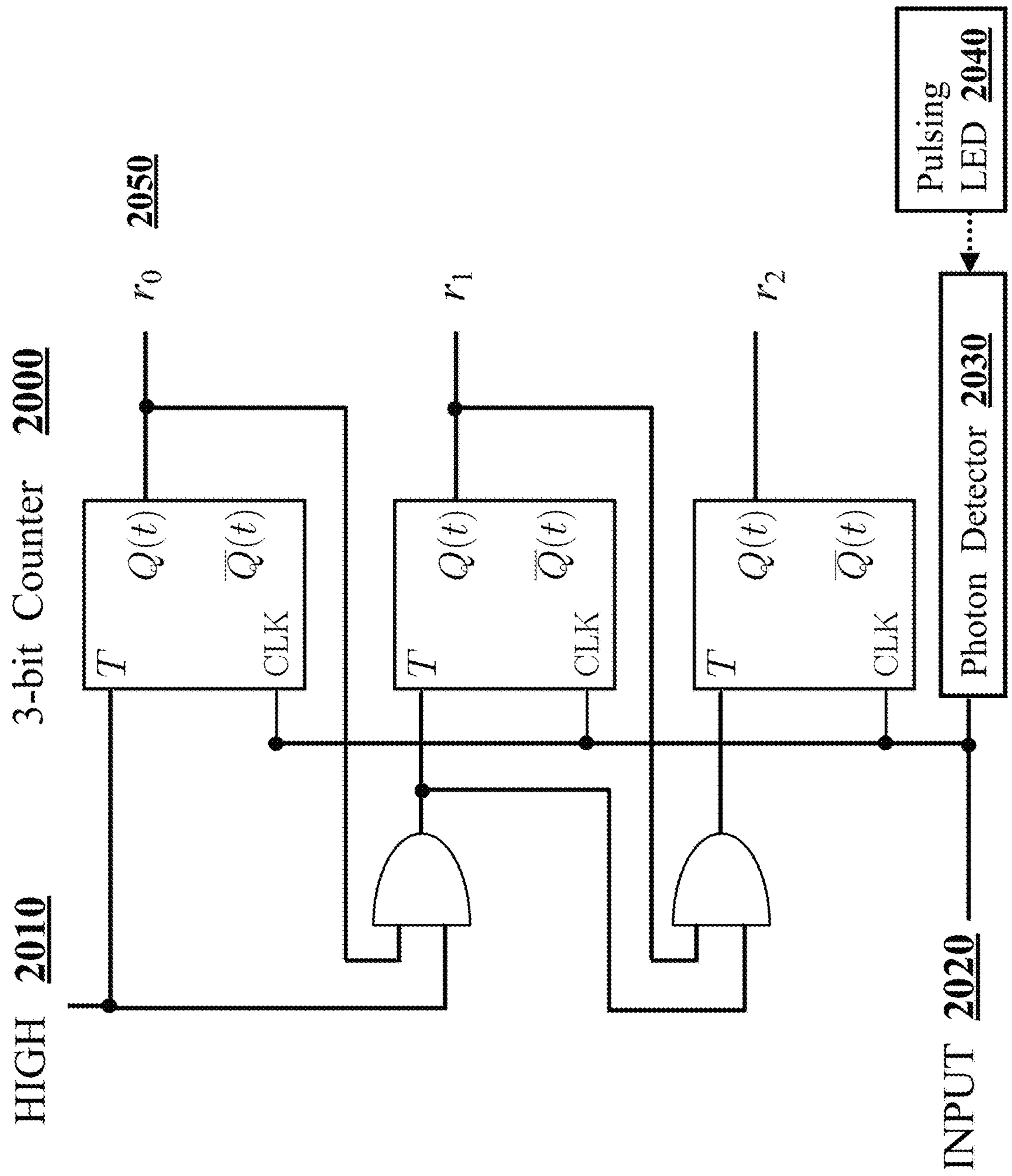

FIG. 20 shows a 3-bit counter, built from T flip-flops. This counter helps build a quantum random number generator where the random bits are the output of the flip-flops, labeled $r_0$, $r_1$, $r_2$, caused by Photon Detector 2030 and Pulsing LED 2040.

Figure 21:
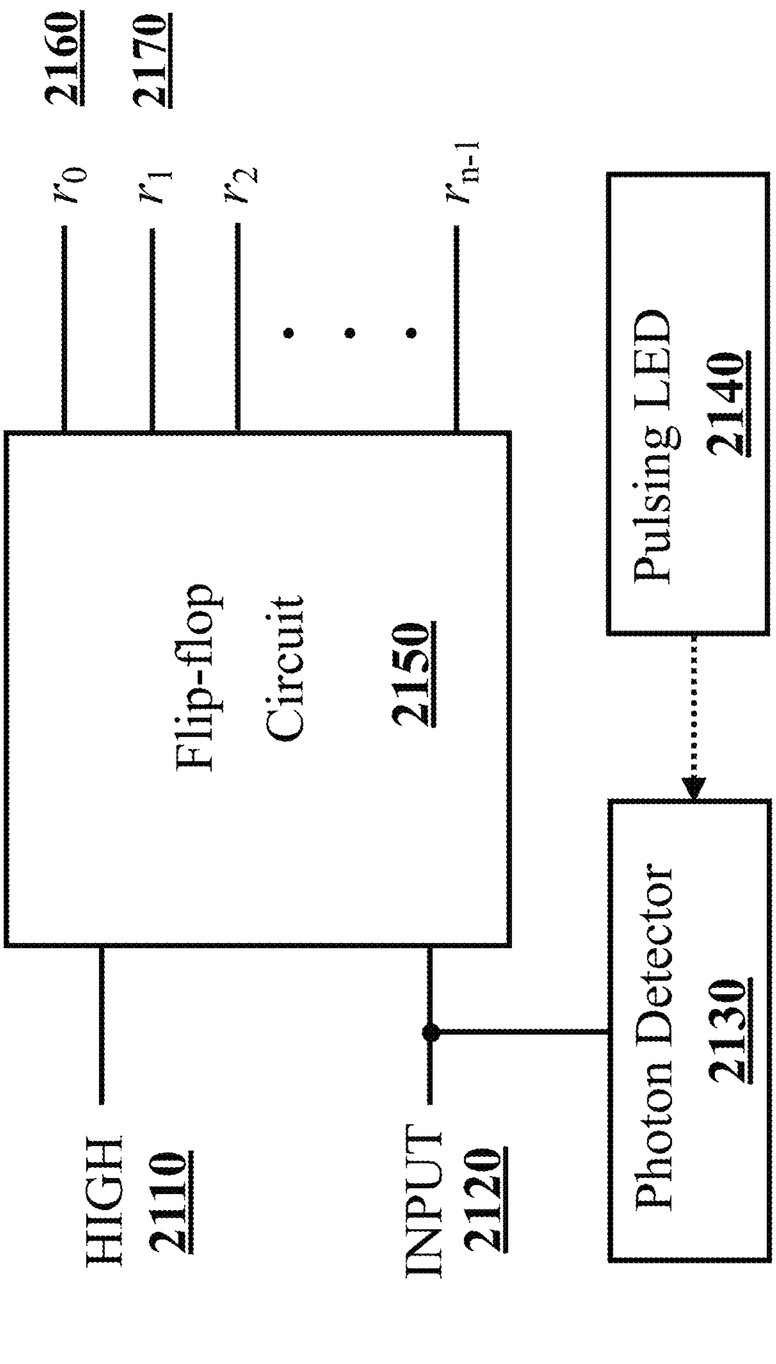

FIG. 21 shows an LED flip-flop circuit that generates n random bits $r_0$, $r_1$, $r_2$, . . . , $r_{n-1}$. The circuit has a Pulsing LED 2140 that emits one or more photons that are absorbed by Photon Detector 2130. The Pulsing LED and Photon Detector change the voltage or state in one or more of the flip flops in flip-flop circuit 2150.

10 DETAILED DESCRIPTION

10.1 Information System

In this specification, the term "data" is broad and refers to any kind of information. In some embodiments, data may refer to plaintext information. In some embodiments, data may refer to voice information, transmitted with a landline phone or mobile phone. In some embodiments, data may refer to metadata. In some embodiments, data may refer to email or other information available on the Internet. In some embodiments, data may refer to the information in a sequence of values. In some embodiments, data may refer to the information in a sequence of bit values. In some embodiments, data may refer to the information in a sequence of numbers. In some embodiments, data may refer to the information in a sequence or collection of physical values or physical measurements. In some embodiments, data may refer to the information in a physical location (e.g., GPS coordinates of an auto or a mailing address in Venezia, Italia) or to the information in an abstract location—for example, a computer memory address or a virtual address. In some embodiments, data may refer to the information contained in Shakespeare's King Lear or Dostoevsky's Grand Inquisitor or Euclid's Elements. In some embodiments, data may refer to the information in Kepler's astronomical measurements or a collection of geophysical measurements. In some embodiments, data may refer to the information in to a sequence of times or collection of times. In some embodiments, data may refer to the information in statistical data such as economic or insurance information. In some embodiments, data may refer to medical information (e.g., an incurable cancer diagnosis) or genetic information (e.g., that a person has the amino acid substitution causing sickle cell anemia). In some embodiments, data may refer to the information in a photograph of friends or family or satellite photos. In some embodiments, data may refer to the information in a code or sequence of codes. In some embodiments, data may refer to the information in a sequence of language symbols for a language that has not yet been discovered or designed. In some embodiments, data may refer to financial information—for example, data may refer to a bid quote on a financial security, or an ask quote on a financial security. In some embodiments, data may refer to information about a machine or a collection of machines—for example, an electrical grid or a power plant. In some embodiments, data may refer to what electrical engineers sometimes call signal in information theory. In some embodiments, data may refer to a cryptographic key. In some embodiments, data may refer to a sequence or collection of computer program instructions (e.g., native machine instructions or source code information). In some embodiments, data may refer to a prime number or a mathematical formula or a mathematical invariant information. In some embodiments, data may refer to an internet protocol address or internet traffic information. In some embodiments, data may refer to a combination or amalgamation or synthesis of one or more of these types of aforementioned information.

In this specification, the term "noise" is information that is distinct from data and has a different purpose. Noise is information that helps hide the data so that the noise hinders the adversary Eve from finding or obtaining the data. This hiding of the data helps maintain the privacy of the data. In some embodiments, hiding the data means rearranging or permuting the data inside the noise. An example of data is a key. Hiding a key inside noise helps protect the privacy of the key; the key may subsequently help execute a cryptographic algorithm by a first party (e.g., Alice) or a second party (e.g., Bob).

In this specification, the term "location" may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set.

In this specification, the term "machine-readable medium" refers to any non-transitory medium capable of carrying or conveying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space.

In this specification, the term "process" refers to a series of one or more operations. In an embodiment, "process" may also include operations or effects that are best described as non-deterministic. In an embodiment, "process" may include some operations that can be executed by a digital computer program and some physical effects that are non-deterministic, which cannot be executed by a digital computer program and cannot be performed by a finite sequence of processor instructions.

In this specification, the machine-implemented processes implement algorithms and non-deterministic processes on a machine. The formal notion of "algorithm" was introduced in Turing's work and refers to a finite machine that executes a finite number of instructions with finite memory. In other words, an algorithm can be executed with a finite number of machine instructions on a processor. "Algorithm" is a deterministic process in the following sense: if the finite machine is completely known and the input to the machine is known, then the future behavior of the machine can be determined. However, there is quantum random number generator (QRNG) hardware (FIG. 9A, FIG. 9B, and FIG. 10) in embodiments that measure quantum effects from photons (or other physically non-deterministic proceses), whose physical process is non-deterministic. The recognition of non-determinism produced by quantum randomness and other quantum embodiments is based on many years of experimental evidence and statistical testing. Furthermore, the quantum theory—derived from the Kochen-Specker theorem and its extensions [46, 47]—predicts that the outcome of a quantum measurement cannot be known in advance and cannot be generated by a Turing machine (digital computer program). As a consequence, a physically non-deterministic process cannot be generated by an algorithm: namely, a sequence of operations executed by a digital computer program. FIG. 9A, FIG. 9B, and FIG. 10 show an embodiment of a non-deterministic process arising from quantum events; that is, the emission and absorption of photons.

Some examples of physically non-deterministic processes are as follows. In some embodiments that utilize non-determinism, photons strike a semitransparent mirror and can take two or more paths in space. In one embodiment, if the photon is reflected by the semitransparent mirror, then it takes on one bit value $b \in \{0, 1\}$; if the photon passes through by the semitransparent mirror, then the non-deterministic process produces another bit value $1-b$. In another embodiment, the spin of an electron may be sampled to generate the next non-deterministic bit. In still another embodiment, a protein, composed of amino acids, spanning a cell membrane or artificial membrane, that has two or more conformations can be used to detect non-determinism: the protein conformation sampled may be used to generate a non-deterministic value in $\{0, \ldots n-1\}$ where the protein has n distinct conformations. In an alternative embodiment, one or more rhodopsin proteins could be used to detect the arrival times of photons and the differences of arrival times could generate non-deterministic bits. In some embodiments, a Geiger counter may be used to sample non-determinism.

In this specification, the term "photodetector" refers to any type of device or physical object that detects or absorbs photons. A photodiode is an embodiment of a photodetector. A phototransistor is an embodiment of a photodetector. A rhodopsin protein is an embodiment of a photodetector.

In this specification, the term "key" is a type of information and is a value or collection of values to which one or more operations are performed. In some embodiments, one or more of these operations are cryptographic operations. $\{0, 1\}^n$ is the set of all bit-strings of length n. When a key is represented with bits, mathematically a n-bit key is an element of the collection $\{0, 1\}^n$ which is the collection of strings of 0's and 1's of length n. For example, the string of 0's and 1's that starts after this colon is a 128-bit key: 01100001 11000110 01010011 01110001 11000101 10001110 11011001 11010101 01011001 01100100 10110010 10101010 01101101 10000111 10101011 00010111. In an embodiment, n=3000 so that a key is a string of 3000 bits.

In other embodiments, a key may be a sequence of values that are not represented as bits. Consider the set {A, B, C, D, E}. For example, the string that starts after this colon is a 40-symbol key selected from the set {A, B, C, D, E}: ACDEB AADBC EAEBB AAECB ADDCB BDCCE ACECB EACAE. In an embodiment, a key could be a string of length n selected from $\{A, B, C, D, E\}^n$. In an embodiment, n=700 so that the key is a string of 700 symbols where each symbol is selected from {A, B, C, D, E}.

In some embodiments, a key is a collection of one or more values, that specifies how a particular encryption function will encrypt a message. For example, a key may be a sequence of 0's and 1's that are bitwise exclusive-or'ed with the bits that comprise a message to form the encrypted message.

In some embodiments, hidden data (key) 109 in FIG. 1A may be read as input by processor system 258, that executes instructions which perform a cryptographic algorithm. In some embodiments, hidden data (key) 132 in FIG. 1B, may be read as input by processor system 258, that executes instructions which perform a cryptographic algorithm. Symmetric cryptography typically is implemented with a block cipher or a stream cipher. In another embodiment, a key K may be a sequence of values that a stream cipher reads as input so that Alice can encrypt a messsage M as $\mathcal{E}(K, M)$ with this key and Bob can decrypt $\mathcal{E}(K, M)$ message. In the expression $\mathcal{E}(K, M)$, K represents the key, M represents the message and $\mathcal{E}$ represents the encryption method.

In another embodiment, a key may be a sequence of values that a block cipher reads as input in order to encrypt a message with the block cipher encryption algorithm $\mathcal{E}$. In another embodiment, a key may be a sequence of values that a block cipher reads as input in order to decrypt an encrypted message with the block cipher's decryption algorithm $\mathcal{D}$. If Eve does not know that key, then it is difficult for Eve to decrypt the encrypted message $\mathcal{E}(K, M)$. AES [48] is a common block cipher algorithm that reads 256-bit keys as input. Serpent [49] is also a block cipher algorithm that reads 256-bit keys as input.

In other embodiments, the key be a public key. In some embodiments, a key may refer to a public key for the RSA public-key algorithm [50]. In this case, a key is a huge prime number. In some embodiments, random generator 128 generates a key that is subsequently hidden by scatter map instructions 130.

FIG. 1A shows an information system 100 for hiding information in a manner that is expected to be secure. In this specification, data will sometimes refer to information that has not yet been hidden or encrypted. Information system 100 includes data 104 (not hidden information), and hiding process 106, a sending machine 102, hidden data (hidden information) 109 and a transmission path 110, a receiving machine 112, extraction process 116, extracted data 114. In other embodiments, information system 100 may not have all of the components listed above or may have other components instead of and/or in addition to those listed above.

Information system 100 may be a system for transmitting hidden data. Data 104 refers to information that has a purpose and that has not been hidden yet. In some embodiments, data is intended to be delivered to another location, software unit, machine, person, or other entity.

In some embodiments, data 104 is voice metadata that has not yet been hidden. Voice metadata may contain the IP address of the sending (calling) phone and also the IP address of the receiving phone. Voice metadata may contain the time of the call and the date. Some embodiments of a mobile phone are shown in FIG. 4. In other embodiments, data 104 is email metadata or text metadata or browser metadata.

In an embodiment, data may be unhidden information being transmitted wirelessly between satellites. Data may be represented in analog form in some embodiments and may be represented in digital form. In an embodiment, the sound waves transmitted from a speaker's mouth into a mobile phone microphone are data. The representation of this data information before reaching the microphone is in analog form. Subsequently, the data information may be digitally sampled so it is represented digitally after being received by the mobile phone microphone. In general, data herein refers to any kind of information that has not been hidden or encrypted and that has a purpose.

In information system 100, noise helps hide the data. It may be desirable to keep the contents of data 104 private or secret. Consequently, it may be desirable to hide data 104, so that the transmitted information is expected to be unintelligible to an unintended recipient should the unintended recipient attempt to read and/or extract the hidden data transmitted. Data 104 may be a collection of multiple, not yet hidden information blocks, an entire message of data, a segment of data (information), or any other portion of a data.

Hiding process 106 may be a series of steps that are performed on data 104. In one embodiment, the term "process" refers to one or more instructions for sending machine 102 to execute the series of operations that may be stored on a machine-readable medium. Alternatively, the process may be carried out by and therefore refer to hardware (e.g., logic circuits) or may be a combination of instructions stored on a machine-readable medium and hardware that cause the operations to be executed by sending machine 102 or receiving machine 112. Data 104 may be input for hiding process 106. The steps that are included in hiding process 106 may include one or more mathematical operations and/or one or more other operations.

As a post-processing step, one-way hash function 948 may be applied to a sequence of random events such as quantum events (non-deterministic) generated by non-deterministic generator 942 in FIG. 9A. As a post-processing step, one-way hash function 948 may be applied to a sequence of random events such as quantum events (non-deterministic) generated by non-deterministic generator 952 in FIG. 9B.

In FIG. 1B hiding process 122 may implement hiding process 106 in FIG. 1A. In some embodiments, cipher instructions 129 may first encrypt the data 124 and subsequently scatter map instructions 130 hide the encrypted data to produce hidden encrypted data 132 before sending machine 102 transmits the hidden data via transmission path 110. In some embodiments, data transformation instructions 126 may transform data 124 before scatter map process instructions 130 are applied to this transformed data. In some embodiments, scatter map process instructions 130 are at least part of the hiding process. In some embodiments, data 124 is transformed by data transformation instructions 126 and encrypted by cipher instructions 129 before scatter map process instructions 130 are applied to this transformed and encrypted data.

In some embodiments, as shown in FIG. 1B, random generator 128 is used to help generate the scatter map that helps perform scatter map process instructions 130. In some embodiments, random generator 128 generates noise that is used by scatter map process instructions 130 to hide data 124 that has previously been transformed by data transformation instructions 126 and/or encrypted by cipher instructions 129. In some embodiments, random generator 128 generates one or more keys as input to cipher instructions 129 that are applied to data 124. In some embodiments, random generator 128 generates one or more keys that are hidden in random noise, generated by random generator 128.

In some embodiments, hiding process 106 requests random generator 128 to help generate one or more keys (shown in cipher instructions 129) for encrypting at least part of data 104. In an embodiment, non-deterministic generator 942 (FIG. 9A) may be part of random generator 128. In an embodiment, non-deterministic generator 952 (FIG. 9B) may be part of random generator 128.

Sending machine 102 may be an information machine that handles information at or is associated with a first location, software unit, machine, person, sender, or other entity. Sending machine 102 may be a computer, a phone, a mobile phone, a telegraph, a satellite, or another type of electronic device, a mechanical device, or other kind of machine that sends information. Sending machine 102 may include one or more processors and/or may include specialized circuitry for handling information. Sending machine 102 may receive data 104 from another source (e.g., a transducer such as a microphone which is inside mobile phone 402 or 502 of FIG. 4), may produce all or part of data 104, may implement hiding process 106, and/or may transmit the output to another entity. In another embodiment, sending machine 102 receives data 104 from another source, while hiding process 106 and the delivery of the output of hiding process 106 are implemented manually. In another embodiment, sending machine 102 implements hiding process 106, having data 104 entered, via a keyboard (for example) or via a mobile phone microphone, into sending machine 102. In another embodiments, sending machine 102 receives output from hiding process 106 and sends the output to another entity.

Sending machine 102 may implement any of the hiding processes described in this specification. Hiding process 106 may include any of the hiding processes described in this specification. For example, hiding process 106 may implement any of the embodiments of the hiding processes 1 or 3, as described in section 10.7; hiding process 106 may implement any of the embodiments of the hiding process 5, as described in section 10.12; hiding process 106 may implement any of the embodiments of the hiding processes 6 or 7, as described in section 10.13; hiding process 106 may implement any of the embodiments of the hiding processes 8 or 9, as described in section 10.15. In some embodiments, hidden data 132, shown in FIG. 1B, includes at least some data 124 that was hidden by the scatter map process instructions 130 that is a part of hiding process 122.

Transmission path 110 is the path taken by hidden data 109 to reach the destination to which hidden data 109 was sent. Transmission path 110 may include one or more networks, as shown in FIG. 2A. In FIG. 2A, network 212 may help support transmission path 110. For example, transmission path 110 may be the Internet, which is implemented by network 212; for example, transmission path 110 may be wireless using voice over Internet protocol, which is implemented by network 212. Transmission path 110 may include any combination of any of a direct connection, hand delivery, vocal delivery, one or more Local Area Networks (LANs), one or more Wide Area Networks (WANs), one or more phone networks, including paths under the ground via fiber optics cables and/or one or more wireless networks, and/or wireless inside and/or outside the earth's atmosphere.

Receiving machine 112 may be an information machine that handles information at the destination of an hidden data 109. Receiving machine 112 may be a computer, a phone, a telegraph, a router, a satellite, or another type of electronic device, a mechanical device, or other kind of machine that receives information. Receiving machine 112 may include one or more processors and/or specialized circuitry configured for handling information, such as hidden data 109. Receiving machine 112 may receive hidden data 109 from another source and/or reconstitute (e.g., extract) all or part of hidden data 109. Receiving machine 112 may implement any of the hiding processes described in this specification and is capable of extracting any message hidden by sending machine 102 and hding process 106.

In one embodiment, receiving machine 112 only receives hidden data 109 from transmission path 110, while hiding process 106 is implemented manually and/or by another information machine. In another embodiment, receiving machine 112 implements extraction process 116 that reproduces all or part of data 104, referred to as extracted data 114 in FIG. 1A. In another embodiment, receiving machine 112 receives hidden data 109 from transmission path 110, and reconstitutes all or part of extracted data 114 using extraction process 116. Extraction process 116 may store any of the processes of hiding information described in this specification. Extraction process 116 may include any of the hiding processes described in this specification Receiving machine 112 may be identical to sending machine 102. For example, receiving machine 112 may receive data 104 from another source, produce all or part of data 104, and/or implement hiding process 106. Similar to sending machine 102, receiving machine 112 may create keys and random noise and random data. Receiving machine 112 may transmit the output of extraction process 116, via transmission path 110 to another entity and/or receive hidden data 109 (via transmission path 110) from another entity. Receiving machine 112 may present hidden data 109 for use as input to extraction process 116.

10.2 Public Key Information System

In this specification, the term "public key" refers to any kind of public key used in public key cryptography. In an embodiment, "public key" refers to an RSA public key. In an embodiment, "public key" refers to an elliptic curve public key. In an embodiment, "public key" refers to a lattice public key. In an embodiment, "public key" refers to a Goppa code public key.

In this specification, the term "public key" is a type of information and is a value or collection of values to which one or more operations are performed. In some embodiments, one or more of these operations are cryptographic operations. $\{0, 1\}^n$ is the set of all bit-strings of length n. When a public key is represented with bits, mathematically a n-bit key is an element of the collection $\{0, 1\}^n$ which is the collection of strings of 0's and 1's of length n. For example, the string of 0's and 1's that starts after this colon is a 128-bit key: 01100001 11000110 01010011 01110001 11000101 10001110 11011001 11010101 01011001 01100100 10110010 10101010 01101101 10000111 10101011 00010111. In an embodiment, n=3000 so that a key is a string of 3000 bits.

In other embodiments, a public key may be a sequence of values that are not represented as bits. Consider the set {A, B, C, D, E}. For example, the string that starts after this colon is a 40-symbol key selected from the set {A, B, C, D, E}: ACDEB AADBC EAEBB AAECB ADDCB BDCCE ACECB EACAE. In an embodiment, a key could be a string of length n selected from $\{A, B, C, D, E\}^n$. In an embodiment, n=700 so that the key is a string of 700 symbols where each symbol is selected from {A, B, C, D, E}.

In some embodiments, hidden public key(s) 149 in FIG. 1C may be read as input by processor system 258 in FIG. 2B, that executes instructions which perform extraction process 156 in FIG. 1C. In some embodiments, hidden public key(s) 172 in FIG. 1D, may be read as input by processor system 258, that executes instructions which perform extraction process 156.

In some embodiments, public key(s) 144 are RSA public key(s), which is a well-known public key cryptography [50]. RSA is described from the perspective of Alice. Alice chooses two huge primes $p_A$ and $q_A$. Alice computes $n_A=p_A q_A$ and a random number $r_A$ which has no common factor with $(P_A-1)(q_A-1)$. In other words, 1 is the greatest common divisor of $r_A$ and $(p_A-1)(q_A-1)$. The Euler-phi function is defined as follows. If k=1, then $\phi(k)=1$; if k>1, then $\phi(k)$ is the number positive integers i such that i<k and i and k are relatively prime. Relatively prime means the greatest common divisor of i and k is 1. The positive integer $e_A$ is randomly selected such that $e_A$ is relatively prime to $\phi(n_A)$.

Alice computes $\phi(n_A)=n_A+1-p_A-q_A$. Alice computes the multiplicative inverse of $r_A$ modulo $\phi(n_A)$; the multiplicative inverse is $$d_A = e_A^{-1}$$

modulo $\phi(n_A)$. Alice makes public her public key $(n_A, r_A)$: that is, the two positive integers $(n_A, r_A)$ are Alice's public key.

In an embodiment, random generator 168 generates $r_1 \ldots r_p$ which is input to private key instructions 164. In an embodiment that hides RSA public keys, private key instruction 164 use $r_1 \ldots r_p$ to find two huge primes $p_A$ and $q_A$ and a random number $r_A$ relatively prime to $(P_A-1)(q_A-1)$.

In an embodiment, random generator 168 and private key instructions 164 generate two huge primes $p_A$ and $q_A$; compute $n_A=p_A q_A$; and randomly choose $e_A$ that is relatively prime to $\phi(n_A)$. In an embodiment, private key instructions 164 compute $$d_A = e_A^{-1}$$

modulo $\phi(n_A)$. In an embodiment, an RSA private key is $(n_A, d_A)$. In an embodiment that hides RSA public keys, public key instructions 166 compute RSA public key $(n_A, r_A)$. In an embodiment, positive integer $n_A$ is a string of 4096 bits and $r_A$ is a string of 4096 bits.

FIG. 1C shows an information system 140 for hiding public keys in a manner that is expected to be secure. In this specification, open public key will sometimes refer to a public key that has not yet been hidden and extracted public key will refer to a public key that was previously hidden and extracted from the noise. Information system 140 includes one or more private keys 103 and one or more corresponding public keys 144, and hiding process 146, a sending machine 142, hidden key(s) 149 and a transmission path 150, a receiving machine 152, extraction process 156, extracted public key(s) 154. In other embodiments, information system 140 may not have all of the components listed above or may have other components instead of and/or in addition to those listed above.

Information system 140 may be a system for transmitting hidden public key(s). Public key(s) 144 refers to information that has a purpose and that has not been hidden yet. In some embodiments, public key(s) 144 is intended to be delivered to another location, software unit, machine, person, or other entity.

In some embodiments, public key(s) 144 may serve as part of a key exchange that has not yet been hidden. In an embodiment, public key(s) 144 may be unhidden information before it is hidden and transmitted wirelessly between satellites. Public key(s) 144 may be represented in analog form in some embodiments and may be represented in digital form. In an embodiment, the public key(s) may be one or more RSA public keys based on huge prime numbers. In an another embodiment, the public key(s) may be one or more elliptic curve public keys, computed from an elliptic curve over a finite field.

In information system 140, noise helps hide public key(s) 144. Although they are public, it may be desirable to keep public key(s) 144 private or secret from Eve. For example, it is known that Shor's quantum computing algorithm can compute in polynomial time the corresponding private key of a RSA public key. As another example, an analogue of Shor's algorithm can compute in polynomial time the corresponding private key of an elliptic curve public key. If Eve has a quantum computer that computes enough qubits, then Eve could find the private key of an RSA public key that is disclosed to Eve and consequently breach the security of information system 140. One or more RSA public keys could be hidden in noise to protect them from Eve's quantum computer. Consequently, it may be desirable to hide public key(s) 144, so that the transmitted information is expected to be unintelligible to an unintended recipient should the unintended recipient attempt to read and/or extract the hidden public key(s) 149 transmitted. Public key(s) 144 may be a collection of multiple, not yet hidden blocks of information, an entire sequence of public keys, a segment of public keys, or any other portion of one or more public keys. When there is more than one public key, public keys 144 may be computed from distinct commutative groups, as described in section 10.16. For example, one commutative group may be based on an elliptic curve over a finite field; another commutative group may be based on multiplication modulo, as used in RSA.

Hiding process 146 may be a series of steps that are performed on public keys 144. In one embodiment, the term "process" refers to one or more instructions for sending machine 142 to execute the series of operations that may be stored on a machine-readable medium. Alternatively, the process may be carried out by and therefore refer to hardware (e.g., logic circuits) or may be a combination of instructions stored on a machine-readable medium and hardware that cause the operations to be executed by sending machine 142 or receiving machine 152. Public key(s) 144 may be input for hiding process 146. The steps that are included in hiding process 146 may include one or more mathematical operations and/or one or more other operations.

As a post-processing step, one-way hash function 948 may be applied to a sequence of random events such as quantum events (non-deterministic) generated by non-deterministic generator 942 in FIG. 9A. As a post-processing step, one-way hash function 948 may be applied to a sequence of random events such as quantum events (non-deterministic) generated by non-deterministic generator 952 in FIG. 9B.

In FIG. 1D hiding process 162 may implement hiding process 146 in FIG. 1C. In some embodiments, random generator 168 help generate noise that is used by scatter map instructions 170. In some embodiments, hiding process 162 requests random generator 168 and private key instructions 164 to help generate one or more private keys 103 that are used to compute public keys 144. In an embodiment, non-deterministic generator 942 (FIG. 9A) may be part of random generator 168. In an embodiment, non-deterministic generator 952 (FIG. 9B) may be part of random generator 168.

Sending machine 142 may be an information machine that handles information at or is associated with a first location, software unit, machine, person, sender, or other entity. Sending machine 142 may be a computer, a phone, a mobile phone, a telegraph, a satellite, or another type of electronic device, a mechanical device, or other kind of machine that sends information. Sending machine 142 may include one or more processors and/or may include specialized circuitry for handling information. Sending machine 142 may receive public key(s) 144 from another source (e.g., a transducer such as a microphone which is inside mobile phone 402 or 502 of FIG. 4), may produce all or part of public key(s) 144, may implement hiding process 146, and/or may transmit the output to another entity. In another embodiment, sending machine 142 receives public key(s) 144 from another source, while hiding process 146 and the delivery of the output of hiding process 146 are implemented manually. In another embodiment, sending machine 142 implements hiding process 146, having public key(s) 144 entered, via a keyboard (for example) or via a mobile phone microphone, into sending machine 142. In another embodiments, sending machine 142 receives output from hiding process 146 and sends the output to another entity.

Sending machine 142 may implement any of the hiding processes described in this specification. Hiding process 146 may include any of the hiding processes described in this specification. For example, hiding process 146 may implement any of the embodiments of the hiding processes 3 in section 10.7 and processes 10, 11 in section 10.17.

In some embodiments, hiding process 162, shown in FIG. 1D, generates one or more private keys $p_1, \ldots p_m$ from private key instructions 164 and random generator 168; computes one or more public keys $k_1, \ldots k_m$ with public key instructions 166; and scatter map instructions 170 hide one or public keys in noise $r_1 \ldots r_p$ generated from random generator 168.

Transmission path 150 is the path taken by hidden public key(s) 149 to reach the destination to which hidden public key(s) 149 was sent. Transmission path 150 may include one or more networks, as shown in FIG. 2A. In FIG. 2A, network 212 may help support transmission path 150. For example, transmission path 150 may be the Internet, which is implemented by network 212; for example, transmission path 150 may be wireless using voice over Internet protocol, which is implemented by network 212. Transmission path 150 may include any combination of any of a direct connection, hand delivery, vocal delivery, one or more Local Area Networks (LANs), one or more Wide Area Networks (WANs), one or more phone networks, including paths under the ground via fiber optics cables and/or one or more wireless networks, and/or wireless inside and/or outside the earth's atmosphere.

Receiving machine 152 may be an information machine that handles information at the destination of an hidden public key(s) 149. Receiving machine 152 may be a computer, a phone, a telegraph, a router, a satellite, or another type of electronic device, a mechanical device, or other kind of machine that receives information. Receiving machine 152 may include one or more processors and/or specialized circuitry configured for handling information, such as hidden public key(s) 149. Receiving machine 152 may receive hidden public key(s) 149 from another source and/or reconstitute (e.g., extract) all or part of hidden public key(s) 149. Receiving machine 152 may implement any of the hiding processes described in this specification and is capable of extracting any message hidden by sending machine 142 and hiding process 146.

In one embodiment, receiving machine 152 only receives hidden public key 149 from transmission path 150, while hiding process 146 is implemented manually and/or by another information machine. In another embodiment, receiving machine 152 implements extraction process 156 that reproduces all or part of public key(s) 144, referred to as extracted public key(s) 154 in FIG. 1C. In another embodiment, receiving machine 152 receives hidden public key(s) 149 from transmission path 150, and reconstitutes all or part of extracted public key(s) 154 using extraction process 156. Extraction process 156 may store any of the processes of hiding information described in this specification. Extraction process 156 may include any of the hiding processes described in this specification Receiving machine 152 may be identical to sending machine 142. For example, receiving machine 152 may receive 144 from another source, produce all or part of public key(s) 144, and/or implement hiding process 146. Similar to sending machine 142, receiving machine 152 may create keys and random noise and random public key(s). Receiving machine 152 may transmit the output of extraction process 156, via transmission path 150 to another entity and/or receive hidden public key(s) 149 (via transmission path 150) from another entity. Receiving machine 152 may present hidden public key(s) 149 for use as input to extraction process 156.

10.3 PROCESSOR, MEMORY and INPUT/OUTPUT HARDWARE

Information system 200 illustrates some of the variations of the manners of implementing information system 100. Sending machine 202 is one embodiment of sending machine 101. Sending machine 202 may be a secure USB memory storage device as shown in 3A. Sending machine 202 may be an authentication token as shown in FIG. 3B. A mobile phone embodiment of sending machine 202 is shown in FIG. 4.

Sending machine 202 or sending machine 400 may communicate wirelessly with computer 204. In an embodiment, computer 204 may be a call station for receiving hidden data 109 from sending machine 400. A user may use input system 254 and output system 252 of sending machine (mobile phone) 400 to transmit hidden voice data or hidden metadata to a receiving machine that is a mobile phone. In an embodiment, input system 254 in FIG. 2B includes a microphone that is integrated with sending machine (mobile phone) 400. In an embodiment, output system 252 in FIG. 2B includes a speaker that is integrated with sending machine (mobile phone) 400. In another embodiment, sending machine 202 is capable of being plugged into and communicating with computer 204 or with other systems via computer 204.

Computer 204 is connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Network 212 and system 214, 216, 218, and 220 may represent Internet servers or nodes that route hidden data (e.g., hidden voice data or hidden metadata) received from sending machine 400 shown in FIG. 4. In FIG. 2A, system 214, 216, 218, and system 220 and network 212 may together serve as a transmission path 110 for hidden data 109. In an embodiment, system 214, 216, 218, and system 220 and network 212 may execute the Internet protocol stack in order to serve as transmission path 110 for hidden data 109. In an embodiment, hidden data 109 may be voice data. In an embodiment, hidden data 109 may be routing data. In an embodiment, hidden data 109 may be TCP/IP data. In an embodiment, hidden data 109 may be metadata. In an embodiment, hidden data 109 may be email. In an embodiment, hidden data 109 may be text data sent from sending machine 400.

In FIG. 1B, hiding process 122 may be implemented by any of, a part of any of, or any combination of any of system 210, network 212, system 214, system 216, system 218, and/or system 220. As an example, routing information of transmission path 110 may be hidden with hiding process 122 that executes in system computer 210, network computers 212, system computer 214, system computer 216, system computer 218, and/or system computer 220. Hiding process 106 may be executed inside sending machine 400 and extraction process 116 may be executed inside receiving machine 400 in FIG. 4.

In an embodiment, hiding process 106 and extraction process 116 execute in a secure area of processor system 258 of FIG. 2B. In an embodiment, specialized hardware in processor system 258 may be implemented to speed up the computation of scatter map instructions 130 in FIG. 1B. In an embodiment, this specialized hardware in processor system 258 may be embodied as an ASIC (application specific integrated circuit) that computes SHA-1 and/or SHA-512 and/or Keccak and/or BLAKE and/or JH and/or Skein that help execute one-way hash function 948 in non-deterministic generator 942 or one-way hash function 958 in non-deterministic generator 952 or one-way hash instructions 964 in deterministic generator 962.

In an embodiment, specialized hardware in processor system 258 may be embodied as an ASIC (application specific integrated circuit) that computes SHA-1 and/or SHA-512 and/or Keccak and/or BLAKE and/or JH and/or Skein that help execute the HMAC function in process 6 named Hiding One or More Keys with Authentication or help execute process 7 named Hiding Encrypted Data Elements with Authentication. An ASIC chip can increase the execution speed and protect the privacy of hiding process 106 and extraction process 116.

In an embodiment, input system 254 of FIG. 2B receives voice data and sends the voice data to processor system 258 where the voice data or voice metadata is hidden. Output system 252 sends the hidden voice data 109 to a telecommunication network 212. In an embodiment, memory system 256 stores scatter map instructions 130, data transformation instructions 126, and cipher instructions 129.

In an embodiment, memory system 256 of FIG. 2B stores scatter map instructions 132. In an embodiment, memory system 256 stores hidden data or hidden metadata that is waiting to be sent to output system 252 and sent out along transmission path 110, routed and served by system computers 210, 214, 216, 218 and 220 and network 212.

10.4 One-Way Hash Functions

In FIG. 9A, 9B, 9C, or 9D, one-way hash function 948, 958, 964, or 984 may include one or more one-way functions. A one-way hash function Φ, has the property that given an output value z, it is computationally intractable to find an information element $m_z$ such that $\Phi(m_z)=z$. In other words, a one-way function Φ is a function that can be easily computed, but that its inverse $\Phi^{-1}$ is computationally intractable to compute. A computation that takes $10^{101}$ computational steps is considered to have computational intractability of $10^{101}$.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years.

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [51]. If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars). Thus, C(2014)×1 year is less than $10^9 \times 33 \times 10^{15} \times 3600 \times 24 \times 365 = 1.04 \times 10^{33}$ computational steps.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a family wishes to keep their child's whereabouts unknown to violent kidnappers. Suppose T=100 years because it is about twice their expected lifetimes. Then 100 years×C(2064) is a better measure of computationally intractible for this application. In other words, for critical applications that are beyond an economic value, one should strive for a good estimate of the world's computing power.

One-way functions that exhibit completeness and a good avalanche effect or the strict avalanche criterion [52] are preferable embodiments: these properties are favorable for one-way hash functions. The definition of completeness and a good avalanche effect are quoted directly from [52]:

> If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and f(X) and $f(X_i)$ differ at least in bit j for all $\{(i, j): 1 \le i, j \le n\}$, the function of must be complete.
>
> For a given transformation to exhibit the avalanche effect, an average of one half of the output bits should change whenever a single input bit is complemented. In order to determine whether a m×n (m input bits and n output bits) function f satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i=f(X)\oplus f(X_i)$ must be calculated. These exclusive-or sums will be referred to as avalanche vectors, each of which contains n bits, or avalanche variables.
>
> If this procedure is repeated for all i such that $1 \le i \le m$ and one half of the avalanche variables are equal to 1 for each i, then the function f has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors $V_i$. If approximately one half the resulting avalanche variables are equal to 1 for values of i, then we can conclude that the function has a good avalanche effect.

A hash function, also denoted as Φ, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, Φ(m), which is the message digest or information digest. Typical output sizes range from 160 to 512 bits, but can also be larger. An ideal hash function is a function Φ, whose output is uniformly distributed in the following way: Suppose the output size of Φ is n bits. If the message m is chosen randomly, then for each of the $2^n$ possible outputs z, the probability that Φ(m)=z is $2^{-n}$. In an embodiment, the hash functions that are used are one-way.

A good one-way hash function is also collision resistant. A collision occurs when two distinct information elements are mapped by the one-way hash function Φ to the same digest. Collision resistant means it is computationally intractable for an adversary to find collisions: more precisely, it is computationally intractable to find two distinct information elements $m_1$, $m_2$ where $m_1 \ne m_2$ and such that $\Phi(m_1)=\Phi(m_2)$.

A number of one-way hash functions may be used to implement one-way hash function 148. In an embodiment, SHA-512 can implement one-way hash function 148, designed by the NSA and standardized by NIST [53]. The message digest size of SHA-512 is 512 bits. Other alternative hash functions are of the type that conform with the standard SHA-384, which produces a message digest size of 384 bits. SHA-1 has a message digest size of 160 bits. An embodiment of a one-way hash function 148 is Keccak [54]. An embodiment of a one-way hash function 148 is BLAKE [55]. An embodiment of a one-way hash function 148 is Grøstl [56]. An embodiment of a one-way hash function 148 is JH [57]. Another embodiment of a one-way hash function is Skein [58].

10.5 Non-Deterministic Generators

FIG. 9A shows an embodiment of a non-deterministic generator 942 arising from quantum events: that is, in some embodiments random generator 128 in FIG. 1B uses the emission and absorption of photons for its non-determinism. In FIG. 9A, phototransistor 944 absorbs photons emitted from light emitting diode 954. In an embodiment, the photons are produced by a light emitting diode 946. In FIG. 9B, non-deterministic generator 952 has a photodiode 954 that absorbs photons emitted from light emitting diode 956. In an embodiment, the photons are produced by a light emitting diode 956.

FIG. 10 shows a light emitting diode (LED) 1002. In an embodiment, LED 1002 emits photons and is part of the non-deterministic generator 942 (FIG. 9A). In an embodiment, LED 1002 emits photons and is part of the non-deterministic generator 952 (FIG. 9B). LED 1002 contains a cathode, a diode, an anode, one terminal pin connected to the cathode and one terminal pin connected to the anode, a p-layer of semiconductor, an active region, an n-layer of semiconductor, a substrate and a transparent plastic case. The plastic case is transparent so that a photodetector outside the LED case can detect the arrival times of photons emitted by the LED. In an embodiment, photodiode 944 in FIG. 9A absorbs photons emitted by LED 1002. In an embodiment, phototransistor 954 in FIG. 9B absorbs photons emitted by LED 1002.

The emission times of the photons emitted by the LED experimentally obey the energy-time form of the Heisenberg uncertainty principle. The energy-time form of the Heisenberg uncertainty principle contributes to the non-determinism of random noise generator 142 because the photon emission times are unpredictable due to the uncertainty principle. In FIG. 9A and FIG. 9B, the arrival of photons are indicated by a squiggly curve with an arrow and hu next to the curve. The detection of arrival times of photons is a non-deterministic process. Due to the uncertainty of photon emission, the arrival times of photons are quantum events.

In FIG. 9A, hv refers to the energy of a photon that arrives and is absorbed at photodiode 944 where h is Planck's constant and v is the frequency of the photon. In FIG. 9B, hv refers to the energy of a photon that arrives and is absorbed at phototransistor 954. In FIG. 9A, the p and n semiconductor layers are a part of a phototransistor 944, which generates and amplifies electrical current, when photons (light) are absorbed by the phototransistor. In FIG. 9B, the p and n semiconductor layers are a part of a photodiode 954, which absorbs photons that arrive at photodiode 954.

FIG. 20 shows a 3-bit counter 2000, built from T flip-flops that acts as a quantum random number generator. Three random bits are generated from the three flip-flop outputs, labeled $r_0$, $r_1$, $r_2$. Pulsing LED 2040 generates pulses of one or more photons that are emitted and reach Photon Detector 2030. The dashed arrow from Pulsing LED 2040 to Photon Detector 2030 represents the emission of one or more photons. Photon detector 2030 can absorb one or more photons emitted by Pulsing LED 2040. The absorption of the one or more photons by Photon Detector 2030, increases the energy (e.g., joules) and the output of Photon Detector 2030 is a change in the voltage on the lines connected to the clock input (CLK) of the three flip-flops. A state change in a flip-flop can occur if the HIGH 2010 line is a high voltage at the same time that the voltage from the Photon Detector 2030 is high. In some embodiments, a high voltage is 3.3 volts for a T flip-flop. In some embodiments a high voltage is 5 volts. In other embodiments, a high voltage is another voltage distinct from 3.3 volts or 5 volts. In an embodiment, LED 1002 in FIG. 1002 is a component of Pulsing LED 2040. In an embodiment, Pulsing LED 2040 has a special circuit to cause the amount of power into LED 1002 to fluctuate, causing pulses of photons to emitted from Pulsing LED 2040.

FIG. 21 shows an LED flip-flop circuit 2100 that generates n random bits $r_0, r_1, r_2, \ldots, r_{n-1}$. In an embodiment, n=1. In another embodiment n=2, 3, 4, 5, 6, 7, or 8. In another embodiment n=16. In another embodiment n=32. In another embodiment n=64. In another embodiment n=128. In FIG. 21, the dashed arrow from Pulsing LED 2140 to Photon Detector 2130 represents the emission of one or more photons. Photon detector 2130 can absorb one or more photons emitted by Pulsing LED 2040. Pulsing LED 2140 emits one or more photons that are absorbed by Photon Detector 2130. Pulsing LED 2140 and Photon Detector 2130 change the voltage or state in one or more of the flip flops in flip-flop circuit 2150. This change in voltage or state generates the random bits at outputs $r_0$ 2160, $r_1$ 270, and $r_{n-1}$.

In an embodiment of LED flip-flop circuit 2100 in FIG. 21, LED 1002 in FIG. 1002 is a component of Pulsing LED 2120. In an embodiment, Pulsing LED 2140 in FIG. 21 has a special circuit to cause the amount of power into LED 1002 to fluctuate, causing pulses of photons to be emitted from Pulsing LED 2140 that are absorbed by Photon Detector 2130. In an embodiment, flip-flop circuit 2150 has one or more D flip-flops. An embodiment of a D flip-flop is show in FIG. 19. In an embodiment, flip-flop circuit 2150 has one or more T flip-flops.

A photodiode is a semiconductor device that converts light (photons) into electrical current, which is called a photocurrent. The photocurrent is generated when photons are absorbed in the photodiode. Photodiodes are similar to standard semiconductor diodes except that they may be either exposed or packaged with a window or optical fiber connection to allow light (photons) to reach the sensitive part of the device. A photodiode may use a PIN junction or a p-n junction to generate electrical current from the absorption of photons. In some embodiments, the photodiode may be a phototransistor.

A phototransistor is a semiconductor device comprised of three electrodes that are part of a bipolar junction transistor. Light or ultraviolet light activates this bipolar junction transistor. Illumination of the base generates carriers which supply the base signal while the base electrode is left floating. The emitter junction constitutes a diode, and transistor action amplifies the incident light inducing a signal current.

When one or more photons with high enough energy strikes the photodiode, it creates an electron-hole pair. This phenomena is a type of photoelectric effect. If the absorption occurs in the junction's depletion region, or one diffusion length away from the depletion region, these carriers (electron-hole pair) are attracted from the PIN or p-n junction by the built-in electric field of the depletion region. The electric field causes holes to move toward the anode, and electrons to move toward the cathode; the movement of the holes and electrons creates a photocurrent. In some embodiments, the amount of photocurrent is an analog value, which can be digitized by a analog-to-digital converter. In some embodiments, the analog value is amplified before being digitized. The digitized value is what becomes the random noise. In some embodiments, a one-way hash function 948 in FIG. 9A or 958 in FIG. 9B. may also be applied to post-process the random noise to produce the noise $r_1 r_2 \ldots r_p$ used by processes 1, 3, 5 6 and 7. In some embodiments, a one-way hash function may be applied to the random noise to produce key(s) $k_1 k_2 \ldots k_m$, used by processes 3 and 6.

In an embodiment, the sampling of the digitized photocurrent values may converted to threshold times as follows. A photocurrent threshold θ is selected as a sampling parameter. If a digitized photocurrent value $i_1$ is above θ at time $t_1$, then $t_1$ is recorded as a threshold time. If the next digitized photocurrent value $i_2$ above θ occurs at time $t_2$, then $t_2$ is recorded as the next threshold time. If the next digitized value $i_3$ above θ occurs at time $t_3$, then $t_3$ is recorded as the next threshold time.

After three consecutive threshold times are recorded, these three times can determine a bit value as follows. If $t_2-t_1>t_3-t_2$, then random noise generator produces a 1 bit. If $t_2-t_1<t_3-t_2$, then random noise generator produces a 0 bit. If $t_2-t_1=t_3-t_2$, then no noise information is produced. To generate the next bit, random noise generator 942 or 952 continues the same sampling steps as before and three new threshold times are produced and compared.

In an alternative sampling method, a sample mean μ is established for the photocurrent, when it is illuminated with photons. In some embodiments, the sampling method is implemented as follows. Let $i_1$ be the photocurrent value sampled at the first sampling time. $i_1$ is compared to μ. ε is selected as a parameter in the sampling method that is much smaller number than μ. If $i_1$ is greater than μ+ε, then a 1 bit is produced by the random noise generator 942 or 952. If $i_1$ is less than μ−ε, then a 0 bit is produced by random noise generator 942 or 952. If $i_1$ is in the interval [μ−ε, μ+ε], then NO bit is produced by random noise generator 942 or 952.

Let $i_2$ be the photocurrent value sampled at the next sampling time. $i_2$ is compared to μ. If $i_2$ is greater than μ+ε, then a 1 bit is produced by the random noise generator 942 or 952. If $i_2$ is less than μ−ε, then a 0 bit is produced by the random noise generator 942 or 952. If it is in the interval [μ−ε, μ+ε], then NO bit is produced by the random noise generator 942 or 952. This alternative sampling method continues in the same way with photocurrent values $i_3$, $i_4$, and so on. In some embodiments, the parameter ε is selected as zero instead of a small positive number relative to μ.

Some alternative hardware embodiments of non-deterministic generator 128 (FIG. 1B) are described below. In some embodiments that utilize non-determinism to produce random noise, a semitransparent mirror may be used. In some embodiments, the mirror contains quartz (glass). The photons that hit the mirror may take two or more paths in space. In one embodiment, if the photon is reflected, then the random noise generator creates the bit value b∈{0, 1}; if the photon is transmitted, then the random noise generator creates the other bit value 1−b. In another embodiment, the spin of an electron may be sampled to generate the next non-deterministic bit. In still another embodiment of a random noise generator, a protein, composed of amino acids, spanning a cell membrane or artificial membrane, that has two or more conformations can be used to detect non-determinism: the protein conformation sampled may be used to generate a random noise value in {0, . . . n−1} where the protein has n distinct conformations. In an alternative embodiment, one or more rhodopsin proteins could be used to detect the arrival times $t_1<t_2<t_3$ of photons and the differences of arrival times ($t_2-t_1>t_3-t_2$ versus $t_2-t_1<t_3-t_2$) could generate non-deterministic bits that produce random noise.

In some embodiments, the seek time of a hard drive can be used as random noise values as the air turbulence in the hard drive affects the seek time in a non-deterministic manner. In some embodiments, local atmospheric noise can be used as a source of random noise. For example, the air pressure, the humidity or the wind direction could be used. In other embodiments, the local sampling of smells based on particular molecules could also be used as a source of random noise.

In some embodiments, a Geiger counter may be used to sample non-determinism and generate random noise. In these embodiments, the unpredictability is due to radioactive decay rather than photon emission, arrivals and detection.

10.6 Deterministic Generators

In an embodiment, a deterministic generator 962 (FIG. 9C) is implemented with a machine. In an embodiment, machine 1 generates noise 972 as follows. Φ is one-way hash function with digest size d and is executed with one-way hash instructions 964. In some embodiments, Ψ is a one-way hash function with digest size at least ρ bits (noise size) and is executed with one-way hash instructions 968. In some embodiments, if ρ is greater than digest size of Ψ, then the generator update steps in machine 1 may be called more than once to generate enough noise.

In some embodiments, Φ and Ψ are the same one-way hash functions. In other embodiments, Φ and Ψ are different one-way hash functions. In an embodiment, Φ is one-way hash function SHA-512 and Ψ is one-way hash function Keccak. In another embodiment, Φ is one-way hash function Keccak and Ψ is one-way hash function SHA-512.

In an embodiment, the ith generator Δ(i) is composed of N bits and updated with generator update instructions 966. The N bits of Δ(i) are represented as $\Delta_{i,0}\,\Delta_{i,1} \ldots \Delta_{i,N-1}$ where each bit $\Delta_{i,j}$ is a 0 or 1. In an embodiment, generator update instructions 966 are executed according to the following two steps described in machine 1:

Update $(\Delta_{i+1,0}\,\Delta_{i+1,1} \ldots \Delta_{i+1,d-1}) = \Phi(\Delta_{i,0}\,\Delta_{i,1} \ldots \Delta_{i,d-1})$
Update $\Delta_{i+1,j} = \Delta_{i,j}$ for each j satisfying $d \le j \le N-1$ In an embodiment, the size of the deterministic generator N may be 1024. In another embodiment, N may be fifty thousand. In another embodiment, N may be ten billion.

In an embodiment, one-way hash instructions 964 are performed by processor system 258 (FIG. 1B). In an embodiment, one-way hash instructions 968 are performed by processor system 258 (FIG. 1B). In an embodiment, generator update instructions 966 are performed by processor system 258 (FIG. 1B). In an embodiment, memory system 256 stores one-way hash instructions 964, one-way hash instructions 968 and generator update instructions 966.

In an embodiment, the instructions that execute machine 1 and help execute deterministic generator 962 may expressed in the C programming language before compilation. In an embodiment, the instructions that execute machine 1 and help execute deterministic generator 962 may be expressed in the native machine instructions of processor system 258. In an embodiment, the instructions that execute machine 1 may be implemented as an ASIC, which is part of processor system 258.

Machine 1. Generating Noise with a Machine

```
0th generator state Δ(0) = Δ_{0,0} . . . Δ_{0,N-1}.
Initialize i = 0
while( hiding process 122 requests more noise )
{
  Update (Δ_{i+1,0} Δ_{i+1,1} . . . Δ_{i+1,d-1}) = Φ (Δ_{i,0} Δ_{i,1} . . . Δ_{i,d-1})
  Update Δ_{i+1,j} = Δ_{i,j} for each j satisfying d ≤ j ≤ N − 1
  Increment i
  Generate noise 972 r_1 r_2 . . . r_ρ by executing one-way hash Ψ
  instructions 968 on
  generator state Δ(i) as input to Ψ, where noise r_1 r_2 . . . r_ρ is
  the first ρ bits of hash output Ψ(Δ_{i,0} . . . Δ_{i,N-1}).
}
```

In an embodiment, machine 2 generates key(s) 970 as follows. Φ is one-way hash function with digest size d and is executed with one-way hash instructions 964. In some embodiment, $\Psi$ is a one-way hash function with digest size at least m bits (size of one or more keys) and is executed with one-way hash instructions 968. In some embodiments, if m is greater than digest size of $\Psi$, then the generator update steps in machine 2 may be called more than once to generate enough keys.

In some embodiments, $\Phi$ and $\Psi$ are the same one-way hash functions. In other embodiments, $\Phi$ and $\Psi$ are different one-way hash functions. In an embodiment, $\Phi$ is one-way hash function SHA-512 and $\Psi$ is one-way hash function Keccak. In another embodiment, $\Phi$ is one-way hash function Keccak and $\Psi$ is one-way hash function SHA-512.

In an embodiment, the ith generator $\Delta(i)$ is composed of N bits and updated with generator update instructions 966. The N bits of $\Delta(i)$ are represented as $\Delta_{i,0}\,\Delta_{i,1}\ldots\Delta_{i,N-1}$ where each bit $\Delta_{i,j}$ is a 0 or 1. In an embodiment, generator update instructions 966 are executed according to the following two steps described in machine 2:

Update $(\Delta_{i+1,0}\,\Delta_{i+1,1}\ldots\Delta_{i+1,d-1}) = \Phi(\Delta_{i,0}\,\Delta_{i,1}\ldots\Delta_{i,d-1})$
Update $\Delta_{i+1,j} = \Delta_{i,j}$ for each j satisfying $d \le j \le N-1$ In an embodiment, the size of the deterministic generator N may be 1024. In another embodiment, N may be fifty thousand. In another embodiment, N may be ten billion.

In an embodiment, one-way hash instructions 964 are performed by processor system 258 (FIG. 1B). In an embodiment, one-way hash instructions 968 are performed by processor system 258 (FIG. 1B). In an embodiment, generator update instructions 966 are performed by processor system 258 (FIG. 1B). In an embodiment, memory system 256 stores one-way hash instructions 964, one-way hash instructions 968 and generator update instructions 966.

In an embodiment, the instructions that execute machine 2 and help execute deterministic generator 962 may expressed in the C programming language before compilation. In an embodiment, the instructions that execute machine 2 and help execute deterministic generator 962 may be expressed in the native machine instructions of processor system 258. In an embodiment, the instructions that execute machine 2 may be implemented as an ASIC, which is part of processor system 258. In an embodiment, memory system 956 may store one or more keys 970.

Machine 2. Generating One or More Keys with a Machine

```
0th generator state Δ(0) = Δ_{0,0} . . . Δ_{0,N-1}.
Initialize i = 0
while( hiding process 122 requests more key(s) )
{
  Update generator (Δ_{i+1,0} Δ_{i+1,1} . . . Δ_{i+1,d-1}) = Φ(Δ_{i,0} Δ_{i,1} . . . Δ_{i,d-1}).
  Update generator Δ_{i+1,j} = Δ_{i,j} for each j satisfying d ≤ j ≤ N − 1
  Increment i
  Generate key(s) 970 k_1 k_2 . . . k_m by executing one-way hash Ψ
  instructions 968 on generator state Δ(i) as input to Ψ, where
  k_1 k_2 . . . k_m is the first m bits of hash output Ψ(Δ_{i,0} . . . Δ_{i,N-1}).
}
```

10.7 Scatter Map Hiding

A scatter map is a function that permutes data (information) to a sequence of distinct locations inside the random noise. To formally define a scatter map, the location space is defined first.

Definition 1.

Let $m, n \in \mathbb{N}$, where $m \le n$. The set $\mathcal{L}_{m,n}=\{(l_1, l_2 \ldots l_m) \in \{1, 2, \ldots n\}^m : l_j \ne l_k$ whenever $j \ne k\}$ is called an (m, n) location space.

Remark 1.

The location space $\mathcal{L}_{m,n}$ has $$\frac{n!}{(n-m)!}$$

elements.

Definition 2.

Given a location element $(l_1, l_2 \ldots l_m) \in \mathcal{L}_{m,n}$, the noise locations with respect to $(l_1, l_2 \ldots l_m)$ are denoted as $\mathcal{N}(l_1, l_2, l_m)=\{1, 2, \ldots, n\}-\{l_i : 1 \le i \le m\}$.

Definition 3.

An (m, n) scatter map with $m \le n$ is an element $\pi=(l_1, l_2 \ldots l_n) \in L_{n,n}$ such that $\pi: \{0,1\}^m \times \{0,1\}^{n-m} \rightarrow \{0, 1\}^n$ and $\pi(d_1, \ldots, d_m, r_1, r_2 \ldots r_{n-m})=(s_1, \ldots s_n)$ where the hiding locations $s_i$ are selected as follows. Set $s_{l1}=d_1$ $s_{l2}=d_2 \ldots s_{lm}=d_m$. For the noise locations, set $s_{i1}=r_1$ for the smallest subscript $i_l \in \mathcal{N}(\pi)$. Set $s_{ik}=r_k$ for the kth smallest subscript $i_k \in \mathcal{N}(\pi)$.

Definition 3 describes how the scatter map selects the hiding locations of the parts of the key or data hidden in the noise. Furthermore, the scatter map process stores the noise in the remaining locations that do not contain parts of the key or data. Before the scatter map process begins, it is assumed that an element $\pi \in \mathcal{L}_{m,n}$ is randomly selected with a uniform distribution and Alice and Bob already have secret scatter map $\pi=(l_1, l_2 \ldots l_m)$.

Hiding Process 1. Scatter Map Process Hides Data before Transmitting

Alice retrieves data $d_1\, d_2 \ldots d_m$.

Alice generates noise $r_1\, r_2 \ldots r_\rho$ with her random noise generator.

Per definition 3, Alice uses scatter map $\pi$ to store her data $s_{l1}=d_1 \ldots s_{lm}=d_m$.

Per definition 3, Alice stores the noise in the noise (unoccupied) locations of $\mathcal{S}=(s_1 \ldots s_n)$ so that the data $d_1 d_2 \ldots d_m$ is hidden in the noise.

Alice sends S to Bob.

Bob receives S.

Bob uses scatter map m to extract data $d_1 \ldots d_m$ from S.

In an embodiment of process 1, scatter map $\pi$ is executed by scatter map instructions 130 (FIG. 1B) and these instructions follow definition 3. In FIG. 2B, processor system 258 executes scatter map process instructions 130 during the step Alice uses scatter map $\pi$ to store her data $s_{l1}=d_1 \ldots s_{lm}=d_m$. In an embodiment, scatter map process instructions 130 are stored in memory system 256 (FIG. 2B). In FIG. 2B, processor system 258 executes scatter map process instructions 130 during the step Alice stores the noise in the noise (unoccupied) locations of $S=(s_1 \ldots s_n)$ so that the data $d_1 d_2 \ldots d_m$ is hidden in the noise.

In an embodiment of process 1, output system 252 in FIG. 2B is used during the step Alice sends S to Bob. Output system 252 is part of sending machine 102 in FIG. 1A. In an embodiment of process 1, input system 254 in FIG. 2B is used during the step Bob receives S. Input system 254 is a part of receiving machine 112 in FIG. 1A.

In an alternative embodiment, Alice (first party) hides data inside noise so that she can protect its confidentiality and retrieve it at a later time. In an embodiment, hidden data 186 of FIG. 1E is stored on memory system that is served by the Internet cloud 212 of computers 210, 214, 216, 218, 220.

Hiding Process 2. Scatter Map Process Hides Data before Storing

Alice retrieves data $d_1\ d_2 \ldots d_m$.

Alice generates noise $r_1\ r_2 \ldots r_\rho$ with her random noise generator.

Per definition $\mathfrak{z}$, Alice uses scatter map π to store her data $s_{l1}=d_1 \ldots s_{lm}=d_m$.

Per definition $\mathfrak{z}$, Alice stores the noise in the noise (unoccupied) locations of $S=(s_1 \ldots s_n)$ so that the data $d_1d_2 \ldots d_m$ is hidden in the noise.

Alice sends S to memory.

system.

In hiding process 2, storing machine 180, as shown in FIG. 1E, executes hiding process 184 to hide data 182 and stores the hidden data 186 in memory system 188. In an embodiment, memory system 188 is implemented in hardware memory device 202 of FIG. 2A. Memory device 202 is also shown in FIG. 3A. In an embodiment, memory system 188 is part of mobile phone 400 in FIG. 400. In an embodiment, hidden data 186 is stored in memory system 188, which is implemented in the Internet cloud 212 of computers 210, 214, 216, 218, 220, as shown in FIG. 2A.

Hiding Process 3. Scatter Map Process Hides One or More Keys

Alice generates one or more keys $k_1\ k_2 \ldots k_m$ with her random noise generator and random noise $r_1\ r_2 \ldots r_\rho$.

Per definition $\mathfrak{z}$, Alice stores one or more keys $s_{l1}=k_1 \ldots s_{lm}=k_m$ using scatter map π.

Per definition $\mathfrak{z}$, Alice stores the noise $r_1\ r_2 \ldots r_\rho$ in the noise (unoccupied) locations of $\mathcal{S}=(s_1 \ldots s_n)$ so that the one or more keys $k_1k_2 \ldots k_m$ are hidden in the noise.

Alice sends S to Bob.

Bob receives S.

Bob uses scatter map π to extract one or more keys $k_1 \ldots k_m$ from S.

In an embodiment of process 3, scatter map π is executed by scatter map instructions 130 (FIG. 1B) and these instructions follow definition 3. In FIG. 2B, processor system 258 executes scatter map process instructions 130 during the step Alice stores one or more keys $s_{l1}=k_1 \ldots s_{lm}=k_m$ using scatter map π. In an embodiment, scatter map process instructions 130 are stored in memory system 256 (FIG. 2B). In FIG. 2B, processor system 258 executes scatter map process instructions 130 during the step Alice stores the noise $r_1\ r_2 \ldots r_\rho$ in the noise (unoccupied) locations of $S=(s_1 \ldots s_n)$ so that the one or more keys $k_1k_2 \ldots h_m$ are hidden in the noise. In FIG. 2B, processor system 258 executes scatter map process instructions 130 during the step Bob uses scatter map m to extract one or more keys $k_1 \ldots k_m$ from S.

In an embodiment of process 3, output system 252 is used during the step Alice sends S to Bob. Output system 252 is part of sending machine 102 in FIG. 1A. In an embodiment of process 3, input system 254 is used during the step Bob receives S. Input system 254 is a part of receiving machine 112 in FIG. 1A.

When the scatter size is n, process 1 takes n steps to hide the data inside the noise. When the scatter size is n, process 3 takes n steps to hide one or more keys inside the noise. When the bit-rate of a random noise generator is r bits per second, then a transmission with scatter size r bits is practical. When x=10,000, a key size of 2000 bits and noise size of 8000 bits is feasible. When x=20,000, a data size of 5000 bits and noise size of 1500 bits is feasible. In some applications, Alice and Bob may also establish the key size or data size m as a shared secret, where m is not disclosed to Eve.

In the interests of being conservative about the security, the mathematical analysis in section 10.11 assumes that Eve knows the data or key size m. For applications where Eve doesn't know m, the security will be stronger than the results obtained in the upcoming sections.

10.8 MULTIPLE HIDINGS of DATA TRANSMISSIONS or STORINGS

This section analyzes the mathematics of when a scatter map is safest to reuse for multiple, hidings of data transmissions or hidings of data stored. Suppose that scatter map $\pi \in \mathcal{L}_{m,n}$ is established with Alice and Bob, according to a uniform probability distribution and adversary Eve has no information about π. Before Eve sees Alice's first scatter storage or first scatter transmission from Alice to Bob, from Eve's perspective, the probability $$P(\pi = (l_1, l_2 \ \ldots \ l_m)) = \frac{(n-m)!}{n!}$$

for each $(l_1, l_2 \ldots l_m)$ in $\mathcal{L}_{m,n}$: in other words, Eve has zero information about π with respect to $\mathcal{L}_{m,n}$.

Rule 1. The Noise and Data (Machine Instruction) have the Same Bias

The noise and data (machine instruction) satisfy the same bias property if the probability distribution of the noise and and the probability distribution of the data are the same. In an embodiment, the data is a machine instruction. In an embodiment, the noise is generated by non-deterministic generator 942 and has two outcomes (binary) and each outcome has probability ½; and each indivisible unit of the data has two outcomes and each outcome has probability ½.

In another embodiment the noise is generated by deterministic generator 962 and has two outcomes (binary) and the first outcome has probability 1/10 and the second outcome has probability 9/10; and each indivisible unit of the data has two outcomes and the first outcome for a data unit has probability 1/10 and the second outcome has probability 9/10.

In another embodiment the noise is generated by deterministic generator 962 and has three outcomes: the first outcome has probability 1/100; the second outcome has probability 29/100; and the third outcome has probability 70/100. And the primitive units of data have three outcomes: the first outcome has probability 1/100; the second outcome has probability 29/100; and the third outcome has probability 70/100.

Our next rule describes that prior history of outcomes has no influence on which outcome occurs next. In probability theory, this is sometimes called stochastic independence.

Rule 2. Stochastic Independence

History has no effect on the next event. Each outcome $o_i$ is independent of the history. Let $p_i$ be the probability of outcome $o_i$ where there are m outcomes. A standard assumption of probability theory is that the sum of the probabilities of a finite number of mutually exclusive outcomes is 1 when these outcomes cover all possible outcomes. That is, $$\sum_{i=1}^{m} p_i = 1.$$

Stochastic independence means that no correlation exists between previous or future outcomes. If the history of the prior j−1 outcomes is $b_1, b_2, \ldots, b_{j-1}$, then the conditional probability of outcome of on the jth trial is still $p_i$, regardless of this history. This is expressed in terms of the conditional probabilities: for every outcome $o_i$, $P(x_i=o_i|x_1=b_1, \ldots, x_{j-1}=b_{j-1})=p_i$.

Process 4 shows how to generate biased noise that is unpredictable so that unencrypted data with a bias can still be effectively hidden. In hiding process 4, a line starting with ;; is a comment.

Hiding Process 4. A Biased Noise Generator

---

;; The noise outcomes in $\mathcal{O}$ are indexed as $\{o_1, o_2, \ldots, o_m\}$, when there are m outcomes.<br>
;; $p_i$ is the probability of noise outcome $o_i$.<br>
;; The interval [0, 1) is subdivided into subintervals with rational endpoints.<br>
set i = 1<br>
set x = 0<br>
while( i ≤ m )<br>
{<br>
  set $L_i = [x, x + p_i)$<br>
  increment i<br>
  update x to $x + p_i$<br>
} set $\delta = \frac{1}{2}\min\{p_1, p_2, \ldots, p_m\}$ compute n > 0 so that $2^{-n} < 8$<br>
use an unbiased, binary non-deterministic generator to sample n bits $b_1, b_2, \ldots, b_n$ set $x = \sum_{i=1}^{n} b_i 2^{-i}$ Generate noise outcome $o_j$ such that x lies in interval $L_j$

---

In an embodiment, hiding process 4 can be implemented as a computing system (FIG. 2B) with input system 242, output system 240, memory system 246, and processor system 252, using non-deterministic generator 942 or non-deterministic generator 952. In an embodiment, hiding process 4 can be used to help implement random noise generator 128 in FIG. 1B. In an embodiment, hiding process 4 can be used to generate biased noise 990 in FIG. 9D. In an embodiment, the unbiased, binary non-deterministic generator in hiding process 4 is implemented with non-deterministic generator 942 of FIG. 9A or non-deterministic generator 952 of FIG. 9B.

Next, two more rules are stated whose purpose is to design embodiments that do not lead leak information to Eve. Section 10.13 shows some embodiments that authenticate the data or key(s) hidden in the noise. Embodiments that follow these rules help hinder Eve from actively sabotaging Alice and Bob to violate these rules.

Rule 3. New Noise and New Data

For each scattered transmission, described in process 1 or process 3, Alice creates new data $d_1 \ldots d_m$ or creates a new key $k_1 \ldots k_m$. Alice also creates new noise $r_1 \ldots r_{n-m}$ from a non-deterministic generator that satisfies rule 1 (The Noise and Data have the Same Bias) and rule 2 (Stochastic Independence).

Rule 4. No Auxiliary Information

During the kth scattered transmission or storage, Eve only sees scattered $\mathcal{S}(k)$; Eve receives no auxiliary information from Alice or Bob. Scattered $\mathcal{S}(k)$ represents the key(s) or data hidden in the noise.

Machine Property 1.

When Eve initially has zero information about π w.r.t. $\mathcal{L}_{m,n}$, and rules 5 and 6 hold, then Eve still has zero information about π after she observes scattered transmissions S(1), S(2), . . . S(k).

In a proof of theorem 1, the following terminology is used. i lies in $\pi=(l_1, l_2 \ldots l_m)$ if $i=l_j$ for some $1 \le j \le m$. Similarly, i lies outside π if $i \ne l_j$ for every $1 \le j \le m$. In this latter case, i is a noise location.

PROOF. Consider the ith bit location in the scattered transmission. Let $x_i(k)$ denote the ith bit observed by Eve during the kth scattered transmission S(k). The scatter map π is established before the first transmission based on a uniform probability distribution; rule 5 implies the data generation and noise generation obey the two properties of no bias and history has no effect, These rules imply the conditional probabilities $$P(x_i(k+1)=1 \mid x_i(k)=b) = \frac{1}{2} = P(x_i(k+1)=0 \mid x_i(k)=b)$$

hold for b∈{0,1}, independent of whether i lies in π or i lies outside π. Rule 6 implies that if Eve's observation of $\mathcal{S}(1)$, $\mathcal{S}(2)$, . . . $\mathcal{S}(k)$ enabled her to obtain some information, better than $$P(\pi = (l_1, l_2 \ldots l_m)) = \frac{(n-m)!}{n!},$$

about whether i lies in π or i lies outside π, then this would imply that the probability distribution of the noise is distinct from the probability distribution of the data, which is a contradiction.

Remark 2.

Theorem 1 is not precisely true if the probability distribution of the noise is distinct from the probability distribution of the data. In some embodiments, the probability distribution of the noise may be close enough to the probability distribution of the data so that Eve cannot obtain enough information to guess or figure out hiding locations. With this in mind, for a positive ϵ>0 and $$\epsilon < \frac{1}{2},$$

we define what it means for the probability distribution of the noise to be $\epsilon$-close to the probability distribution of the data.

Definition 4. Probability Distributions that are $\epsilon$-Close

Suppose the noise outcomes and the data outcomes are binary. That is, each noise outcome can be represented with a bit and each data outcome can be represented with a bit. Let $(p_0, p_1)$ be the noise distribution. This means that the probability of a noise bit being a 0 is $p_0$ and probability of a noise bit being 1 is $p_1$, so $p_0+p_1=1$. Let $(q_0, q_1)$ be the data distribution. This means that the probability of a data bit being a 0 is $q_0$ and probability of a data bit being 1 is $q_1$. The probability distribution of the noise is $\epsilon$-close to the probability distribution of the data if $|p_0-q_0|<\epsilon$ and $|p_1-q_1|<\delta$.

Suppose the noise has m distinct outcomes and the data has m distinct outcomes. Let $(p_1, p_2, \ldots, p_m)$ be the probability distribution of the noise, where $$\sum_{i=1}^{m} p_i = 1.$$

Let $(q_1, q_2, \ldots, p_m)$ be the probability distribution of the data, where $$\sum_{i=1}^{m} q_i = 1.$$

The probability distribution of the noise is $\epsilon$-close to the probability distribution of the data if $|p_i-q_i|<\epsilon$ for every i such that $1 \le i \le m$.

In embodiments, remark 2 advises us not to let Alice violate rule 5: an example of what Alice should not do is send the same data or same key in multiple executions of process 1 or process 3 and the noise is randomly generated for each execution.

10.9 Effective Hiding

This section provides the intuition for effective hiding. Effective hiding occurs when Eve obtains no additional information about scatter map $\sigma$ after Eve observes multiple hidden key or hidden data transmissions. Section 10.8 provides mathematical analysis of this intuition.

The effectiveness of the hiding depends upon the following observation. Even after Eve executes a search algorithm for the data (signal) in the noise, Eve's search algorithm does NOT know when it has found the key or the data because her search algorithm CANNOT distinguish the signal from the noise. This is illustrated by FIG. 5 and FIG. 6.

The pixel values in FIG. 5 and FIG. 6 that compose the secret are hidden in the noise of the visual image such that the probabilities of the pixel values satisfy the two randomness axioms. Suppose Eve performs a brute force search over all $$\frac{n!}{(n-m)!}$$

possibilities for scatter map $\sigma$. Even if Eve's search method stumbles upon the correct sequence of locations, Eve's method has no basis for distinguishing the data from the noise because the key and noise probability distributions are equal. For FIG. 5, Eve does not have a terminating condition for halting with this sequence of bit locations hiding the key. For FIG. 6, Eve does not have a terminating condition for halting with this sequence of locations hiding the data.

In FIG. 7 and FIG. 8, Eve can obtain some locations of the hidden data or hidden key because the probability distribution of the secret (foreground) is not the same as the noise (background): Eve can determine the secret is located in a P shape, because the probability distribution of these secret pixels violates the randomness axioms.

10.10 Dynamic Hiding Locations

This section describes a further enhancement of our invention(s) and makes Eve's challenge far more difficult for her to capture or estimate the scatter map: the locations of where to hide the information, or data, or keys, or public keys can dynamically change. This means the scatter map dynamically changes in a way so that Alice can extract the hidden information at a later time even though each block of data units are hidden at different locations. In terms of mathematics, the scatter map $\pi(k)$ dynamically changes as a function of the kth storing or kth transmission. Precisely, $\pi(j) \neq \pi(k)$ when $j \neq k$.

In an embodiment, Alice hides information in blocks of 4 data (information) units and the noise size is 60 data (information) units. In some embodiments a unit may represent a bit: there are two choices for each $d_i$. In other embodiments, there may be 4 choices for each unit $d_i$. In the first hiding of the data or information in the noise, Alice hides data unit $d_0$ at location 63; Alice hides data unit $d_i$ at location 2; Alice hides data unit $d_2$ at location 17; and Alice hides data unit $d_3$ at location 38. As described in section, Alice stores the noise units in the remaining 60 locations.

In the second hiding of 4 data units $d_4$, $d_5$, $d_6$, and $d_7$, Alice hides data unit $d_4$ at location 28; Alice hides data unit $d_5$ at location 51; Alice hides data unit de at location 46; and Alice hides data unit $d_7$ at location 12. The hiding locations in the first hiding are different from the hiding location in the second hiding. In other words, the enhancement described in machine 3 provides dynamic hiding locations.

Described below, machine 3 describes an embodiment of hiding locator machine 980 of FIG. 9D, that generates unpredictable hiding locations so that even if Eve knows scatter maps $\pi(1)$, $\pi(2)$, . . . , and all the way up to $\pi(k-1)$, Eve will not be able to guess or effectively predict scatter map $\pi(k)$.

Machine 3. Dynamic Hiding Locations

| Machine 3. Dynamic Hiding Locations |
|---|
| 0th hiding locator $\Delta(0) = \Delta_{0,0} \ldots \Delta_{0,N-1}$. |
| Initialize i = 0 |
| while( hiding process 122 requests more location(s) ) |
| { |
| Update hiding locator $(\Delta_{i+1,0}\ \Delta_{i+1,1} \ldots \Delta_{i+1,d-1}) = \Phi(\Delta_{i,0}\ \Delta_{i1} \ldots \Delta_{i,d-1})$. |
| Update hiding locator $\Delta_{i+1,j} = \Delta_{i,j}$ for each j satisfying $d \le j \le N-1$ |
| Increment i |
| Generate scatter map locations $l_1, l_2, \ldots, l_m$ by executing one-way hash $\Psi$ instructions 968 on hiding locator $\Delta(i)$ as input to $\Psi$, where $l_1\ l_2 \ldots l_m$ is the first b m bits of hash output $\Psi(\Delta_{i,0} \ldots \Delta_{i,N-1})$. |
| } |

In a machine 3 embodiment of hiding locator machine 980, N=1024 is the size of the hiding locator $\Delta(i)$, and $\Delta(i)$ is updated by hiding locator update instructions 986. In another embodiment, N is fifty thousand. In another embodiment, N is ten billion.

In a machine 3 embodiment, b=32. Since 232 is greater than 4 billion, there are more than 4 billion possible hiding locations for a single hiding of data when b=32. In a machine 3 embodiment, b=64. Since 264 is greater than 1019, there are more than 1019 possible hiding locations for a single hiding of data when b=64. In a machine 3 embodiment, b=5000.

In a machine 3 embodiment of hiding locator machine 980, one-way hash instructions 984 are performed by processor system 258 (FIG. 1B). In an embodiment, one-way hash instructions 968 are performed by processor system 258 (FIG. 1B). In an embodiment, hiding locator update instructions 986 are performed by processor system 258 (FIG. 1B). In an embodiment, memory system 256 stores one-way hash instructions 964, one-way hash instructions 968 and hiding locator update instructions 986.

In an embodiment, the instructions that execute machine 3 and help execute hiding locator machine 980 may expressed in the C programming language before compilation. In an embodiment, the instructions that execute machine 3 and help execute hiding locator machine 980 may be expressed in the native machine instructions of processor system 258. In an embodiment, the instructions that execute machine 3 may be implemented as an ASIC, which is part of processor system 258. In an embodiment, memory system 956 may store one or more dynamic hiding locations 982.

10.11 SINGLE STORAGE and TRANSMISSION ANALYSIS

The size of the location space is significantly greater than the data or key size. Even for values of n as small as 30, $n!/(n-m)! >> 2^m$. The uniform distribution of the noise and the data generation and a large enough noise size poses Eve with the challenge that even after seeing the transmission $S=(s_1 \ldots s_n)$, she has almost no more information about the data or key(s), than before the creation of $k_1\ k_2 \ldots k_m$. The forthcoming analysis will make this notion of almost no more information more precise.

In some applications, Alice and Bob may also establish the data size m as a shared secret, where m is not disclosed to Eve. In the interests of being conservative about the security, it is assumed that Eve knows the data size m. For applications where Eve doesn't know m, the information security will be stronger than the results obtained in this section.

Processes 1 and 3 are analyzed with counting and asymptotic results that arise from the binomial distribution. First, some preliminary definitions are established.

For $0 \le i \le n$, define $E_{i,n}=\{r \in \{0, 1\}^n : \eta_1(r)=i\}$. When n=4, $E_{0,4}=\{0000\}$, $E_{1,4}=\{0001, 0010, 0100, 1000\}$, $E_{2,4}=\{0011, 0101, 0110, 1001, 1010, 1100\}$, $E_{3,4}=\{0111, 1011, 1101, 1110\}$ and $E_{4,4}=\{1111\}$. Note $$|E_{k,n}| = \frac{n!}{(n-k)!\,k!} = \binom{n}{k}.$$

The expression—the ith element of $E_{k,n}$—refers to ordering the set $E_{k,n}$ according to an increasing sequence of natural numbers that each binary string represents and selecting the ith element of this ordering. For example, the 3rd element of $E_{2,4}$ is 0110.

In FIG. 13, event $B_{i,j}$ refers to the ith data in $E_{j,m}$. Event $R_i$ refers to the set of random noise elements which have i ones, and the noise size is $\rho=n-m$. Event $A_i$ refers to a scatter $(s_1 \ldots s_n)$ which contains i ones.

Equation 10.1 follows from the independence of events $R_k$ and $B_{i,j}$.

$$P(R_k \cap B_{l,j}) = P(R_k) \cap P(B_{l,j}) \qquad (10.1)$$

whenever $0 \le k \le \rho$ and $0 \le j \le m$ and $$1 \le l \le \binom{m}{j}.$$

Equation 10.2 follows from the definitions in FIG. 13 $\eta_1(s_1 \ldots s_n)=\eta_1(r_1 \ldots r_\rho)+\eta_1(k_1 \ldots k_m)$; and the meaning of conditional probability.

$$P(A_k | B_{l,j}) = P(R_{k-j}) = \binom{\rho}{k-j} 2^{-\rho} \qquad (10.2)$$

whenever $0 \le j \le \min\{k,m\}$ and $$1 \le l \le \binom{m}{j}.$$

A finite sample space and $$P\left(\bigcup_{j=0}^{m} \bigcup_{l=1}^{|E_{j,m}|} B_{l,j}\right) = 1$$

imply that each event $$A_k \subset \bigcup_{j=0}^{m} \bigcup_{l=1}^{|E_{j,m}|} B_{l,j}.$$

Furthermore, $B_{l_1,j_1} \cap B_{l_2,j_2} = \theta$ whenever $l_1 \ne l_2$ or $j_1 \ne j_2$ such that $0 \le j_1, j_2 \le m$ and $1 \le l_1 \le E_{j_1,m}$ and $1 \le l_2 \le E_{j_2,m}$. Thus, Bayes Law is applicable. Equation 10.3 follows from Bayes Law and the derivation below 10.3.

$$P(B_{l,j} \mid A_k) = \frac{\binom{\rho}{k-j}}{\sum_{b=0}^{\min\{k,m\}} \binom{m}{b}\binom{\rho}{k-b}} \qquad (10.3)$$

whenever $0 \le j \le \min\{k, m\}$ and $$1 \le l \le \binom{m}{j}.$$

The mathematical steps chat establish equation 10.3 are shown below.

$$P(B_{l,j} \mid A_k) = \frac{P(B_{l,j})P(A_k \mid B_{l,j})}{\sum_{b=0}^{min\{k,m\}} \sum_{a=1}^{|E_{b,m}|} P(B_{a,b})P(A_k \mid B_{a,b})} = \frac{P(A_k \mid B_{l,j})}{\sum_{b=0}^{min\{k,m\}} \sum_{a=1}^{|E_{b,m}|} P(A_k \mid B_{a,b})} = \frac{\binom{\rho}{k-j}2^{-\rho}}{\sum_{b=0}^{min\{k,m\}} |E_{b,m}|\binom{\rho}{k-b}2^{-\rho}}.$$

Definition 5. Let c be a positive integer. f: $\mathbb{N} \rightarrow \mathbb{N}$ is called a binomial c-standard deviations function if there exists N∈ $\mathbb{N}$ such that whenever ρ≥N, then $$\left|f(\rho) - \frac{\rho}{2}\right| \leq c\frac{\sqrt{\rho}}{2}$$

Define the function $$h_c(\rho) = \max\left\{0, \frac{\rho}{2} - \left\lfloor c\frac{\sqrt{\rho}}{2} \right\rfloor\right\}.$$

Then $h_c$ is a binomial c-standard deviations function. Lemmas 2 and 3 may be part of the binomial distribution folklore; for the sake of completeness, they are proven below.

Lemma 2.

Let k: $\mathbb{N} \rightarrow \mathbb{N}$ be a binomial c-standard deviations function. Then $$\lim_{\rho\to\infty} \frac{\binom{\rho}{k(\rho)-1}}{\binom{\rho}{k(\rho)}} = 1.$$

PROOF. A simple calculation shows that $$\frac{\binom{\rho}{k(\rho)-1}}{\binom{\rho}{k(\rho)}} = \frac{k(\rho)}{\rho - k(\rho) + 1}.$$

Since k(ρ) is a binomial c-standard deviations function, $$\frac{\rho}{2} - \frac{c\sqrt{\rho}}{2} \leq k(\rho) \leq \frac{\rho}{2} + \frac{c\sqrt{\rho}}{2}.$$

This implies $$\frac{\rho}{2} + \frac{c\sqrt{\rho}}{2} + 1 \geq \rho - k(\rho) + 1 \geq \frac{\rho}{2} - \frac{c\sqrt{\rho}}{2}.$$

Thus, $$\frac{\frac{\rho}{2} - \frac{c\sqrt{\rho}}{2}}{\frac{\rho}{2} + \frac{c\sqrt{\rho}}{2} + 1} \leq \frac{\binom{\rho}{k(\rho)-1}}{\binom{\rho}{k(\rho)}} \leq \frac{\frac{\rho}{2} + \frac{c\sqrt{\rho}}{2}}{\frac{\rho}{2} - \frac{c\sqrt{\rho}}{2}} \tag{10.4}$$

Since $$\lim_{\rho\to\infty} \frac{\frac{\rho}{2} - \frac{c\sqrt{\rho}}{2}}{\frac{\rho}{2} + \frac{c\sqrt{\rho}}{2} + 1} = 1 = \lim_{\rho\to\infty} \frac{\frac{\rho}{2} + \frac{c\sqrt{\rho}}{2}}{\frac{\rho}{2} - \frac{c\sqrt{\rho}}{2}},$$

apply the squeeze theorem to equation 10.4.

The work from lemma 2 helps prove lemma 3. Lemma 3 helps prove that equation 10.3 converges to $2^{-m}$ when k(ρ) is a binomial c-standard deviations function.

Lemma 3.

Fix m∈ $\mathbb{N}$. Let k: $\mathbb{N} \rightarrow \mathbb{N}$ be a binomial c-standard deviations function. For any b, j such that 0≤b, j≤m, then $$\lim_{\rho\to\infty} \frac{\binom{\rho}{k(\rho)-j}}{\binom{\rho}{k(\rho)-b}} = 1.$$

PROOF. Using a similar computation to equation 10.4 inside of c+1 standard deviations instead of c, then ρ can be made large enough so that k(ρ)−b and k(ρ)−j lie within c+1 standard deviations so that $$\lim_{\rho\to\infty} \frac{\binom{\rho}{k(\rho)-i-1}}{\binom{\rho}{k(\rho)-i}} = 1$$

where 0≤i≤m. W.L.O.G., suppose j<b. Thus, $$\lim_{\rho\to\infty} \frac{\binom{\rho}{k(\rho)-j}}{\binom{\rho}{k(\rho)-b}} = \lim_{\rho\to\infty} \frac{\binom{\rho}{k(\rho)-j}}{\binom{\rho}{k(\rho)-(j+1)}} \lim_{\rho\to\infty} \frac{\binom{\rho}{k(\rho)-(j+1)}}{\binom{\rho}{k(\rho)-(j+2)}} \ldots \lim_{\rho\to\infty} \frac{\binom{\rho}{k(\rho)-(b-1)}}{\binom{\rho}{k(\rho)-b}} = 1$$

Machine Property 4.

Fix data size m∈ $\mathbb{N}$. Let c∈ $\mathbb{N}$. Let k: $\mathbb{N} \rightarrow \mathbb{N}$ be a binomial c-standard deviations function. Then $$\lim_{\rho\to\infty} P(B_{l,j}|A_{k(\rho)}) = 2^{-m}.$$

PROOF.

$$\lim_{\rho\to\infty} P(B_{l,j}|A_{k,(\rho)}) = \lim_{\rho\to\infty} \left[\frac{\sum_{b=0}^{min\{k(\rho),m\}} \binom{m}{b}\binom{\rho}{k(\rho)-b}}{\binom{\rho}{k(\rho)-j}}\right]^{-1} \text{ from equation 10.3 } =$$

-continued $$\left[\sum_{b=0}^{m}\binom{m}{b}\lim_{\rho\to\infty}\frac{\binom{\rho}{k(\rho)-b}}{\binom{\rho}{k(\rho)-j}}\right]^{-1} \text{ since } m \text{ is fixed and } \rho\to\infty \text{ implies } k(\rho)>m.$$

$$= 2^{-m} \text{ from lemma 2.}\square$$

Remark 3.

Theorem 4 is not true when k(ρ) stays on or near the boundary of Pascal's triangie. Consider $$\lim_{\rho\to\infty}\frac{\binom{\rho}{0}}{\binom{\rho}{1}} = 0 \text{ or } \lim_{\rho\to\infty}\frac{\binom{\rho}{1}}{\binom{\rho}{2}} = 0.$$

The math confirms common sense: namely, if Eve sees event $A_0$, then Eve knows that Alice's data is all zeroes. A practical and large enough noise size enables process 1 or process 3 to effectively hide the data transmission so that outlier events such as $A_0$, $A_1$ do not occur in practice. For example, when n=2048, $P(A_0)=2^{-2048}$ and $P(A_1)=2^{-2037}$.

Definitions 6, 7 and theorems 5, 6 provide a basis for calculating how big the noise size should be in order to establish an extremely low probability that Eve will see outlier events such as $A_0$.

Definition 6.

$f: \mathbb{N}\to\mathbb{N}$ is an binomial ϵ-tail function if there exists $N\in\mathbb{N}$ such that n≥N implies that $$2^{-n}\left(\sum_{k=0}^{f(n)}\binom{n}{k}+\sum_{k=n-f(n)}^{n}\binom{n}{k}\right)<\epsilon.$$

The area under the standard normal curve from −∞ to x is expressed as $$\Phi(x)=\frac{1}{\sqrt{2\pi}}\int_{-\infty}^{x}e^{-\frac{1}{2}t^2}dt.$$

Machine Property 5.

For each $c\in\mathbb{N}$, set $\epsilon_c=4\Phi(-c)$. The function $$g_c(n)=\max\left\{0,\left\lfloor\frac{n}{2}-c\frac{\sqrt{n}}{2}\right\rfloor\right\}$$

is a binomial $\epsilon_c$-tail function.

PROOF. This is an immediate consequence of the central limit theorem [60, 61], applied to the binomial distribution. Some details are provided.

Define $$B_n(x)=2^{-n}\sum_{k=0}^{\lfloor x\rfloor}\binom{n}{k}. \text{ In [62],}$$

DeMoivre proved for each fixed x that $$\lim_{n\to\infty}B_n\left(\frac{n}{2}+x\frac{\sqrt{n}}{2}\right)=\Phi(x).$$

Thus, $$\lim_{n\to\infty}2^{-n}\sum_{k=0}^{g_c(n)}\binom{n}{k}=\frac{1}{\sqrt{2\pi}}\int_{-\infty}^{-c}e^{-\frac{1}{2}t^2}dt.$$

Now $\epsilon_c$ is four times the value of $$\frac{1}{\sqrt{2\pi}}\int_{-\infty}^{-c}e^{-\frac{1}{2}t^2}dt,$$

which verifies that $g_c$ is a binomial $\epsilon_c$-tail function.

Example 1

This example provides some perspective on some ϵ-tails and Eve's conditional probabilities. For n=2500, the scatter mean μ is 1250 and the standard deviation $$\sigma=\frac{\sqrt{2500}}{2}=25.$$

Set c=20, so μ−cσ=750. A calculation shows that $$2^{-2500}\sum_{j=0}^{750}\binom{2500}{j}<10^{-91}.$$

For n=4096, the scatter mean is 2048 and the standard deviation σ=32. Set c=50 standard deviations, so μ−cσ=448. A calculation shows that $$2^{-4096}\sum_{j=0}^{448}\binom{4096}{j}<10^{-621}.$$

Some of Eve's conditional probabilities are calculated for n=2500 and data size m=576. The average number of 1's in a key is $\mu_{key}=288$ and the standard deviation $\sigma_{key}=12$.

A typical case is when j=300 and k=1275, which are both one standard deviation to the right of the data and scatter mean, respectively. When Eve's conditional probability equals $2^{-m}$, the secrecy ratio is exactly 1. Using equation 10.3, a computer calculation shows that the secrecy ratio is $$\frac{P(B_{l,300}\mid A_{1275})}{2^{-576}}\approx 1.576,$$

so $2^{-576}<P(B_{l,300}|A_{1275})<2^{-575}$.

A rare event is when j=228 and k=1225. That is, j=228 is five standard deviations to the left of $\mu_{key}$ and k=1225 is one standard deviation to the left of the scatter mean. A calculation shows that $$\frac{P(B_{l,228} \mid A_{1225})}{2^{-576}} \approx 0.526.$$

Thus, $2^{-577} < P(B_{l,228} \mid A_{1225}) < 2^{-576}$.

An extremely rare event occurs when j=228 and k=1125. Event $A_{1125}$ is 4 standard deviations to the left.

$$\frac{P(B_{l,228} \mid A_{1125})}{2^{-576}} \approx 3840.$$

Thus, $2^{-565} < P(B_{l,228} \mid A_{1125}) < 2^{-564}$. While a secrecy ratio of 3840 is quite skew, it still means that even if Eve sees a scatter transmission 4 standard deviations to the left, there is still a probability in the interval $[2^{-565}, 2^{-564}]$ of Alice's data element being the event $B_{l,228}$.

Even when Eve sees a highly skewed, scattered transmission and obtains some information about the current hidden data element, Eve's observation provides her with no information about the next data element hidden in a subsequent transmission. The secrecy ratio calculations in example 1 provide the motivation for definition 7.

Definition 7.

Let $\epsilon > 0$. Eve's conditional probabilities $P(B_{i,j} \mid A_{k(\rho)})$ are $\epsilon$-close to perfect secrecy if there exists a binomial $\epsilon$-tail function f such that for any function $k: \mathbb{N} \to \mathbb{N}$ satisfying $f(\rho) \le k(\rho) \le \rho - f(\rho)$, then $$\lim_{\rho \to \infty} P(B_{l,j} \mid A_{k(\rho)}) = 2^{-m}.$$

Machine Property 6.

For any $\epsilon > 0$, there exists $M \in \mathbb{N}$ such that $\epsilon_c < \epsilon$ for all $c \ge M$ and $c \in N$. Furthermore, function $g_c$ is a binomial $\epsilon_c$-tail function that makes Eve's conditional probabilities $P(B_{i,j} \mid A_{k(\rho)})$ $\epsilon_c$-close to perfect secrecy, where $g_c(\rho) \le k(\rho) \le \rho - g_c(\rho)$.

PROOF. Since $$\lim_{x \to \infty} \Phi(-x) = 0,$$

there exists $M \in N$ such that $\epsilon_c < \epsilon$ for all $c \ge M$. Recall that $$h_c(\rho) = \max\left\{0, \frac{\rho}{2} - \left\lfloor c\frac{\sqrt{\rho}}{2} \right\rfloor\right\}.$$

For all $\rho \in \mathbb{N}$, $|g_c(\rho) - h_c(\rho)| \le 1$ and $g_c(4\rho^2) - h_c(4\rho^2) = 0$. This fact and $h_c$ is a binomial c-standard deviations function together imply that lemma 3 and hence theorem 4 also hold for function $g_c$. That is $$\lim_{\rho \to \infty} P(B_{l,j} \mid A_{g_c(\rho)}) = 2^{-m}.$$

Whenever function k satisfies $g_c(\rho) \le k(\rho) \le \rho - g_c(\rho)$, this implies k is a binomial c+1-standard deviations function. Thus, this theorem immediately follows from theorems 4, 5 and from definition 7.

10.12 Data Transformations

In some embodiments, the key or data may be transformed by the sender (Alice) before being scattered and subsequently transmitted to the receiver (Bob). In an embodiment, each bit of the key or the data may be transformed according to the map $\Phi: \{0, 1\} \to \{01, 10\}$ where $\Phi(0)=01$ and $\Phi(1)=10$. Suppose the data is K=010010000. $\Phi^{-1}$ denotes the inverse of $\Phi$. The inverse of $\Phi$ is used by Bob to reconstruct the data $d_1 d_2 \ldots d_m$ from the transformed data $t_1 t_2 \ldots t_{2m}$ after Bob extracts $t_1 t_2 \ldots t_{2m}$ from the scattered transmission received from Alice. Note that $\Phi^{-1}(01)=0$ and $\Phi^{-1}(10)=1$. In some embodiments, data transformation instructions 126, shown in FIG. 1B, compute map $\Phi$ and inverse map $\Phi^{-1}$.

After applying $\Phi$ to each bit of K, the transformation is $\Phi(0)\ \Phi(1)\ \Phi(0)\ \Phi(0)\ \Phi(1)\ \Phi(0)\ \Phi(0)\ \Phi(0)\ \Phi(0)$=01 10 01 01 10 01 01 01 01. After this transformation by $\Phi$, each of these 18 bits is scattered inside random noise. Suppose K is scattered inside of 130 bits of noise, then the location space will be $\mathcal{L}_{18,148}$. A scatter map $\pi$ in $\mathcal{L}_{18,148}$ has 18 locations. That is, $\pi=(l_1, l_2, \ldots, l_{18})$ and each $l_i$ satisfies $1 \le l_i \le 148$.

FIG. 12 shows an embodiment with $l_1=37$, $l_2=29$, $l_{17}=4$ and $l_{18}=147$. In other embodiments, when the $\Phi$ transformation is used, for a data size m, a scatter map is selected from $\mathcal{L}_{2m,n}$ to hide the transformed 2m bits inside of n−2m bits of random noise. In an embodiment, the data size may be m=32. In another embodiment, the data size may be m=128. In another embodiment, the data size may be m=1000. In another embodiment, the data size may be m=4096. In another embodiment, the data size may be m=512000.

In alternative embodiments, the map $\Psi: \{0, 1\} \to \{01, 10\}$ where $\Psi(0)=10$ and $\Psi(1)=01$, may be used to transform the data before scattering (hiding) the data inside the noise. In an embodiment, the map $\Psi$ transforms the 16 bits of data 0100 1110 1001 0110 to a 32-bit transformation 10011010 01010110 01101001 10010110, before this 32-bit transformation is scattered by the sender (Alice) inside of random noise. After Bob extracts the transformed data 10011010 01010110 01101001 10010110 from the scattered transmission, Bob applies the inverse of $\Psi$ to each substring of two bits. For the first two bits, $\Psi^{-1}(10)=0$, so $d_1=0$. For bits 3 and 4, Bob computes $\Psi^{-1}(01)=1$, so Bob reconstructs $d_2=1$. For bits 5 and 6, Bob computes $\Psi^{-1}(10)=0$, so his third reconstructed data bit $d_3=0$. Bob continues this reconstruction of the 16th bit of data with bits 31 and 32 and computes $\Psi^{-1}(10)=0$, and reconstructs bit $d_{16}=0$. In some embodiments, data transformation instructions 126, shown in FIG. 1B, compute map $\Psi$ and inverse map $\Psi^{-1}$.

Before the scatter map process using a data transformation is started, an element $\pi \in \mathcal{L}_{2m,n}$ is randomly selected and securely distributed to Alice and Bob. Note 2m<n.

Hiding Process 5. Scatter Map Method using a Data Transformation $\Psi$

Alice and Bob already have secret scatter map $\pi=(l_1, l_2 \ldots l_{2m})$.

A Alice generates data $d_1\ d_2 \ldots d_m$ and noise $r_1\ r_2 \ldots r_{n-2m}$ from her random noise generator.

B Alice transforms data $d_1\ d_2 \ldots d_m$ to $t_1\ t_2 \ldots t_{2m}$ with transformation $\Psi$.

C According to definition $\mathfrak{z}$, Alice uses $\pi$ to set $s_{l_1}=t_1 \ldots s_{l_{2m}}=t_{2m}$.

D Per definition $\mathfrak{z}$, Alice stores the noise at noise (unoccupied) locations in $\mathcal{S}=(s_1 \ldots s_n)$ so that the transformed data is hidden inside the noise.

E Alice sends $\mathcal{S}=(s_1 \ldots s_n)$ to Bob.

F Bob uses scatter map $\pi$ to extract the transformed data $t_1 \ldots t_{2m}$ from $\mathcal{S}$.

G Bob applies the inverse of $\Psi$ to $t_1 \ldots t_{2m}$ and reads data $d_1\ d_2 \ldots d_m$.

10.13 HIDING DATA ELEMENTS with AUTHENTICATION

It is assumed that Alice and Bob have previously established secret scatter map $\sigma=(l_1, l_2 \ldots l_m)$ and authentication key $\kappa$. In some embodiments, Alice and Bob may establish scatter map $\sigma$ and authentication key $\kappa$ with a Diffie-Hellman-Merkle exchange [63, 64], where their public keys are signed in a secure computing or private manufacturing environment; alternatively, in other embodiments, Alice and Bob may establish $\sigma$ and $\kappa$ via a different channel or in the same physical location by a face to face exchange or using a physical delivery by a mutually trusted courier.

Let $h_\kappa$ denote an MAC (e.g., HMAC [73] or [74]) function which will be used to authenticate the scattered transmission. The use of $h_\kappa$ helps hinder the following attack by Eve. An active Eve could flip a bit at bit location l in the scattered transmission. If no authentication occurs on the noise and the hidden key bits, then upon Alice resending a scattered transmission due to Alice and Bob not arriving at the same session key secret, Eve gains information that l lies in $\sigma$. If the scattered transmission S is not authenticated, Eve's manipulation of the bits in S helps her violate rule 6.

Hiding Process 6. Hiding One or More Keys with Authentication

Alice's random generator creates one or more keys $k_1k_2 \ldots k_m$ and random noise $r_1r_2 \ldots r_\rho$. Per definition $\mathfrak{z}$, Alice uses scatter map $\sigma$ to set $s_{l_1}=k_1 \ldots s_{l_m}=k_m$.

Alice stores the noise $r_1r_2 \ldots r_\rho$ at noise (unoccupied) locations in $\mathcal{S}=(s_1 \ldots s_n)$ so that her one or more keys $k_1k_2 \ldots k_m$ are hidden inside the noise.

Alice sends $\mathcal{S}$ and $h_\kappa(\mathcal{S})$ to Bob.

Bob receives $\mathcal{S}'$ and $h_\kappa(\mathcal{S})$ from Alice. Bob computes $h_\kappa(\mathcal{S}')$ and checks it against $h_k(\mathcal{S})$.

If $h_\kappa(\mathcal{S}')$ is valid, Bob uses scatter map $\sigma$ to extract one or more keys $k_1 \ldots k_m$ from $\mathcal{S}$;

else Bob rejects $\mathcal{S}'$ and asks Alice to resend $\mathcal{S}$.

In some embodiments of process 6, scatter map $\sigma$ is executed by scatter map instructions 130 (FIG. 1B) and these instructions follow definition 3. In some embodiments of process 6, Alice's random noise generator is implemented with random noise generator 128 (FIG. 1B). In some embodiments of process 6, Alice's random noise generator uses a light emitting diode as shown in FIGS. 9 and 10. In some embodiments of process 6, the key $k_1 \ldots k_m$ has no bias and has the same probability distribution as the noise $r_1r_2 \ldots r_\rho$. In some embodiments of process 6, the data elements $e_1 \ldots e_m$ are encrypted plaintext data instead of a key.

In some embodiments of process 6, the probability distribution of the data elements is biased and the probability distribution of the noise is biased. In preferred embodiments, the probability distribution of the data elements is the same as the probability distribution of the noise even though they are both biased. In some embodiments, the probability distribution of the data elements is almost the same the probability distribution of the noise. Almost the same probability distribution means that an average hacker that is eavesdropping on the hidden data transmissions would not be able to find where the data is being hidden after a seeing the hidden transmissions for a reasonable amount of time. In an embodiment, a reasonable amount of time is 3 months. In another embodiment, a reasonable amount of time is 1 year. In another embodiment, a reasonable amount of time is 5 years.

In other embodiments, Alice encrypts plaintext data $d_1, \ldots d_m$ with a block or stream cipher before the encrypted data $e_1, \ldots e_m$ is hidden in random noise; this is described in process 7 below.

Hiding Process 7. Hiding Encrypted Data Elements with Authentication

Alice's uses encryption algorithm $\mathcal{E}$ and key K to encrypt data $M=d_1d_2 \ldots d_m$ as $\mathcal{E}(M, K)=e_1e_2 \ldots e_m$.

Per definition $\mathfrak{z}$, Alice uses scatter map $\sigma$ to set $s_{l_1}=e_1 \ldots s_{l_m}=e_m$.

Alice's random noise generator creates noise $r_1 r_2 \ldots r_\rho$.

Alice stores the noise $r_1 r_2 \ldots r_\rho$ at noise (unoccupied) locations in $\mathcal{S}=(s_1 \ldots s_n)$ so that the encrypted data $e_1e_2 \ldots e_m$ is hidden inside the noise.

Alice sends $\mathcal{S}$ and $h_\kappa(\mathcal{S})$ to Bob.

Bob receives $\mathcal{S}'$ and $h_\kappa(\mathcal{S})$ from Alice. Bob computes $h_\kappa(\mathcal{S}')$ and checks it against $h\kappa(\mathcal{S})$.

If $h_\kappa(\mathcal{S}')$ is valid, Bob uses scatter map $\sigma$ to extract $e_1 \ldots e_m$ from $\mathcal{S}$ and subsequently uses decryption algorithm $\mathcal{D}$ and key K to decrypt $e_1 \ldots e_m$ and obtain $d_1 \ldots d_m$.

else Bob rejects $\mathcal{S}'$ and asks Alice to resend $\mathcal{S}$.

In some embodiments of process 7, catter map $\sigma$ is executed by scatter map instructions 130 (FIG. 1B) and these instructions follow definition 3. In some embodiments of process 7, Alice's random noise generator is implemented with random noise generator 128 (FIG. 1B). In some embodiments of process 7, Alice's random noise generator uses a light emitting diode as shown in FIGS. 9 and 10. In some embodiments, the encrypted data $e_1 \ldots e_m$ has no bias and has the same probability distribution as the noise $r_1r_2 \ldots r_\rho$.

In some embodiments of process 7, encryption algorithm $\sigma$ is the block cipher Serpent and is executed with cipher instructions 129 as shown in FIG. 1B. In some embodiments of process 7, encryption algorithm $\mathcal{E}$ is the block cipher AES [48], and is executed with cipher instructions 129.

In some embodiments of process 7, encryption algorithm $\mathcal{E}$ is a block cipher and also uses the cipher block chaining mode. In some embodiments of process 7, encryption algorithm $\mathcal{E}$ is a stream cipher.

10.14 Some COMPLEXITY ANALYSIS of HIDDEN ENCRYPTED DATA

Suppose that the encrypted data element $e_1e_2 \ldots e_{128}$ has 128 bits and these bits are hidden inside of 128 bits $r_1r_2 \ldots r_{128}$ of random noise. In an embodiment following process 7, block cipher Serpent is executed with cipher instructions 126 to encrypt the data element as $e_1e_2 \ldots e_{128}$ before scatter map instructions 130 are applied to hide encrypted bits $e_1e_2 \ldots e_{128}$ in random noise $r_1r_2 \ldots r_{128}$ produced by random number generator 128.

The hiding of encrypted bits $e_1e_2 \ldots e_{128}$ by scatter map instructions 130 is shown in FIG. 11. Each encrypted data element is 16 bytes. In FIG. 11, the scatter size n=256 bits. For a scatter size of n=256, there are 256 possible locations to hide the first bit $e_1$; 255 locations to hide the second bit $e_2$; . . . ; and 129 locations to hide the 128th bit of encrypted data element $e_{128}$. Note that $|\mathcal{L}_{128,256}|>10^{192}$. The complexity $10^{192}$ of finding the scatter map $\sigma$ in $\mathcal{L}_{128,256}$ is substantially greater than the complexity of Serpent which is at most $2^{256}<10^{77}$. In embodiments where more the noise size is larger, the complexity of finding the scatter map can be much greater than $10^{192}$.

When Eve does not receive any auxiliary information (that is, rule 6 holds), it is extremely unlikely that Eve can extract any information about the bit locations even after Eve observes 625,000 encrypted data elements, each hidden in 128 bits of noise. If Eve has the computing power to brute-force search through each element $\sigma \in \mathcal{L}_{128,256}$ and subsequently to find data element $e_1 \ldots e_{128}$, Eve still has no way of knowing if this particular $\sigma$ is the one that Alice used to hide encrypted bits $e_1 e_2 \ldots e_{128}$. Eve needs some auxiliary information.

10.15 the Scatter Map Process Hides One-Time Locks

Consider the following cryptographic method. Alice places her one-time lock a on message m and transmits $m \oplus a$ to Bob. Bob applies his one-time lock b and sends $m \oplus a \oplus b$ back to Alice. Alice removes her lock, by applying a to $m \oplus a \oplus b$ and sends $m \oplus b$ back to Bob. Bob removes lock b from $m \oplus b$ to read message m. This method of one-time locks is vulnerable if Eve can see the three transmissions $m \oplus a$, $m \oplus a \oplus b$ and $m \oplus b$ because Eve can compute $m = (m \oplus a) \oplus (m \oplus a \oplus b) \oplus (m \oplus b)$.

In an embodiment, process 8 protects these one-time locks by using two distinct and independent scatter maps $\pi_A$, $\pi_B$ to hide each transmission inside a new generation of random noise. Independent means that any information given to Eve about $\pi_B$ tells Eve nothing about $\pi_A$ and vice versa. In terms of conditional probabilities, independence means $P(\pi_A = (l_1 \ldots l_\kappa) \in \mathcal{L}_{\kappa,n} | \pi_B = (j_1 \ldots j_\kappa)) = P(\pi_A = (l_1 \ldots l_\kappa) \in \mathcal{L}_{\kappa,n})$. Using these independent scatter maps, Eve is no longer able to see the three transmissions $m \oplus a$, $m \oplus a \oplus b$ and $m \oplus b$ because the encrypted data $m \oplus a$, and the twice encrypted data $m \oplus a \oplus b$ and the second party encrypted data $m \oplus b$ are each hidden inside of a new generation of random noise.

Hiding Process 8. Scattered One Time Locks

Alice and Bob possess secret scatter maps $\pi_A = (l_1, l_2 \ldots l_\kappa)$, $\pi_B = (j_1, j_2 \ldots j_\kappa) \in \mathcal{L}_{\kappa,n}$.
Eve does not know $\kappa$ and $\pi_A$ and $\pi_B$.
while Alice has more $\kappa$-bit message blocks $m_l\ m_2 \ldots m_\kappa$ to encrypt
{
  Alice generates her lock $a_1\ a_2 \ldots a_\kappa$ and noise $r_1\ r_2 \ldots r_{n-\kappa}$ from her random noise generator.
  Per definition 3, Alice uses $\pi_A$ to set $s_{l_1}, = a_1 \oplus m_1 \ldots s_{1_\kappa} = a_\kappa \oplus m_\kappa$.
  Using noise $r_1\ r_2 \ldots r_\kappa$ Alice completes scatter $\mathcal{S} = (s_1 \ldots s_n)$ and sends to Bob.
  Bob extracts $a_1 \oplus m_1 \ldots a_\kappa \oplus m_\kappa$ from $\mathcal{S}$, using scatter map $\pi_A$.
  Bob generates his lock $b_1\ b_2 \ldots b_\kappa$ and noise $q_1\ q_2 \ldots q_{n-\kappa}$ from his random noise generator.
  Per definition 3, Bob uses $\pi_B$ to set $t_{j_1} = b_1 \oplus a_1 \oplus m_1 \ldots t_{j_\kappa} = b_\kappa \oplus a_\kappa \oplus m_\kappa$.
  Using noise $q_1\ q_2 \ldots q_\kappa$ Bob completes scatter $\mathcal{T} = (t_1 \ldots t_n)$ and sends to Alice.
  Alice extracts $b_1 \oplus a_1 \oplus m_1 \ldots b_\kappa \oplus a_\kappa \oplus m_\kappa \oplus$ from $\mathcal{T}$, using scatter map $\pi_B$.
  Alice removes her lock $a_1 \ldots a_\kappa$ by computing $a_1 \oplus (b_1 \oplus a_1 \oplus m_1) \ldots a_\kappa \oplus (b_\kappa \oplus a_\kappa \oplus m_\kappa)$. Alice generates noise $p_1\ p_2 \ldots p_{n-\kappa}$ from her random noise generator.
  Per definition 3, Alice uses $\pi_A$ to set $u_{l_1} = b_1 \oplus m_1 \ldots u_{l_\kappa} = b_\kappa \oplus m_\kappa$.
  Using noise $p_1\ p_2 \ldots p_\kappa$ Alice completes scatter $\mathcal{U} = (u_1 \ldots u_n)$ and sends to Bob.
  Bob extracts $b_1 \oplus m_1 \ldots b_\kappa \oplus m_\kappa$ from $\mathcal{U}$, using scatter map $\pi_A$.
  Bob removes his lock $b_1 \ldots b_\kappa$ by computing $b_1 \oplus (b_1 \oplus m_1) \ldots b_\kappa \oplus (b_\kappa \oplus m_\kappa)$.
}

In an alternative embodiment. Alice and Bob use a third, distinct scatter map $\pi_C$, created independently from $\pi_A$ and $\pi_B$. Scatter map $\pi_C$ helps Alice scatter $b_1 \oplus m_1 \ldots b_\kappa \oplus m_\kappa$ after removing her lock. This alternative embodiment is shown in process 9.

Hiding Process 9. Scattered One Time Locks with 3 Scatter Maps

Alice and Bob possess secret scatter maps $\pi_A = (l_1, l_2, \ldots l_\kappa)$, $\pi_B = (j_1, j_2, \ldots j_\kappa) \in \mathcal{L}_{\kappa,n}$ and $\pi_C = (i_1, i_2 \ldots i_\kappa) \in \mathcal{L}_{\kappa,n}$
Eve does not know $\pi_A$ and $\pi_B$ and $\pi_C$.
while Alice has more $\kappa$-bit message blocks $m_1\ m_2 \ldots m_\kappa$ to encrypt
{
  Alice generates her lock $a_1\ a_2 \ldots a_\kappa$ and noise $r_1\ r_2 \ldots r_{n-\kappa}$ from her random noise generator.
  Per definition 3, Alice uses $\pi_A$ to set $s_{l_1} = a_1 \oplus m_1 \ldots s_{l_\kappa} = a_\kappa \oplus m_\kappa$.
  Using noise $r_1\ r_2 \ldots r_\kappa$ Alice completes scatter $\mathcal{S} = (s_1 \ldots s_n)$
  Alice sends $\mathcal{S} = (s_1 \ldots s_n)$ to Bob.
  Bob extracts $a_1 \oplus m_1 \ldots a_\kappa \oplus m_\kappa$ from $\mathcal{S}$, using scatter map $\pi_A$.
  Bob generates his lock $b_1\ b_2 \ldots b_\kappa$ and noise $q_1\ q_2 \ldots q_{n-\kappa}$ from his random noise generator.
  Per definition 3, Bob uses $\pi_B$ to set $t_{j_1} = b_1 \oplus a_1 \oplus m_1 \ldots t_{j_\kappa} = b_\kappa \oplus a_\kappa \oplus m_\kappa$.
  Using noise $q_1\ q_2 \ldots q_\kappa$ Bob completes scatter $\mathcal{T} = (t_1 \ldots t_n)$ and send to Alice.
  Alice extracts $b_1 \oplus a_1 \oplus m_1 \ldots b_\kappa \oplus a_\kappa \oplus m_\kappa$ from $\mathcal{T}$, using scatter map $\pi_B$.
  Alice removes her lock $a_1 \ldots a_\kappa$ by computing $a_1 \oplus (b_1 \oplus a_1 \oplus m_1) \ldots a_\kappa \oplus (b_\kappa \oplus a_\kappa \oplus m_\kappa)$. Alice generates noise $p_1\ p_2 \ldots p_{n-\kappa}$ from her random noise generator.
  Per definition 3, Alice uses $\pi_C$ to set $u_{l_1} = b_1 \oplus m_1 \ldots u_{l_\kappa} = b_\kappa \oplus m_\kappa$.
  Using noise $p_1\ p_2 \ldots p_\kappa$ Alice completes scatter $\mathcal{U} = (u_1 \ldots u_n)$ and sends to Bob.
  Bob receives $\mathcal{U} = (u_1 \ldots u_n)$.

-continued

Bob extracts $b_1 \oplus m_1 \ldots b_\kappa \oplus m_\kappa$ from $\mathcal{U}$, using scatter map $\pi_C$.
Bob removes his lock $b_1 \ldots b_\kappa$ by computing $b_1 \oplus (b_1 \oplus m_1) \ldots b_\kappa \oplus (b_\kappa \oplus m_\kappa)$.
}

In an embodiment of process 9, scatter maps $\pi_A$, $\pi_B$ and $\pi_C$ are executed by scatter map instructions 130 (FIG. 1B) and these instructions follow definition 3. In FIG. 2B, processor system 258 executes scatter map process instructions 130 during the execution of scatter maps $\pi_A$, $\pi_B$ and $\pi_C$. In an embodiment, scatter map process instructions 130 for $\pi_A$, $\pi_B$ and $\pi_C$ are stored in memory system 256 (FIG. 2B).

In an embodiment of process 9, output system 252 in FIG. 2B is used during the step Alice sends $\mathcal{S}=(s_1 \ldots s_n)$ to Bob. Output system 252 is part of sending machine 102 in FIG. 1A. In an embodiment of process 9, input system 254 in FIG. 2B is used during the step Bob receives $\mathcal{U}=(u_1 \ldots u_n)$. Input system 254 is a part of receiving machine 112 in FIG. 1A.

In other alternative, embodiments, the message size $\kappa$ is known to Eve.

In preferred embodiments, each scatter transmission should use a new lock and new noise. For example, if due to a failed transmission, Alice or Bob generated new noise but transmitted the same values of $a_1 \oplus m_1 \ldots a_\kappa \oplus m_\kappa$ and $b_1 \oplus m_1 \ldots b_\kappa \oplus m_\kappa$ and $b_1 \oplus a_1 \oplus m_1 \ldots b_\kappa \oplus a_\kappa \oplus m_\kappa$, then Eve could run a matching or correlation algorithm between the scatters $\mathcal{S}$, $\mathcal{T}$ or $\mathcal{U}$ in order to extract a permutation of message $m_1 \ldots m_\kappa$. During any kind of failed transmission, Alice and Bob should generate new locks from their respective random noise generators, just as they have to do for every iteration of the while loop in process 8.

In process 8, Alice's lock $a_1 \ldots a_\kappa$ is generated from her random noise generator. Hence, for every $(x_1, \ldots, x_\kappa) \in \{0, 1\}^\kappa$, the probability $P(a_1 \oplus m_1 = x_1, \ldots a_k \oplus m_\kappa = x_\kappa) = 2^{-\kappa}$. Similarly, Bob's lock $b_1 \ldots b_\kappa$ is generated from his random noise generator, so the probability $P(b_1 \oplus m_1 = x_1, \ldots b_\kappa \oplus m_\kappa = x_\kappa) = 2^{-\kappa}$ for every $(x_1, \ldots, x_\kappa) \in \{0, 1\}^\kappa$.

10.16 Key Exchange

A Diffie-Hellman exchange [64] is a key exchange method where two parties (Alice and Bob)—that have no prior knowledge of each other—jointly establish a shared secret over an unsecure communications channel. Sometimes the first party is called Alice and the second party is called Bob. Before the Diffie-Hellman key exchange is described it is helpful to review the mathematical definition of a group. A group G is a set with a binary operation * such that the following four properties hold: (i.) The binary operation * is closed on G. This means a*b lies in G for all elements a and b in G. (ii.) The binary operation * is associative on G. That is, a*(b*c)=(a*b)*c for all elements a, b, and c in G (iii.) There is a unique identity element e in G, where a*e=e*a=a. (iv). Each element a in G has a unique inverse denoted as $a^{-1}$. This means $a*a^{-1}=a^{-1}*a=e$.

g*g is denoted as $g^2$; g*g*g*g*g is denoted as $g^5$. Sometimes, the binary operation * will be omitted so that a*b is expressed as ab.

The integers { . . . ,−2, −1, 0, 1, 2, . . . } with respect to the binary operation + are an example of an infinite group. 0 is the identity element. For example, the inverse of 5 is −5 and the inverse of −107 is 107.

The set of permutations on n elements {1, 2, . . . , n}, denoted as $S_n$, is an example of a finite group with n! elements where the binary operation is function composition. Each element of $S_n$ is a function p:{1,2, . . . , n}→{1, 2, . . . , n} that is 1 to 1 and onto. In this context, p is called a permutation. The identity permutation e is the identity element in $S_n$, where e(k)=k for each k in {1, 2, . . . , n}.

If H is a non-empty subset of a group G and H is a group with respect to the binary group operation * of G, then H is called a subgroup of G. H is a proper subgroup of G if H is not equal to G (i.e., H is a proper subset of G). G is a cyclic group if G has no proper subgroups.

Define $A_n=\mathbb{Z}_n-[0]=\{[1], \ldots, [n-1]\}$; in other words, $A_n$ is the integers modulo n with equivalence class [0] removed. If n=5, [4]*[4]=[16 mod 5]=[1] in ($\mathbb{Z}_5$, *) Similarly, [3]*[4]=[12 mod 5]=[2] in ($\mathbb{Z}_5$, *). Let (a, n) represent the greatest common divisor of a and n. Let $U_n=\{[a] \in A_n:(a, n)=1\}$. Define binary operator on $U_n$ as [a]*[b]=[ab], where ab is the multiplication of positive integers a and b. Then ($U_n$, *) is a finite, commutative group.

Suppose g lies in group (G, *). This multiplicative notation works as follows: $g^2=g*g$. Also $g^3=g*g*g$; and so on. This multiplicative notation (superscripts) is used in the description of the Diffie-Hillman key exchange protocol described below.

For elliptic curves [65] the Weierstrauss curve group operation geometrically takes two points, draws a line through these two points, finds a new intersection point and then reflects this new intersection point about the y axis. When the two points are the same point, the commutative group operation computes a tangent line and then finds a new intersection point.

In another embodiment, elliptic curve computations are performed on an Edwards curve over a finite field. When the field K does not have characteristic two, an Edwards curve is of the form: $x^2+y^2=1+dx^2y^2$, where d is an element of the field K not equal to 0 and not equal to 1. For an Edwards curve of this form, the group binary operator * is defined as $$(x_1, y_1) * (x_2, y_2) = \left(\frac{x_1 y_2 + x_2 y_1}{1 + d x_1 x_2 y_1 y_2}, \frac{y_1 y_2 - x_1 x_2}{1 - d x_1 x_2 y_1 y_2}\right),$$

where the elements of the group are the points $(x_1, y_1)$ and $(x_2, y_2)$. The definition of * defines elliptic curve computations that form a commutative group. For more information on Edwards curves, refer to the math journal paper [66].

In an alternative embodiment, elliptic curve computations are performed on a Montgomery curve over a finite field. Let K be the finite field over which the elliptic curve is defined. A Montgomery curve is of the form $By^2=x^3+Ax^2+x$, for some field elements A, B chosen from K where $B(A^2-4)\neq 0$. For more information on Montogomery curves, refer to the publication [67].

There are an infinite number of finite groups and an infinite number of these groups are huge. The notion of huge means the following: if $2^{1024}$ is considered to be a huge number based on the computing power of current computers, then there are still an infinite number of finite, commutative groups with each group containing more than $2^{1024}$ elements.

Before the Diffie-Hellman key exchange is started, in some embodiments, Alice and Bob agree on a huge, finite commutative group (G, *) with group operation * and generating element g in G, where g has a huge order. In some embodiments, Alice and Bob sometimes agree on group (G, *) and element g before before the key exchange starts; g is assumed to be known by Eve. The group operations of G are expressed multiplicatively as explained previously.

In a standard Diffie-Hellman key exchange, Alice executes steps 1 and 3 and Bob executes steps 2 and 4.

1. Alice randomly generates private key a, where a is a large natural number, and sends $g^n$ to Bob.
2. Bob randomly generates private key b, where b is a large natural number, and sends $g^b$ to Alice.
3. Alice computes $(g^b)^a$.
4. Bob computes $(g^a)^b$.

After the key exchange is completed, Alice and Bob are now in possession of the same shared secret $g^{ab}$. The values of $(g^b)^a$ and $(g^a)^b$ are the same because G is a commutative group. Commutative means ab=ba for any elements a, b in G.

10.17 Hiding a Public Key Exchange

The Diffie-Hellman exchange [63, 64] is vulnerable to active man-in-the-middle attacks [68, 69, 70]. To address man-in-the-middle attacks, processes 10 and 11 show how to hide public session keys during a key exchange. In some embodiments, Alice and Bob have previously established secret scatter map $\sigma=(l_1, l_2 \ldots l_m)$ and authentication key κ with a one-time pad [44]. In another embodiment, Alice and Bob may establish σ and κ with a prior (distinct) Diffie-Hellman exchange that is resistant to quantum computers, executing Shor's algorithm [71] or an analogue of Shor's algorithm [72]. Alternatively, Alice and Bob may establish σ and κ via a different channel.

Let $h_\kappa$ denote an MAC (e.g., HMAC [73] or [74]) function which will be used to authenticate the scattered transmission. The use of $h_\kappa$ helps hinder the following attack by Eve. An active Eve could flip a bit at bit location l in the scattered transmission. If no authentication occurs on the noise and the hidden key bits, then upon Alice resending a scattered transmission due to Alice and Bob not arriving at the same session key secret, Eve gains information that l lies in σ. If the scattered transmission $\mathcal{S}$ is not authenticated, Eve's manipulation of the bits in $\mathcal{S}$ helps her violate rule 6.

Hiding Process 10. First Party Hiding and Sending a Public Key to a Second Party Hiding Process 10. First Party Hiding and Sending a Public Key to a Second Party

```
Alice's random noise generator generates and computes private key a.
Alice uses group operation * to compute public key g^a = k_1 k_2 ... k_m from private key a
and generator g.
Alice generates noise r_1 r_2 . . . r_ρ from her random noise generator.
Per definition 3, Alice uses σ to find the hiding locations and set s_{l_1} = k_1 . . . s_{l_m} = k_m.
Alice stores noise r_1 r_2 . . . r_ρ in the remaining noise locations, resulting in S = (s_1 . . . s_n).
Alice computes h_κ(S).
Alice sends S and h_κ(S) to Bob.
Bob receives S' and h_κ(S) from Alice.
Bob computes h_κ(S') and checks it against h_κ(S).
If h_κ(S') is valid
{
  Bob uses σ to extract g^a = k_1 ... k_m from S.
  Bob computes shared secret g^{ab}.
}
else
{
  Bob rejects S' and asks Alice to resend S.
}
```

Note that Alice sends S and Bob receives S' because during the transmission from Alice to Bob S may be tampered with by Eve or $\mathcal{S}$ may change due to physical effects. In an embodiment of process 10, Bob's steps are performed in receiving machine 112. In an embodiment of process 10, Alice's steps are performed in sending machine 102. In an embodiment of process 10, private key(s) 103 is a and public key(s) 104 is $g^a$. In an embodiment of process 10, scatter map σ finds the hiding locations with scatter map instructions 130.

In an embodiment, the size of the transmission S (hidden public keys 109) is n=8192 bits and the noise size ρ=6400. According to $\sigma=(l_1, l_2 \ldots l_m)$, the kth bit of P is stored in bit location $l_k$. Generator g is an element of a commutative group (G, *) with a huge order. In some embodiments, G is a cyclic group and the number of elements in G is a prime number. In an embodiment, generator g has an order $o(g) > 10^{80}$. In another embodiment, generator g has an order o(g) greater than $10^{1000}$. In an embodiment, Alice randomly generates with non-deterministic generator 942 in FIG. 9A, which is an instance of random generator 128 and computes private key a with private key instructions 124. In an embodiment, Alice's public key instructions 126 compute her public key as $g^a = g * \ldots * g$ where g is multiplied by itself a times, using the group operations in (G, *). In some embodiments, the private key is randomly selected from the positive integers $\{1, 2, 3, \ldots, o(g)-1\}$.

Hiding Process 11. Second Party Hiding and Sending a Public Key to the First Party

| Hiding Process 11. Second Party Hiding and Sending a Public Key to the First Party |
| --- |
| Bob's random noise generator generates and computes private key b. |
| Bob uses group operation * to compute public key $g^b = j_1 j_2 \ldots j_m$ from Bob's private key b and generator g. |
| Bob generates noise $q_1 q_2 \ldots q_p$ from his random noise generator. |
| Per definition $\mathcal{3}$, Bob uses $\sigma$ to find the hiding locations and set $s_{l_1} = j_1 \ldots s_{l_m} = j_m$. |
| Bob stores noise $q_1 q_2 \ldots q_p$ in the remaining noise locations, resulting in $\mathcal{T} = (t_1 \ldots t_n)$. |
| Bob computes $h_\kappa(\mathcal{T})$. |
| Bob sends $\mathcal{T}$ and $h_\kappa(\mathcal{T})$ to Alice. |
| Alice receives $\mathcal{T}'$ and $h_\kappa(\mathcal{T})$ from Bob. |
| Alice computes $h_\kappa(\mathcal{T}')$ and checks it against $h_\kappa(\mathcal{T})$. |
| If $h_k(\mathcal{T}')$ is valid |
| { |
| Alice uses $\sigma$ to extract $g^b = j_1 \ldots j_m$ from $\mathcal{T}$. |
| Alice computes shared secret $g^{ba}$. |
| } |
| else |
| { |
| Alice rejects $\mathcal{T}'$ and asks Bob to resend $\mathcal{T}$. |
| } |

Note that Bob sends T and Alice receives T' because during the transmission from Bob to Alice T may be tampered with by Eve or T may change due to physical effects. In an embodiment of process 11, Alice's steps are performed in receiving machine 112. In an embodiment of process 11, Bob's steps are performed in sending machine 102. In an embodiment of process 11, private key(s) 103 is b and public key(s) 104 is $g^b$. In an embodiment of process 11, scatter map $\sigma$ finds the hiding locations with scatter map instructions 130.

In an embodiment, Bob randomly generates with non-deterministic generator 952 in FIG. 9B, which is an instance of random generator 128 and computes private key b with private key instructions 124. In an embodiment, Bob's public key instructions 126 compute his public key as $g^b = g * \ldots * g$ where g is multiplied by itself b times, using the group operations in (G, *). In some embodiments, the private key b is randomly selected from the positive integers $\{1, 2, 3, \ldots, o(g)-1\}$. In some embodiments of 10 and 11, the public keys are computed with elliptic curve computations over a finite field; in other words, G is an elliptic curve group. In other embodiments, the public keys are RSA public keys. In some embodiments, the public keys are public session keys, which means the public session keys change after every transmission $\mathcal{S}$ in process 10 and after every transmission $\mathcal{T}$ in process 11.

In some embodiments, hiding a public key during an exchange between Alice and Bob has an advantage over hiding a symmetric key: processes 10 and 11 can be used by Alice and Bob, before a subsequent encrypted communication, to communicate a short authentication secret (SAS) [77] via a different channel.

Let a, b be Alice and Bob's private keys, respectively. Let $e_1$, $e_2$ be Eve's private keys. For a key exchange, if Eve is in the middle, Eve computes $g^{e_1 a}$ with Alice; Eve computes $g^{e_2 b}$ with Bob. When Alice and Bob verify their SAS with high probability $g^{e_1 a} \neq g^{e_1 b}$ when |G| is huge,. Thus, $h_\kappa(g^{e_1 a}) \neq h_\kappa(g^{e_1 b})$ with high probability, regardless of whether Eve's private keys satisfy $e_1 \neq e_2$. By communicating their short authentication secret to each other via a different channel, Alice and Bob can detect that Eve captured $\sigma$ before processes 10 and 11 were executed. Eve cannot duplicate the SAS secret because Eve doesn't know Alice's private key a and Eve doesn't know Bob's private key b. This type out-of-channel authentication won't work for symmetric keys hidden inside noise. Furthermore, one anticipates that Eve will try to capture $\sigma$ since complexity analysis can show that if Eve doesn't know $\sigma$, the complexity for Eve performing a man-in-the-middle can be substantially greater than the conjectured complexity of the public session keys when the noise size is sufficiently large.

It it is important to recognize the difference between SAS and hiding the public keys in random noise: they are complementary methods. SAS helps notify Alice and Bob that a man-in-the-middle on a standard Diffie-Hellman exchange has occurred, but SAS DOES NOT stop a man-in-the-middle attack. SAS does not stop an adversary who has unforeseen computing power or unknown mathematical techniques. The standard Diffie-Hellman exchange depends upon the conjectured computational complexity of the underlying commutative group operation * on G. If Eve is recording all network traffic, hiding public session keys inside random noise can stop Eve from breaking the standard key exchange even if Eve has already discovered a huge, computational or mathematical breakthrough on the underlying group G or if Eve finds one at some point in the future. Public keys that are resistant to quantum computing algorithms such as Shor's algorithm are quite large (e.g., 1 million bytes and in some cases substantially larger than 1 million bytes). In contrast, 1024 bytes of hidden public keys inside noise can provide adequate protection against quantum algorithms; in other embodiments, 4096 bytes of hidden public keys inside noise provides strong protection against quantum algorithms. Processes 10 and 11 complementary property to SAS depends upon Eve not obtaining $\sigma$; in some embodiments, a one-time pad may be feasible to establish $\sigma$ between Alice and Bob.

11 Hiding Signals with a Random Nonce

We describe machine-implemented methods for creating a random scatter map, and for hiding a signal with a random nonce. In an embodiment, the hidden signal is a public key. In an embodiment, the hidden signal is one or more machine instructions. In an embodiment, the hidden signal is data (information). Machine procedure 1 describes how to randomly create a scatter map $\pi$ in $\mathcal{L}_{n,n}$. In an embodiment of machine procedure 1, FIG. 20 shows an embodiment of a quantum random number generator that creates the randomness used by machine procedure 1. In some embodiments, instead of a 3-bit counter, the counter is a 8-bit counter that stores the random bits $r_0$, $r_1$, $r_2$, $r_3$, $r_4$, $r_5$, $r_6$, and $r_7$. In some embodiments, instead of a 3-bit counter, the counter is a 32-bit counter that stores the random bits $r_0$, $r_1$, $r_2$, $r_3$, $r_4$, $r_5$, $r_6$, $r_7$, $r_8$, $r_9$, $r_{10}$, $r_{11}$, $r_{12}$, $r_{13}$, $r_{14}$, $r_{15}$, $r_{16}$, $r_{17}$, $r_{18}$, $r_{19}$, $r_{20}$, $r_{21}$, $r_{22}$, $r_{23}$, $r_{24}$, $r_{25}$, $r_{26}$, $r_{27}$, $r_{28}$, $r_{29}$, $r_{30}$, $r_{31}$.

In another embodiment of machine procedure 1, FIG. 21 shows a quantum random number generator that creates the randomness used by machine procedure 1.

Machine Procedure 1. Random Scatter Map π

```
Input: n.
Variables: j, r, t, l_1, l_2, . . . l_n.
l_1 := 1   l_2 := 2 . . . l_n := n   j := n
while j ≥ 2 {
  An RNG randomly chooses r in {1, 2, . .. , j}
   t := l_r
   l_r := l_j
   l_j := t
   j := j − 1
}
Output: π = (l_1 l_2 . . . l_n) in ℒ_{n,n}.
```

RNG refers to a random number generator. In some embodiments, an RNG is a quantum random number generator (QRNG). FIG. 21 shows an embodiment of a quantum random number generator. FIG. 20 shows an embodiment of a quantum random number generator that uses a counter to generate random bits. Alice and Bob use π and a random nonce to create a new, unpredictable scatter map σ for each scattered transmission. The random nonce enables Alice and Bob to use hiding locations that unpredictably change during each scattered transmission. In machine-implemented methods, it is assumed that Alice and Bob have previously established secret scatter map $\pi=(l_1, l_2 \ldots l_n)$ and authentication key κ. Alice and Bob may establish π and κ with a prior (distinct) Diffie-Hellman exchange, where their public keys are signed in a secure computing environment; or they establish π and κ via a private channel or a one-time use of QSDC when it is commercially available. In some embodiments, $h_\kappa$ is implemented with SHA-512. $h_\kappa$ is used to authenticate a scattered transmission.

Machine procedure 2 uses a random nonce $\mathcal{N}$, scatter map $\pi=(l_1 l_2 \ldots l_n)$ and key κ to create a new unpredictable scatter map σ. A random nonce effectively generates a dynamic hidden channel, by randomly changing the bit locations of the hidden signal. Alice and Bob share both $\mathcal{N}$, π, and κ.

FIG. 20 shows an embodiment of a quantum random number generator that produces the randomness that helps create map π, key κ, and random nonce $\mathcal{N}$ that are used by machine procedure 2. In some embodiments, instead of a 3-bit counter, the counter is a 8-bit counter that stores the random bits $r_0$, $r_1$, $r_2$, $r_3$, $r_4$, $r_5$, $r_6$, and $r_7$, and in other embodiments a 64-bit counter is used. In another embodiment of machine procedure 2, FIG. 21 shows a quantum random number generator that creates randomness used by machine procedure 2.

Machine Procedure 2. Compute Random Nonce Scatter Map σ

```
Inputs: Signal & Scatter Sizes m, n & m ≤ n.
     Map π = (l_1 l_2 . . . l_n). Key κ. Nonce 𝒩.
q_1 := l_1   q_2 := l_2 . . . q_n := l_n   j := n
while j ≥ 2 {
   κ := V(κ) ⊕ ℛ(κ, 8)
   𝒩 = 4(κ𝒩) ⊕ ℛ(𝒩, 8)
   r := (𝒩 mod j) + 1
   t := q_r
   q_r := q_j
   q_j := t
   j := j − 1
}
Output: σ = (q_1 q_2 . . . q_m) in ℒ_{m,n}.
```

In machine procedure 2, Ψ is a one-way hash function such as SHA-512 [53], executed by one or more machine instructions. In procedure 2, the machine instructions, that execute $\kappa\mathcal{N}$, concatenate bit strings κ and $\mathcal{N}$. The ⊕ operator in A⊕B compute bitwise exclusive-or between bit strings A and B; if necessary, trailing 0's are concatenated to the shorter string.

$|A|$ is the number of bits in bit string A. If $A=a_n\, a_{n-1} \ldots a_2\, a_1$, then $|A|=n$. The one or more machine instructions, that execute $\mathcal{R}(A, 8)$, rotate A by 8 bits to the right. The result of $\mathcal{R}(A, 8)=a_8\, a_7 \ldots a_1\, a_n\, a_{n-1} \ldots a_9$. The one or more machine instructions, that execute $\Psi(\kappa)\oplus\mathcal{R}(A, 8)$, perform a bitwise-exclusive or between $\Psi(\kappa)$ and $\mathcal{R}(A, 8)$. In another embodiment, one or more instructions execute $\mathcal{R}(A, j)$ in machine procedure 2, where j is a positive integer. In another embodiment, j=1 bit. In another embodiment, j=19 bits. In another embodiment, j=1001 bits when n is at least 1001.

In machine 2, $\mathcal{N}$ is a bit string. In the assignment $r:=(\mathcal{N} \bmod j)+1$, one or more machine instructions execute modular arithmetic $\mathcal{N} \bmod j$, where $\mathcal{N}$ is a non-negative integer, in base 2. For example, if $\mathcal{N}$=1001 1110 0001 1011, and j=17, then machine instruction(s) perform the computation $\mathcal{N} \bmod j=(2^0+2^1+2^3+2^4+2^9+2^{10}+2^{11}+2^{12}+2^{15}) \bmod 17=40475 \bmod 17=15$. Hence, r:=15+1=16, so index r stores 16 after $r:=(\mathcal{N} \bmod j)+1$ is executed by one or more machine instructions. In procedure 2, $n<2^M$ is recommended, where $M=\min\{|\Psi(\kappa\mathcal{N})|, |\mathcal{N}|\}$ In procedure 3, Alice hides her public key using random nonce $\mathcal{N}$. When Bob sends his public key to Alice, their roles are swapped in procedures 2 and 3. Bob executes the same steps as Alice and Alice executes the same steps as Bob. For example, Bob creates a random nonce instead of Alice before sending his nonce.

Machine Procedure 3. Alice Hides a Public Key with a Public Nonce

```
Alice's RNG creates private key K.
Alice computes public key P = p_1 . . . p_m.
Alice's RNG creates noise r_1 r_2 . . . r_ρ.
Alice's RNG creates a random nonce 𝒩.
Alice executes procedure 2 and computes σ from π, κ, 𝒩.
Alice hides her public key at bit locations determined by σ. That is, s_{q_1} = p_1 . . . s_{q_m} = p_m.
Alice stores r_1 . . . r_ρ in 𝒮 = (s_1 . . . s_n).
Alice sends 𝒮, 𝒩 and h_κ(𝒩𝒮) to Bob.
Bob receives 𝒮', 𝒩' and h_κ(𝒩𝒮) from Alice.
Bob compares h_κ(𝒩'𝒮') and h_κ(𝒩𝒮).
if h_κ(𝒩'𝒮') is valid   {
```

-continued

Bob executes machine procedure 2 with inputs $\pi$, $\kappa$, $\mathcal{N}$ and computes scatter map $\sigma$.
Bob uses scatter map $\sigma$ to extract public key $p_1 \ldots p_m$. }
else { Bob rejects $\mathcal{S}'$.
Alice resends $\mathcal{S}$, $\mathcal{N}$ and $h_\kappa(\mathcal{N}\mathcal{S})$. }

In an embodiment of machine procedure 3, FIG. 20 shows a random number generator (RNG) that creates the randomness used by machine procedure 3. In some embodiments, instead of a 3-bit counter, the counter is a 8-bit counter that stores the random bits $r_0$, $r_1$, $r_2$, $r_3$, $r_4$, $r_5$, $r_6$, and $r_7$, and in other embodiments a 16-bit counter can be used. In another embodiment of machine procedure 3, FIG. 21 shows a random number generator (RNG) that creates the randomness used by machine procedure 3.

Machine Procedure 4. Alice Hides Data (Information) with a Public Nonce

Input: Data $d_1 \ldots d_m$.
Alice's RNG creates noise $r_1\ r_2 \ldots r_\rho$.
Alice's RNG creates a random nonce $\mathcal{N}$.
Alice executes procedure 2 and computes $\sigma$ from $\pi$, $\kappa$, $\mathcal{N}$.
Alice hides her data at bit locations determined by $\sigma$. That is, $s_{q_1} = d_1 \ldots s_{q_m} = d_m$.
Alice stores $r_1 \ldots r_\rho$ in $\mathcal{S} = (s_1 \ldots s_n)$.
Alice sends $\mathcal{S}$, $\mathcal{N}$ and $h_\kappa(\mathcal{N}\mathcal{S})$ to Bob.
Bob receives $\mathcal{S}'$, $\mathcal{N}'$ and $h_\kappa(\mathcal{N}\mathcal{S})$ from Alice.
Bob compares $h_\kappa(\mathcal{N}'\mathcal{S}')$ and $h_\kappa(\mathcal{N}\mathcal{S})$.
if $h_\kappa(\mathcal{N}'\mathcal{S}')$ is valid {
Bob executes machine procedure 2 with inputs $\pi$, $\kappa$, $\mathcal{N}$ and computes scatter map $\sigma$.
Bob uses scatter map $\sigma$ to extract data $d_1 \ldots d_m$. }
else { Bob rejects $\mathcal{S}'$.
Alice resends $\mathcal{S}$, $\mathcal{N}$ and $h_\kappa(\mathcal{N}\mathcal{S})$. }

In an embodiment of machine procedure 4, FIG. 20 shows a random number generator (RNG) that creates the randomness used by machine procedure 4. In some embodiments, instead of a 3-bit counter, the counter is a 8-bit counter that stores the random bits $r_0$, $r_1$, $r_2$, $r_3$, $r_4$, $r_5$, $r_6$, and $r_7$, and in other embodiments a 16-bit counter can be used. In another embodiment of machine procedure 4, FIG. 21 shows a random number generator (RNG) that creates the randomness used by machine procedure 4.

Procedure 5 is similar to procedure 3 except it also hides the random nonce. There are a few differences. Alice and Bob share $\pi=(l_1 \ldots l_{k_1}\ c_1 \ldots c_{k_2})$ in $\mathcal{L}_{m,n}$ where $k_1+k_2=m$. $\{l_1, \ldots l_{k_1}\} \cap \{c_1, \ldots c_{k_2}\}=\theta$. Also, $l_i \neq l_j$ and $c_i \neq c_j$ when $i \neq j$. $k_1$ is the number of bits of the public key. $k_2$ is the number of bits of the private nonce $\mathcal{N}$. Alice creates $\mathcal{N}$ with an RNG. Alice executes a variant of procedure 2 ($m=k_1$) with $\mathcal{N}$ to randomly derive $\sigma$ in $\mathcal{L}_{k_1, n-k_2}$ from $(l_1 \ldots l_{k_1})$. $\sigma$'s bit locations are randomly chosen in $\{1, \ldots, n\}-\{c_1, \ldots, c_{k_2}\}$. Alice hides her public key with $\sigma$. Alice hides $\mathcal{N}$'s bits at locations $c_1, \ldots c_{k_2}$ before sending $\mathcal{S}$ to Bob. After Bob receives $\mathcal{S}$, he uses $(c_1 \ldots c_{k_2})$ to extract hidden nonce $\mathcal{N}$. Bob executes a variant of procedure 2 with nonce $\mathcal{N}$ to find $\sigma$. A machine-implemented method of procedure 5 is shown below.

Machine Procedure 5. Alice Hides her Public Key with a Hidden Nonce and Bob Extracts her Key Alice's RNG creates private key K.
Alice computes public key $P = p_1 \ldots p_m$.
Alice's RNG creates noise $r_1\ r_2 \ldots r_\rho$.
Alice's RNG creates a random nonce $\mathcal{N}$.
Alice executes machine procedure 2 and computes $\sigma$ from $\pi$, $\kappa$, $\mathcal{N}$.
Alice uses $\sigma$ to hide public key bits $p_1, \ldots p_m$ at bit locations $s_{q_1}, s_{q_2}, \ldots s_{q_m}$.
Alice uses $\pi$ to hide nonce $\mathcal{N}$ at bit locations $c_1, \ldots c_{k_2}$.

-continued

```
Alice stores r_1 . . . r_ρ in S = (s_1 . . . s_n).
Alice sends S and h_κ(S) to Bob.
Bob receives S' and h_κ(S) from Alice.
Bob compares h_κ(S') and h_κ(S).
if h_κ(S') is valid  {
   Bob uses π to extract hidden nonce N from bit locations c_1, . . . c_k2.
   Bob executes machine procedure 2 with inputs π, κ, N and extracts scatter map σ.
   Bob uses σ to extract p_1 . . . p_m.  }
else  {  Bob rejects S'.
      Alice resends S and h_κ(S).  }
```

In an embodiment of machine procedure 5, FIG. 20 shows a random number generator (RNG) that creates the randomness used by machine procedure 5. In some embodiments, instead of a 3-bit counter, the counter is a 20-bit counter that stores the random bits $r_0$, $r_1$, $r_2$, $r_3$, $r_4$, $r_5$, $r_6$, and $r_7$, and in other embodiments a 96-bit counter can be used. In another embodiment of machine procedure 5, FIG. 21 shows a random number generator (RNG) that creates the randomness used by machine procedure 5.

In machine procedure 6, Alice hides her data in noise using a nonce that also is hidden in the noise.

Machine Procedure 6. Alice Hides her Data with a Hidden Nonce and Bob Extracts Alice's Data

```
Input: Data d_1 . . . d_m.
Alice's RNG creates noise r_1 r_2 . . . r_ρ.
Alice's RNG creates a random nonce N.
Alice executes machine procedure 2 and computes σ from π, κ, N.
Alice uses σ to hide her data bits d_1, . . . d_m at bit locations s_q1, s_q2, . . . s_qm.
Alice uses π to hide nonce N at bit locations c_1, . . . c_k2.
Alice stores r_1 . . . r_ρ in S = (s_1 . . . s_n).
Alice sends S and h_κ(S) to Bob.
Bob receives S' and h_κ(S) from Alice.
Bob compares h_κ(S') and h_κ(S).
if h_κ(S') is valid  {
   Bob uses π to extract hidden nonce N from bit locations c_1, . . . c_k2.
   Bob executes machine procedure 2 with inputs π, κ, N and extracts scatter map σ.
   Bob uses σ to extract Alice's hidden data d_1 . . . d_m.  }
else  {  Bob rejects S'.
      Alice resends S and h_κ(S).  }
```

In an embodiment of machine procedure 6, FIG. 20 shows a random number generator (RNG) that creates the randomness used by machine procedure 6. In some embodiments, instead of a 3-bit counter, the counter is a 12-bit counter that stores the random bits $r_0$, $r_1$, $r_2$, $r_3$, $r_4$, $r_5$, $r_6$, and $r_7$, and in other embodiments a 128-bit counter can be used. In another embodiment of machine procedure 6, FIG. 21 shows a random number generator (RNG) that creates the randomness used by machine procedure 6.

Let (X, P) be a probability space, P(X)=1. If event $A=\{a_1, \ldots a_N\} \subset X$ is a finite set, A's entropy is defined $$H(A) = -\sum_{i=1}^{N} P(a_i)\log_2 P(a_i).$$

If event $B=\{b_1, \ldots b_M\}$, then define conditional entropy $$H(B \mid a_i) = -\sum_{j=1}^{M} P(b_j \mid a_i)\log_2 P(b_j \mid a_i).$$

Define conditional entropy $$H(B \mid A) = \sum_{i=1}^{N} P(a_i)H(B \mid a_i).$$

Machine Property 7. Entropy Invariance of Procedure 5

Suppose an RNG generating the noise and random nonce $\mathcal{N}$ and the signal satisfy axioms 1 and 2. Suppose $\mathcal{N}$ is hidden with procedure 5, and $\pi=(l_1 \ldots l_{k_1}\, c_1 \ldots c_{k_2})$. If the first 3 steps inside the while loop in procedure 2 randomly select index r with a uniform distribution on {1, 2, . . . , n}, then the entropy $H(\pi)=H(\pi \mid \text{Eve sees } \mathcal{S}(1), \ldots, \mathcal{S}(k))$.

Since r's selection is uniformly distributed on {1 . . . n}, σ is randomly selected by procedure 2, based on κ and $\mathcal{N}$, with a uniform distribution on $\mathcal{L}_{k_1,n-k_2}$, independent of π. (Section 11.1 discusses Diehard statistical tests on r's distribution.) For each $\mathcal{S}(k)$ seen by Eve, $\mathcal{N}$ is randomly generated and hidden from Eve. Eve gains no information about π as every σ in $\mathcal{L}_{k_1,n-k_2}$ is uniformly reachable.

Machine Property 7 is a valuable security property because it shows that Eve gains no information about map π after observing multiple scattered transmissions. Machine Property 7 also verifies the security value of using a hidden nonce.

11.1 Statistical Testing of Procedure 2

Diehard tests [75] statistically verify that the math theory in machine property 7 has valid assumptions, when analyzing procedures 2 and 5. For every test, the random bytes were generated by a quantum random number generator (constructed from a flip-flop circuit, pulsing LED, and photon detector, as shown in FIG. 21), called by C function int qrng(uchar*private_key, int num_bytes). 10 MB control files were also created with function make_diehard_control_file( ).

Thirteen Diehard tests were applied to each of the following parameter values, pertaining to the random nonce procedure 2. For $\Psi$=SHA-512, Diehard tests on the first 3 steps inside the while loop of procedure 2 statistically verified a uniform distribution of index r on {1, 2, . . . , n} for n=8192 with nonce sizes $|\mathcal{N}|$={128, 256, 512, 1024, 2048, 4096, 8192}.

The 13 Diehard tests are (1) Birthday Spacings. (2) Ranks of 31×31 and 32×32 Matrices. (3) Ranks of 6×8 Matrices. (4) Monkey Tests on 20-bit Words. (5) Monkey Tests OPSO, OQSO, DNA. (6) Count the 1's in a Stream of Bytes. (7) Count the 1's in Specific Bytes. (8) Parking Lot Test. (9) Minimum Distance Test. (10) Random Spheres Test. (11) Squeeze Test. (12) Runs Test. (13) Craps Test. The Overlapping Permutations and Overlapping Sums tests were omitted: physicist Robert Brown observed that overlapping bit sequences are not independent and the weak inverses of covariance matrices have implementation errors [76].

11.2 An Elliptic Curve Embodiment of Procedures 3 and 5

In one particular embodiment of procedures 3 and 5, the public keys are generated from elliptic curve 25519 [78]. Some notation and definitions are needed. A byte is an element in {0, 1, . . . , 255}. For each number c∈{0, 1, . . . , $2^{256}-1$}, c→$\underline{c}$ is the standard little-endian bijection $$\underline{c} = \left(c\bmod 256, \left\lfloor\frac{c}{256}\right\rfloor \bmod 256, \ldots, \left\lfloor\frac{c}{256^{31}}\right\rfloor \bmod 256\right)$$

(a 32-byte string).

Public 25519 keys are defined as $\mathcal{P}_{25519}$={0, 1, . . . , 255}$^{32}$. In procedure 3 or 5, m=255 and the first 8 bits $p_1 \ldots p_8$ in $\mathcal{P}$ correspond to the first byte in {0, 1, . . . , 255}$^{32}$; the next 8 bits $p_9 \ldots p_{16}$ in $\mathcal{P}$ correspond to the second byte in {0, 1, . . . , 255}$^{32}$; and so on. The most significant bit is not hidden because the last byte is always in {0, 1, . . . , 127}.

A scattered transmission has size n=8192 bits. m=255 bits is the signal size. Noise size ρ=n−m=7937. Per $\sigma=(q_1, q_2 \ldots q_m)$ in procedure 3, the kth bit of $\mathcal{P}$ is stored in bit location $q_\kappa$. Private 25519 keys are randomly selected from $S_{25519}$={0, 8, 16, . . . 248}×{0, 1, . . . 255}$^{30}$×{64, 65, . . . , 127}. $|S_{25519}|=2^{251}$. Algorithm $\mathcal{A}$ computes $\mathcal{A}: S_{25519}\times\mathcal{P}_{25519}\to\mathcal{P}_{25519}$.

Procedures 3 and 5 have a useful property. Alice and Bob can communicate a short authentication string (SAS) [77] before a subsequent encrypted communication via a different channel.[1] Let a, b be Alice and Bob's private keys, respectively. Let $e_1$, $e_2$ be Eve's private keys. During a MITM, Eve computes $\mathcal{A}(e_1, \mathcal{A}(a, 9))$ with Alice. Eve computes $\mathcal{A}(e_2, \mathcal{A}(b, 9))$ with Bob. When Alice and Bob verify a SAS, $\mathcal{A}(e_1, \mathcal{A}(a, 9))\neq\mathcal{A}(e_2, \mathcal{A}(b, 9)$ with high probability. $h_\kappa(\mathcal{A}(e_1, \mathcal{A}(a, 9)\neq h_\kappa(\mathcal{A}(e_2, \mathcal{A}(b, 9)$ holds with high probability. By sending a SAS on a different channel, Alice and Bob can detect if Eve knows π. SAS authentication won't work for symmetric keys. Section 10.14 shows that if Eve doesn't know π, Eve's complexity is substantially greater than the conjectured classical complexity of the public keys. (The conjectured complexity of 25519 public keys is $2^{128}$ [78].)

Using a SAS and hiding public keys in random noise are complementary. SAS is not effective if Eve uses unforeseen computational techniques: a standard Diffie-Hellman exchange depends upon the computational complexity of the underlying abelian group. A quantum algorithm similar to Shor's can break the 25519 elliptic curve in time $O(n^2)$ or $O(n^3)$, depending on the quantum hardware implementation. They estimate a 1000 qubit quantum computer can break a 160 bit elliptic curve.

11.3 Statistical Testing of Public 25519 Keys

Diehard tests were also performed on random public 25519 keys to assure that the math theory in section 10.11 covers procedures 3 and 5. A public key is computed by applying algorithm $\mathcal{A}$ to a randomly generated 25519 private key. The tests determine if a public key's bits statistically satisfy a uniform distribution, i.e. no bias and independence. The following steps generated 255 files of test data.

```
do 80 million times   {
randomly generate a private 25519 key κ.
compute public 25519 key P from κ.
for each ith bit b_i in byte j of P
   write bit b_i in byte_j_bit_i.txt   }
```

[1] Alice and Bob can verify a 4 to 5 word SAS with a phone speaker.

Each of these 255 files (e.g., byte_31_bit_5.txt) contains 10 million bytes of data. For every test file, the random bytes, in each 25519 private key, were generated by a quantum random number generator (constructed from a flip-flop circuit, Pulsing LED and Photon Detector shown in FIG. 21), called by C function int qrng(uchar*private_key, int num_bytes). For the Diehard tests, 10 MB control files were created with function make_diehard_control_file( ).

```
#define DHC   "diehard_control . txt"
int   make_diehard_control_file ( ) {
uchar   private_key[32] ;
int   i, k;
FILE*   fp = fopen (DHC, "wb");
if (fp == 0)   {
   printf ("\n Unable to open %s", DHC) ;
   return   -1;
}
for(i = 1; i <= 312500; i++)   {
   qrng(private_key, 32) ;
   for(k = 0; k < 32; k++)
      fprintf(fp, "%c", private_key[k]) ;
}
return fclose(fp) ;
}
```

Thirteen Diehard tests were applied to each of the 255 test files with filenames byte_k_bit_i.txt, where 0≤k≤31 and 0≤i≤7, excluding k=31 and i=7. The 13 Diehard tests are (1) Birthday Spacings. (2) Ranks of 31×31 and 32×32 Matrices. (3) Ranks of 6×8 Matrices. (4) Monkey Tests on 20-bit Words. (5) Monkey Tests OPSO, OQSO, DNA. (6) Count the 1's in a Stream of Bytes. (7) Count the 1's in Specific Bytes. (8) Parking Lot Test. (9) Minimum Distance Test. (10) Random Spheres Test. (11) Squeeze Test. (12) Runs Test. (13) Craps Test. The Overlapping Permutations and Overlapping Sums tests were omitted: physicist Robert Brown observed that overlapping bit sequences are not independent and the weak inverses of covariance matrices have implementation errors [76].

The control files and the 255 files passed all of the 13 Diehard tests. There were no statistically significant differences between Diehard tests on the control files and Diehard tests for each of the 255 files byte_k_bit_i.txt.

12 Discussion of Testing and Complexity

Two assumptions below help assure that information is not unnecessarily leaked to Eve.

Rule 5. New Noise and New Signal

For each scattered transmission, described in procedures 3, 4, 5, and 6 it is assumed that Alice creates a new signal $k_1 \ldots k_m$, new noise $r_1 \ldots r_{n-m}$, and a new nonce from a QRNG that all satisfy randomness properties 1 and 2.

Rule 6. No Auxiliary Information

During the kth scattered transmission $\mathcal{S}(k)$, it is assumed that Eve only observes $\mathcal{S}(k)$. Eve receives no auxiliary information from Alice or Bob.

Suppose 255 bits of the 25519 public key $\mathcal{P}$ are hidden inside of 7937 bits of noise. (Byte 31's most significant bit is always 0, so 255 bits are hidden.) Then the scatter size n=8192 bits. There are 8192 possible locations to hide the first bit of $\mathcal{P}$; 8191 locations to hide the second bit of $\mathcal{P}$; . . . ; and 7938 locations to hide the 255th bit of $\mathcal{P}$. Hence, the scatter map complexity is $|\mathcal{L}_{255,8192}|>10^{997}$. The brute-force complexity of a 25519 private key is $2^{254}\approx 10^{77}$. The complexity of hiding 255 bits of public key in 7937 bits of noise exceeds the complexity of a 25519 private key by more than 919 orders of magnitude.

If Eve does not receive any auxiliary information, Diehard tests show that it is extremely unlikely that Eve can extract any information about the bit locations even after observing 80 million public keys. For Eve to launch a MITM attack on the key exchange in procedure 3, she must know $\sigma$ in $\mathcal{L}_{255,8192}$.

If Alice and Bob encrypt their subsequent communication with symmetric cryptography algorithms in a distinct channel that Eve does not have access to, then the statistics from the Diehard tests suggest that Eve will never be able to find any of the bit locations of $\sigma\in\mathcal{L}_{255,8192}$. Even if Eve has enough computing power to brute-force search each element $\sigma\in\mathcal{L}_{255,8192}$ and subsequently find public key $\mathcal{P}$, Eve still has no way of knowing if this particular $\sigma$ is the scatter map that Alice and Bob used. (Even quantum computing is currently unrealistic for this brute-force search as $$\left.\frac{8192!}{7937!} > 10^{997}.\right)$$

If there are at least 255 ones and 255 zeroes in the scattered transmission $\mathcal{S}(k)$, every possible public key can be hidden in $\mathcal{S}(k)$.

Eve requires auxiliary information to execute an attack on this hidden key exchange. In many practical cases, Alice and Bob use the same channel to perform their encrypted communication so Eve will be able to observe this encrypted communication. We examine what Eve can accomplish when assumption 6 is violated.

Following Kerckhoff's principle, assume that Eve knows Alice and Bob's symmetric cryptography algorithms and the algorithm that derives the symmetric key(s) from the key exchange in procedure 3. Assume that Eve can break the symmetric cryptography algorithms and find the symmetric key s used for that particular encrypted communication between Alice and Bob. After this, Eve must also search for Alice's private key a and Bob's private key b such that $\mathcal{A}(b, \mathcal{A}(a, 9))=s$. This search has a complexity of at least $2^{251}$ because the size of private key space $S_{25519}=2^{251}$; for each public key $\mathcal{P}\in\mathcal{P}_{25519}$, the map $\mathcal{A}(x, \mathcal{P})$ is 1-to-1 on $S_{25519}$; and s is a constant for this search. If SHA-512 derives the symmetric cryptography key(s) from the shared secret established by procedure 3 then Eve must also execute a preimage attack on SHA-512.

Our complexity estimate is simplified by assuming that Eve knows public key $\mathcal{P}$ hidden in the noise. Consequently, a simplified complexity $\mathcal{C}$ for Eve assumes that she can directly eliminate possibilities from $\mathcal{L}(m,n)$. (Although a simplified analysis demonstrates a vastly superior computational complexity achieved from the hiding procedures, Eve's elimination of elements in $\mathcal{L}_{m,n}$ is not expected to be effective against procedures 4, 3 and 5 because in each transmission a new nonce $\mathcal{N}$ randomly changes $\sigma$.)

Let S(k) be the kth transmission that hides public key $\mathcal{P}$. Let $m_0$ be the number of 0's in $\mathcal{P}$ that Eve knows. Let $m_1$ be the number of 1's in $\mathcal{P}$. Let $\eta_0$ be the number of 0's in S(k). Let $\eta_1$ be the number of 1's in S(k). $m=m_0+m_1$ and $n=\eta_0+\eta_1$. Then Eve reduces her simplified complexity C from $|\mathcal{L}(m,n)|$ to $$\frac{\eta_0!}{(\eta_0-m_0)!}\,\frac{\eta_1!}{(\eta_1-m_1)!}.$$

If $\eta_0+0$ or $\eta_1=0$, then $\mathcal{C}=|\mathcal{L}_{(m,n)}|$.

Consider an extreme outlier event: transmission S(k) contains 8192 zeroes, although in practice this will not happen. In this case, Eve knows Alice's public key, but Eve obtains no additional information about $\sigma$ and consequently none about $\pi$. Thus, $\mathcal{C}=|\mathcal{L}_{(m,n)}|$.

At the other extreme, assume that the 2i (even) bits in S(k) are 0 and the 2i−1 (odd) bits are 1, where $1\le i\le 4096$. Assume that all the bits in the public key $\mathcal{P}$ are 1, which minimizes Eve's complexity $\mathcal{C}$. When Eve knows $P=1^{255}$, this implies $$\mathcal{C}(\mathcal{P}=1^{255})=\frac{4096!}{3841!}.^{2}$$

Hence, even after Eve's overcomes the complexity of capturing symmetric cryptography key s and the 2 4096!/3841! is the number of possible ways to hide $\mathcal{P}=1^{255}$ in S(k).

search complexity of the private key space $S_{25519}$, the lower bound for Eve's complexity $\mathcal{C}$, to achieve a MITM, is still $$\frac{4096!}{3841!} > 10^{917}.$$

Overall, despite Eve using auxiliary information for n=8192, Eve's computational complexity to obtain $\pi$ substantially exceeds the conjectured computational complexity of the 25519 public key.

13 Relevance to Quantum Computing

Eve's goal of searching for bit locations of a hidden signal is related to Grover's goal of using a quantum computer to speed up database search. In [17], Grover states: "The problem is this: there is an unsorted database containing N items out of which just one item satisfies a given condition—that one item has to be retrieved. Once an item is examined it is possible to tell whether or not it satisfies the condition in one step. However, there does not exist any sorting on the database that would aid its selection. The most efficient classical algorithm for this is to examine the items in the database one by one. If an item satisfies the required condition stop; if it does not, keep track of this item so that it is not examined again."

One item in Grover's database corresponds to one scatter map in $\mathcal{L}_{m,n}$. That is, N database items correspond to $$\frac{n!}{(n-m)!}$$

scatter maps. Grover states that his algorithm has to tell whether a database item satisfies a condition. Section 10.9 observed that without auxiliary information Eve has no way of determining whether a sequence of bit locations is $\pi$. A quantum algorithm search requires auxiliary information so that it can test for a condition on each prospective scatter map.

Grover's algorithm has a quantum complexity of $O(\sqrt{N})$, when there are N items in the database. Classical Turing machine algorithms have a database search complexity of $$O\left(\frac{N}{2}\right).$$

Based on the correspondence between scatter map and database search, we propose: If Eve's quantum search algorithm has an adequate terminating condition that does not compromise the bit locations of the scatter map, then Eve's conjectured quantum complexity is $$O\left(\sqrt{\frac{n!}{(n-m)!}}\right).$$

If n=8192 and m=255, as in section 12, then Eve's conjectured quantum complexity is $$\sqrt{\frac{8192!}{(8192-255)!}} > 10^{498}.$$

14 Structural Stability

Structural stability is a mathematical and engineering tool that we want to apply to computer programs because a register machine program can be modeled as a discrete, autonomous dynamical system. When a perturbed instruction is close enough to an original instruction that is stable, then the computational behavior of the program will not change. For this reason, structural stability can be used as a mathematical tool to help design a solution that hinders malware sabotage. Overall, we briefly describe topological spaces, metric spaces and structural stability before we specify how to build a stable sequential machine.

14.1 Topological Spaces

A topology [32] on a set X is a collection $\mathcal{T}$ of subsets of X having the following properties: (a) $\theta$ and X are both in $\mathcal{T}$; (b) The union of the elements of any subcollection of $\mathcal{T}$ is in $\mathcal{T}$; (c) The intersection of the elements of any finite subcollection of $\mathcal{T}$ is in $\mathcal{T}$. A set X for which a topology $\mathcal{T}$ has been specified is called a topological space. A subset U of X is called open in this topology if U belongs to the collection $\mathcal{T}$.

Let $\mathbb{R}$ be the real numbers. For real numbers a and b, the open intervals $(a, b)=\{x \in \mathbb{R} : a<x<b\}$ form a basis for the standard topology on $\mathbb{R}$, generated from arbitrary unions of open intervals and finite intersections of open intervals.

Let X and Y be topological spaces. The function $f:X \to Y$ is continuous if for any open subset U of Y, the inverse image $f^{-1}(U)=\{x \in X: f(x) \text{ lies in } U\}$ is open in X's topology. The function $h:X \to Y$ is a homeomorphism if h is continuous, h is one-to-one and onto, and h's inverse $h^{-1}:Y \to X$ is continuous.

14.2 Topological Conjugacy

A discrete, dynamical system is a function $f:X \to X$, where X is a topological space. The orbit of p is $\{f^n(p): n \in \mathbb{N}\}$, which is the set of points, obtained by iterating f on initial point p. Consider discrete, dynamical systems $f:X \to X$ and $g:Y \to Y$. f and g are topologically conjugate if f and g are continuous functions and there exists a homeomorphism $h:X \to Y$ such that $h \circ f = g \circ h$. Topologically conjugate functions exhibit equivalent dynamics. For example, if f is topologically conjugate to g via h and p is a fixed point for f, then h(p) is a fixed point for g.

Topological conjugacy is a useful notion for computation because after a register machine has halted, its halted machine configuration represents what the machine has computed. Furthermore, each halted machine configuration corresponds to a fixed point (halting point) of a dynamical system that faithfully models the register machine. If h is a topological conjugacy with $h \circ f = g \circ h$, then p is a fixed point of f if and only if h(p) is a fixed point. Hence, a topological conjugacy between machines $M_1$ and $M_2$ induces a one-to-one correspondence between the halting configurations of $M_1$ and $M_2$.

14.3 Metric Spaces

A metric space is a set X and a function (metric) $d:X \times X \to \mathbb{R}$ (real numbers) such that the following three conditions hold.

1. $d(a, b) \geq 0$ for all $a, b \in X$ where equality holds if and only if a=b.
2. $d(a, b)=d(b, a)$ for all $a, b \in X$. (Symmetric).
3. $d(a, b) \leq d(a, c)+d(c, b)$ for all $a, b, c \in X$. (Triangle inequality).

For $\epsilon>0$, define the $\epsilon$-ball $B_d(x, \epsilon)=\{y \in X: d(x, y)<\epsilon\}$. The collection of all $\epsilon$-balls, where $\epsilon>0$ and $x \in X$, is a basis for a metric topology on X, induced by metric d.

14.4 $C^0$ Structural Stability

Let (X, d) be a metric space. The $C^0$ distance between functions $f:X \to X$ and $g:X \to X$ is given by $\rho_0(f,g)=\sup\{d(f(x), g(x)):x \in X\}$, where sup is the least upper bound. A function $f:X \to X$ is said to be $C^0$ structurally stable on X if there exists $\epsilon>0$ such that whenever $\rho_0(f, g)<\epsilon$ for $g:X \to X$, then f is topologically conjugate to g. In other words, a dynamical system f is structurally stable if for all dynamical systems g that are close to f, then f is topologically conjugate to g.

15 A Structurally Stable Machine

In our invention(s), we have two design criteria, developed in section 7:

A. Build instructions that are invariant to small changes in their representation.
B. Hinder the adversary from figuring out how to manipulate these machine instructions.

We start with a Turing complete, register machine, as a starting point for building computation that satisfies our two design criteria for our invention(s). We describe machine procedures that transform these register machine instructions: these transformation procedures, implemented in hardware, execute the functionality of the register machine instructions so that the computation is stable under small changes to the transformed instructions. In an embodiment, these procedures execute in Protected Machine Hardware 1502 of FIG. 15 (blue region). Furthermore, these transformed instructions also satisfy design criterion B.

15.1 A Register Machine

Below is a description of instructions for an embodiment of a register machine, executed by processor system 258 in FIG. 2B. In other embodiments, similar register machine instructions comprise a hardware computing machine. The transformation procedures (machine procedures) are provided in subsections 15.2, 16.1 and 16.3. In some embodiments, these procedures are implemented in Protected Machine Hardware 1502 in FIG. 15.

SET A 14 stores 14 in register A.

ADD B C adds the contents of registers B and C and stores the sum in register B.

SUB C 13 subtracts 13 from the contents of register C and stores the difference in register C.

MUL D C multiplies the contents of register D and register C and stores the product in register D.

DIV A 7 divides the contents of register A by 7 and stores the quotient in register A. If A contains 26, then after DIV A 7 is executed register A contains 3.

MOD A 7 divides the contents of register A by 7 and stores the remainder in A. If register A contains 26, then after MOD A 7 is executed register A contains 5.

JMP L_AB updates the program counter to execute the instruction tagged by label L_AB. If L_AB contains 37, then instruction 37 will be executed next. JMP acts as an unconditional branch instruction.

IF A B executes the next instruction if the contents of register A equals the contents of register B. Otherwise, the next instruction is skipped. IF is an embodiment of a conditional branch instruction.

IFN C 5 executes the next instruction if the contents of register C are not equal to 5. If register C contains 5, the next instruction is skipped. IFN is an embodiment of a conditional branch instruction.

IFGT C 12 executes the next instruction if the contents of register C are greater than 12. If register C contains a number less than 13, the next instruction is skipped. IFGT is an embodiment of a conditional branch instruction.

The opcode for instruction name SET represents SET in terms of bits. The other instruction names {ADD, SUB, MUL, DIV, MOD, JMP, IF, IFN, IFGT, STORE, GET} each have their own unique opcode in terms of bits. An opcode is mathematically defined as a function $\mathfrak{O}$: {SET, ADD, SUB, MUL, DIV, MOD, JMP, IF, IFN, IFGT, STORE, GET}→$\{0, 1\}^n$ such that $\mathfrak{O}$ is 1-to-1. One-to-one means $\mathfrak{O}$ maps two different instruction names to two distinct n-bit strings. A valid instruction starts with an instruction name, followed by one or two operands. In instruction IFGT C 12, register C is the first operand and the number 12 is the second operand. The JMP instruction is the only instruction with one operand.

Program 1 implements a greatest common divisor algorithm with these register machine instructions. In section 15.2, stable machine (SM) tools are described that transform these instructions so that the program instructions are hidden, stable and unpredictable. Any symbols on the same line of program 1, that follow a semicolon, are comments.

Program 1. Greatest Common Divisor

```
SET   A 105 ; Instruction 0
SET   B 21 ; Instruction 1
; IF (A == 0) execute instruction 3.
IF   A   0   ; Label:   IFAEQ0. Instruction 2
JMP   SET_AB ; Instruction 3. Jump to label SET_AB
; IF (B == 0) execute instruction 5.
IF   B   0   ; Instruction 4.
JMP   SET_BA ; Instruction 5. Jump to label SET_BA
; IF (A > B) execute instruction 7.
IFGT   A   B   ; Instruction 6.
SUB   A   B   ; Instruction 7. Store A-B in reg A
; IF (B > A) execute instruction 9.
IFGT   B   A   ; Instruction 8.
SUB   B   A   ; Instruction 9. Stores B-A in reg B
; IF (A != B) execute instruction 11.
IFN   A   B   ; Instruction 10.
JMP   IFAEQ0 ; Instruction 11. Jump to label IFAEQ0
SET   A   B   ; Label: SET_AB.   Instruction 12
SET   A   B   ; Label: SET_BA.   Instruction 13
```

15.2 Randomizing Instruction Opcodes

We describe a procedure that randomizes opcodes such that each opcode is a minimal Hamming distance apart. Our random opcode procedure is a computational tool for helping us achieve our two design criteria.

First, we review some definitions from information theory. $\{0, 1\}^n$ is the collection of all n-bit strings, where each binary string a in $\{0, 1\}^n$ can represent an opcode of a virtual machine instruction. Sometimes b in $\{0, 1\}^p$ can represent an operand of a virtual machine instruction, and in some cases n≠p.

Let $a=a_1, \ldots a_n$ and $b=b_1, \ldots b_n$ be binary strings of length n. For each n, the Hamming distance [79] (Hamming metric) is defined as $$d(a, b) = \sum_{i=1}^{n} |a_i - b_i|.$$

It is easy to verity that ($\{0, 1\}^n$, d) is a metric space per section 14.3.

Note that the Hamming distance between string 0010 and string 0111 is expressed as d(0010, 0111)=2. Consider string $c=c_1 \ldots c_n$ in $\{0, 1\}^n$. A Hamming ball $H(c, m)=\{a\in\{0, 1\}^n : d(c, a)\leq m\}$ has center c and radius m.

q is a non-deterministic generator, as shown in non-deterministic generator 942 of FIG. 9A, non-deterministic generator 952 of FIG. 9B, and non-deterministic generator 1504 of FIG. 15. In some embodiments, q measures quantum events and returns one or more bits, generated from photons in LED 946 of FIG. 9A; or photons in LED 956 of FIG. 9B; or photons from LED 1002 of FIG. 10; and further described in subsection 10.5. (The emission and absorption of photons are quantum events.) (Also, see subsection 10.5, FIG. 1B, FIG. 1D, FIG. 9A, FIG. 9B, FIG. 9C, FIG. 10 and FIG. 15.) When q is executed, it returns a 0 or a 1, based on a measurement of a non-deterministic process. In some embodiments, the measurement is a quantum measurement (the emission of photons in 1002 of FIG. 10, and the absorption of one or more photons with energy hu by phototransistor 944 in FIG. 9A, or the the absorption of one or more photons with energy hv by photodiode 954 in FIG. 9B.). In procedures 7, 8, and 9, we use q to help construct m distinct random opcodes each of length n that are pairwise a minimum Hamming distance of 2l+1 bits apart. These procedures build random opcodes that are stable, when there are at most I bits of sabotage on a single opcode. In other words, a random opcode $I_j$ is the center of a Hamming ball with radius l. In terms of geometry, all opcodes in $H(I_j, l)$ can still be resolved to the correct opcode $I_j$.

Machine procedure 7 builds an n-bit random opcode $I_{j,1}I_{j,2} \ldots I_{j,n}$ used by instruction $I_j$, after random bit generator q measures n random bits. In an embodiment, machine procedure 7 uses a non-deterministic generator q as shown in non-deterministic generator 942 of FIG. 9A, or non-deterministic generator 952 of FIG. 9B, or non-deterministic generator 1504 of FIG. 15. In some embodiments, q measures quantum events and returns one or more bits, generated from photons in LED 946 of FIG. 9A; or photons in LED 956 of FIG. 9B; or photons from LED 1002 of FIG. 10; and further described in subsection 10.5.

Machine Procedure 7. Random Opcode

```
Input: n
set k := 1
while k ≤ n
{
   set I_{j,k} to a random bit measured by q
   increment k by 1
}
Output: I_{j,1} I_{j,2} ... I_{j,n}
```

In an embodiment of machine procedure 7, FIG. 20 shows a random number generator (RNG) that creates the randomness used by machine procedure 7, and the RNG is referred to as q in machine procedure 7. In some embodiments, instead of a 3-bit counter, the counter is a 20-bit counter that stores the random bits $r_0$, $r_1$, $r_2$, $r_3$, $r_4$, $r_5$, $r_6$, and $r_7$, and in other embodiments a 96-bit counter can be used. In another embodiment of machine procedure 7, FIG. 21 shows a random number generator that creates the randomness used by machine procedure 7, and the RNG is referred to as q in machine procedure 7.

The jth random opcode, called $I_j$, is n bits long. Machine procedure 8 begins with a random opcodes $I_1, I_2, \ldots, I_m$ as input. Machine procedure 8 finds two distinct opcodes in $\{I_1, I_2, \ldots, I_m\}$ that are a smallest Hamming distance $h_\mu$ apart.

Machine Procedure 8. Minimal Hamming Pair

```
Input: m, n, and opcodes {I_1, I_2, ... , I_m}
set h_μ := n + 1
set i := 1
while i < m
{
   set j := i + 1
   while j ≤ m
   {
      set h := d(I_i,I_j) in {0,1}^n
      if (h < h_μ)
      {
         set h_μ := h
         set i_μ := i
         set j_μ = j
      }
      increment j by 1
   }
   increment i by 1
}
Output: I_{i_μ}, I_{j_μ}, h_μ
```

Machine procedure 9 uses machine procedures 7 and 8 to build m random opcodes (n-bit codes) that are pairwise at least a Hamming distance of 2l+1 apart.

In an embodiment of machine procedure 9, FIG. 20 shows a random number generator (RNG) that creates the randomness used by machine procedure 9, and the RNG is referred to as q in machine procedure 9. In some embodiments, instead of a 3-bit counter, the counter is a 20-bit counter that stores the random bits $r_0$, $r_1$, $r_2$, $r_3$, $r_4$, $r_5$, $r_6$, and $r_7$, and in other embodiments a 96-bit counter can be used. In another embodiment of machine procedure 9, FIG. 21 shows a random number generator that creates the randomness used by machine procedure 9, and the RNG is referred to as q in machine procedure 9.

Machine Procedure 9. Minimal Hamming Distance

```
Input: l, m, n
call procedure 1 m times with input n. output is I_1,...,I_m
call procedure 2 with input I_1,...,I_m. output is I_{i_μ}, I_{k_μ}, I_{h_μ}
set r := 0
while h_μ < (2l + 1)
{
  set b := 2l + 1 − h_μ
  do b times
  {
    use q to randomly choose positive integer k in the set {1,2,...n}
  flip bit k in I_{i_μ}
  }
  execute procedure 2 with input I_1,...,I_m
  increment r by 1
}
Output: I_1 I_2 ... I_n where d(I_j, I_k) ≥ 2l + 1 when j ≠ k
```

Flip bit k means: if the kth bit is 0, then set the kth bit to 1; and if the kth bit is 1, then set the kth bit to 0. Variable r counts the number of repairs on a random opcode until all random opcodes are at least a Hamming distance of 2l+1-bits apart. 2l+1 should be about 1 to 2.5 standard deviations less than $$\frac{n}{2}$$

so that the outer loop while $h_\mu<(2l+1)$ exits in a reasonable amount of time. ( $$\frac{n}{2}$$

is the expected Hamming distance between two random n-bit codes, where each bit (0 or 1) occurs with probability ½.)

If l is too large (e.g., (2l+1)>n), then the outer loop never exits and $r \to \infty$. To avoid long computing times, a variation of procedure 9 adds, before the outer loop, instruction set $$l = \left\lfloor \frac{1}{4}\left(n - c\sqrt{n}\right) - \frac{1}{2} \right\rfloor,$$

where $$1 \le c \le \frac{5}{2}.$$

(The standard deviation of uniformly random n-bit codes is $$\frac{\sqrt{n}}{2}.)$$

In our cryptographic model, Alice's m random opcodes $I_1$, $I_2$, . . . $I_m$ "act as her private keys." Hence, her random opcodes must be generated and stored in Protected Machine Hardware (blue region in FIG. 15) so that procedure 9 can help assure anonymity and valid execution of her instructions. It is also good practice for Alice to keep l private.

16 Instruction and Program Stability

This section defines and specifies instruction and opcode stability, used in our hardware embodiments of machine procedures, 1, 2, 3, 4, 5, 6, and 7, and implemented in FIG. 15.

Definition 8. A set of opcodes (or operands) $\{I_1, \ldots, I_m\}$ is s-bit stable if $\min\{d(I_j, I_k): j \neq k\} \geq s$. In other words, if $I_j$ and $I_k$ are the closest opcodes (operands) in $\{I_1, \ldots, I_m\}$, then $d(I_j, I_k) \geq s$.

Definition 9. An n-bit instruction I is s-bit stable if its opcode and operands are both s-bit stable.

Remark 4. The random opcodes generated by a successful exit of procedure 9 are 2l+1-bit stable.

Machine procedure 2 returns $h_\mu$. $h_\mu$ is the minimum distance between any two distinct opcodes in $\{I_1, \ldots, I_m\}$. A successful exit of machine procedure 9 means the loop while $h_\mu < (2l+1)$ exited; hence, $h_\mu \geq 2l+1$.

Using definitions 8, 9 and remark 4, we can explain the stability of programs, transformed by machine procedures 1, 2 and 3, in terms of the description in section 14. First, we need to define a metric on a space of programs, where each program is a finite sequence of transformed (procedures 1, 2 and 3) instructions (before hiding). Consider a program of transformed instructions $\mathcal{P}_1 = (I_1, I_2, \ldots, I_m)$ and another program of transformed instructions $\mathcal{P}_2 = (J_1, J_2, \ldots, J_m)$. If two programs have the same length m, define the distance between them as $\mathcal{D}(\mathcal{P}_1, \mathcal{P}_2) = \max\{d(I_k, J_k): 1 \leq k \leq m\}$. If programs $\mathcal{P}$ and $\mathcal{Q}$ have different lengths, then define $\mathcal{D}(\mathcal{P}, \mathcal{Q}) = n$, where all program instructions in $\mathcal{P}$ and $\mathcal{Q}$ lie in $\{0, 1\}^n$.

In program $\mathcal{P}_1 = (I_1, I_2, \ldots, I_m)$, for each k such that $1 \leq k \leq m$, machine procedure 9 can build each instruction $I_k$ so that $I_k$ is 2l+1-bit stable. Consider $\mathcal{P}_1$ as a dynamical system. Program $\mathcal{P}_1$ is structurally stable because whenever $\mathcal{D}(\mathcal{P}_1, \mathcal{P}_2) \leq l$ each instruction $J_k$ in $\mathcal{P}_2$ that corresponds to $I_k$ is resolved to the same opcode and same operand(s). Hence, the dynamical (computing) behavior of $\mathcal{P}_1$ is the same as program $\mathcal{P}_2$: this means programs $\mathcal{P}_1$ and $\mathcal{P}_2$ perform the same task. Structural stability helps protect the integrity of the computation.

16.1 Hiding Operands and Opcodes in Noise

In 15.2, we described machine procedures 7, 8, and 9 for building random opcodes stable to small changes. When machine procedures 7, 8, and 9 are also applied to operands, the representation of the operands can become stable to small changes. In our model, Eve is a sentient adversary, so structural stability from classical mathematics alone does not provide enough mathematical firepower to build malware resistant computation. Hence, the purpose of design criteria B is to make a representation of each instruction that is computationally intractable for Eve to understand its meaning.

Machine procedure 10 builds a random permutation.

Machine Procedure 10. Random Permutation ρ

```
Input : n
set ρ(1) := 1 set ρ(2) := 2 ... set ρ(n) := n
set k := n
while k ≥ 2
{
   use q to randomly choose positive integer r in the set {1,...,k}
   set t := ρ(r)
   set ρ(r) := ρ(k)
   set ρ(k) := t
   decrement k by 1
}
Output: Permutation ρ on {1,...,n}
```

In an embodiment of machine procedure 10, FIG. 20 shows a random number generator (RNG) that creates the randomness used by machine procedure 10, and referred to as q in machine procedure 10. In some embodiments, instead of a 3-bit counter, the counter is a 20-bit counter that stores the random bits $r_0$, $r_1$, $r_2$, $r_3$, $r_4$, $r_5$, $r_6$, and $r_7$, and in other embodiments a 96-bit counter can be used. In another embodiment of machine procedure 10, FIG. 21 shows a random number generator that creates the randomness used by machine procedure 10, and referred to as q in machine procedure 10.

Machine procedure 11 uses machine procedure 10 to build a random substitution box.

Machine Procedure 11. Random Substitution Box σ

Input: n call machine procedure 4 with input $n=2^n$ to create random permutation σ

Output: Substitution Box σ, where σ maps an n-bit input to an n-bit output.

The rest of this subsection describes how to hide the meaning of the opcodes and operands from Eve. Machine procedures 10 and 11 have different purposes even though they both generate a random permutation. Machine procedure 11 constructs a σ that has size $2^n$. In some embodiments, n=8 because 8 bits is a byte, and n=16 is more expensive to build in hardware. If n=16, then σ has size $2^{16}=65536$. Our goal is to store σ in protected machine hardware (FIG. 15) that is not accessible to Eve. If the operands in the base register machine have size equal to 64 bits before hiding in 64 bits of noise, then machine procedure 11 is called sixteen times to generate $\sigma_1 \sigma_2 \ldots \sigma_{16}$ for the first operand. For the second operand, machine procedure 11 is called sixteen more times to generate $\sigma_{17} \ldots \sigma_{32}$. In general, $\sigma_i$ and $\sigma_j$ are statistically independent when $i \neq j$, as result of using machine procedure 11.

Machine procedure 10 builds ρ to locate the 64 bits of the signal $b_1 b_2 \ldots b_{64}$ inside the random noise. ρ lies in the symmetric group on $\{1, 2, \ldots, n\}$, and determines where each bit of the signal (i.e., opcode or operand) is located: the ith bit $b_i$ is stored at bit location ρ(i), where $1 \leq i \leq 64$. When there are 64 bits of signal from the operand or opcode and 64 bits of quantum random noise, then the size of ρ is 128, i.e., n=128.

Random noise is measured and stored in the remaining 64 bit locations. The result is 128 bits of noise and signal, named $s_1 \ldots s_{128}$. Subsequently, the 16 randomly generated sboxes $\sigma_i$ with $1 \leq i \leq 16$ are applied to $s_1 s_2 \ldots s_{128}$ as follows: $\sigma_1(s_1 s_2 s_3 s_4 s_5 s_6 s_7 s_8)$, $\sigma_2(s_9 \ldots s_{16})$, . . . $\sigma_{16}(s_{121} s_{122} s_{123} s_{124} s_{125} s_{126} s_{127} s_{128})$, which is named $c_1 c_2 \ldots c_{128}$. Next, a distinct random permutation r is generated on $\{1, 2, \ldots, 128\}$. r is applied to $c_1 c_2 \ldots c_{128}$, resulting in $c_{r(1)} c_{r(2)} \ldots c_{r(128)}$. Then sixteen distinct sboxes $a_1 \ldots a_{16}$ are randomly generated and applied to $c_{r(1)}c_{r(2)} \ldots c_{r(128)}$ as follows: $a_1(c_{r(1)}c_{r(2)} \ldots c_{r(8)}) \ldots a_{16}(c_{r(121)} \ldots c_{r(128)})$, resulting in $o_1 \ldots o_{128}$.

In subsection 17, a birthday paradox statistical test is described in order to address potential attacks that involve stable instructions of size 128 bits. The birthday attack test performs $2^l$ compilations of the same unmasked instruction. In 17, we also describe a statistical test to address multiple transformations via machine procedure 12 of the same instruction at different locations in a single SM compilation of the program.

For each time the SM compilation tool is executed, all ρ, $\sigma_i$, r, $a_i$ and randomized opcodes are statistically independent from each other and from all previous compilations. Also, within one SM compilation, the random noise (n−k bits per opcode) generated for two identical opcodes at different locations in the program is statistically independent.

From our prior description, machine procedure 12 formally specifies hiding a k-bit opcode (or operand) $b_1 \ldots b_k$ in n−k bits of random noise. ρ and r are distinct random permutations on {1, 2, . . . , n}. ρ determines the bit locations of $b_1 \ldots b_k$ hidden inside of noise. $\sigma_1 \ldots \sigma_p$ and $a_1 \ldots a_p$ are random sboxes. In some embodiments, machine procedure 12 executes in protected machine hardware 1502 in FIG. 15. In some embodiments, the hiding of opcode bits $b_1 \ldots b_k$ at bit locations $l_{\rho(1)} \ldots l_{\rho(k)}$ is executed in hiding machine 190 in FIG. 1F.

Machine Procedure 12. Hide in Noise

```
Input: k, n and k-bit string b1 b2 ... bk
call procedure 4 with input n to build random permutation ρ on {1,2,...,n}
call procedure 1 with input n and store noise in every bit location l1 l2 ... ln
set j := 1
while j ≤ k
{
   set bit location lρ(j) := bj
   increment j by 1
}
call procedure 5 p times on input η and generate substitution boxes σ1...σp
apply substitution boxes σ1...σp to input l1 l2 ... ln and compute c1 c2 ... cn
call procedure 4 with input n to build random permutation τ on {1,2,...,n}
permute c1 ... cn to cτ(1) ... cτ(n)
call procedure 5 p times on input η and generate substitution boxes α1...αp
apply α1...αp to input cτ(1) ... cτ(n)
Output: o1 o2 ... on
```

In machine procedure 12, FIG. 11 shows an embodiment of hiding bits with a permutation (secret map) performed in the loop

```
while j ≤ k
{
   set bit location lρ(j) := bj
   increment j by 1
}
```

In an embodiment, permutation ρ is implemented with a Butterfly network in hardware. (A Butterfly network is shown in FIG. 18.)

16.2 Hiding Instruction Order

Machine procedure 13 hides the hidden stable instructions, constructed by machine procedure 12, inside a block of size b containing dummy instructions. b is the sum of the number of stable instructions and the number of dummy instructions in the block. m is the maximum number of stable instructions hidden. γ is a random permutation on {1, 2, . . . ,b}. $S_1, S_2, \ldots, S_m$ are a sequence of stable instructions that are part of the program.

Machine Procedure 13. Hide Stable Instructions in Block

```
Input: b, m, γ, and S1, S2, . . . and Sm
use q to randomly choose a positive
integer c in the set {1, 2, ... , ⌊b/2⌋}
set i := 1 set j := 1 set k := 1
while i ≤ b
{
 use q to randomly choose a positive
 integer r in the set {1, 2, . . . , b}
 if ( (r ≤ c) and (j < m) )
 {
  hide instruction Sj at location γ(i)
  increment j by 1
 }
 else
 {
  randomly build dummy instruction Dk
  hide instruction Dk at location γ(i)
  increment k by 1
 }
 increment i by 1
}
```

FIG. 17 shows a representation of the stable hidden instructions permuted in the block with dummy instructions after machine procedure 13 is completed. Because c is randomly selected $$\left\{1, \ldots \left\lfloor \frac{b}{2} \right\rfloor\right\},$$

and m is determined during compilation and m can be randomly selected for each block, Eve does not know how many valid instructions are in a block. Eve does not know the probability distribution of valid versus dummy instructions in a block; and Eve does not know the block size. Eve does not know γ, and she does not know how to distinguish a dummy opcode from a valid opcode, since the dummy opcodes are also selected using machine procedure 7.

In our cryptographic model, Alice's Protected Machine Hardware (FIG. 15) should execute the operations in machine procedures 12 and 13 because the sboxes $\sigma_1 \ldots \sigma_p$ and $a_1 \ldots a_p$ and permutations ρ, r, γ "act as Alice's private keys."

16.3 Executing Stable, Hidden Instructions

After reading one or more hidden machine instructions from memory system 198 in FIG. 1F (Unprotected Memory 1520 in FIG. 15), there are three steps to executing a stable, hidden instruction in Protected Memory Hardware 1502 in FIG. 15.

[1.] Unmask and find the nearest valid opcode.

[2.] Extract the operands from the noise.

[3.] Execute a valid instruction.

In our cryptographic model, our hardware embodiments execute all three steps in the blue region of Protected Machine Hardware, shown in FIG. 15. Our model assumes Eve does not have access to the internal physical operations in the blue region during the execution of these three steps.

With our model assumption about Eve, we proceed to examine steps 1, 2, and 3 in more detail. We developed a machine (compilation tool), called SM (stable machine), in ANSI C [43] that performs these 3 steps. In general, our SM tool can execute any hidden program that operates according to the register machine instructions, described in section 15.1. After a brief summary of steps 1, 2, and 3, we demonstrate an example of our SM tool, executing our greatest common divisor program with hidden, stable register machine instructions.

We assume that our cryptographically stable instructions are stored in Unprotected Memory, as shown in in FIG. 15. After the hidden instructions are retrieved by the Protected Machine Hardware from Unprotected Memory (FIG. 15), they are unmasked and executed in the Protected Machine Hardware. In step 1, the first argument of the instruction is a noisy opcode. Our SM tool finds the nearest valid opcode to the noisy opcode, by computing the Hamming distance between the noisy opcode and valid opcodes. In step 2, the operands are extracted from the noise by executing a procedure that performs the inverse of machine procedure 12. In step 3, a valid opcode executes with unmasked operands as input in the Protected Machine Hardware (FIG. 15).

Example 2. Initial GCD Program

| | | |
|---|---|---|
| SET | A | 6 |
| SET | B | 10 |
| IF | A | 0; Instruction 2 |
| JMP | 12 | |
| IF | B | 0 |
| JMP | 13 | |
| IFGT | A | B |
| SUB | A | B |
| IFGT | B | A |
| SUB | B | A |
| IFN | A | B |
| JMP | 2 | |
| SET | A | B; Instruction 12 |
| SET | B | A; Instruction 13 |

Example 3. GCD Instructions Executed

| | | |
|---|---|---|
| SET | A | 6 |
| SET | B | 10 |
| IF | A | 0 |
| IF | B | 0 |
| IFGT | A | B |
| IFGT | B | A |
| SUB | B | A |
| IFN | A | B |
| JMP | 2 | |
| IF | A | 0 |
| IF | B | 0 |
| IFGT | A | B |
| SUB | A | B |
| IFGT | B | A |
| SUB | B | A |
| IFN | A | B |
| SET | A | B |
| SET | B | A |

After the last instruction SET B A executes, both registers A and B are storing 2. Observe that the instruction numbers in an SM program always start at 0, so JMP 2 causes the machine to execute IF A 0.

Next, we show what our GCD program looks like to Eve in Unprotected Memory after two distinct compilations, generated by our SM tool. In compilations 1 and 2, we selected input n=64 for machine procedure 7, and inputs l=25, m=12, and n=64 for machine procedure 9. In compilation 1 and 2, we selected input n=128 for machine procedure 10; input n=8 for machine procedure 11; and inputs k=64 and n=128 for machine procedure 12. This means the first and the second operands are hidden in 128 bits: 64 bits of signal and 64 bits of noise.

In compilation 1, the unmasked instruction IF A 0 is represented by the stable, hidden instruction:

0x88dc21590a7a2106 0xb702d0d37001774f 0xc92f38e3d0055f3b 0x474bae9b755073f2 0xd4c61a40b2933bd

| Compilation 1: | | | | |
|---|---|---|---|---|
| Oxe26e1277d3a579bf | 0x39f2c953e7046f23 | 0x98be08f00998941 | 0x43fdaf6de036e294 | 0x67aea194b64513fe |
| 0x99a72e62201e3930 | 0x17739ec80b9eca31 | 0x9909893bf8361315 | 0x13ba2ba4b91a8c32 | 0xf22ebbf9b308fc15 |
| 0x88dc21590a7a2106 | 0xb702d0d37001774f | 0xc92f38e3d0055f3b | 0x474bae9b755073f2 | 0xd4c61a40b2933bd |
| 0x5e18ef161ee7b6a1 | 0x57d0443843e44fb7 | 0x19511ec8dbdcb1d8 | 0xa96c37607d2d54a3 | 0x4754834b30b5ebd3 |
| 0x328f4d59c5bc31ba | 0xc3b79648c89fbab5 | 0x93670351407ff7da | 0x6d91250b3c5492c0 | 0x28ca0548b0892232 |
| 0x170d5421a528b9fe | 0x63152d2897cbfaeb | 0x12d446c4f2e2eb36 | 0x2be42c77940ff112 | 0xe935c7e895750c32 |
| 0x11f70d8b87bda89e | 0x8f52c7c33f6d6e23 | 0xcac54aacb33c81fe | 0x6dfaa5ee1ceb6e57 | 0x249c758581e55115 |
| 0x29fac76896d16583 | 0xa776d331880d488d | 0x9b20648d5a55711a | 0xcd282b7a697566e4 | 0xd048bb5c90896ad7 |
| 0xa19a68022297dcc9 | 0xd1e281f01fe3d73b | 0x1962c31f19c647da | 0xdd0eb640c836d290 | 0xa631af048aa87dd2 |
| 0xad8c0d5addb3ac26 | 0x594589c2080ba731 | 0x991e71dfcb6a3360 | 0xa97b76658999020 | 0x2ea6adc802f1d9ba |
| 0x4e323afe9b11f7a3 | 0xad00dbd9f46c3c19 | 0x1ab800875b1dcf61 | 0x548026ce0d6467c5 | 0xea28b11c25e19c1b |
| 0x885bebd8378c52b5 | 0x879486810db85603 | 0x8112fa92b87223e4 | 0x322f3ae8b4875f31 | 0x46a44b55b4c812f8 |
| 0xdd0bd362231e62b0 | 0xab36f2blaecd0883 | 0xc822f0cc1804314a | 0xb903bc5dd8fc6df5 | 0x68de174ab9456e7b |
| 0x3044a9d581272696 | 0x49578a0ad2eabf67 | 0x99a1855b932be1c6 | 0xbf1ebdf7bc36d313 | 0xb1c5ab7d12e09813 |

| Compilation 2: | | | | |
|---|---|---|---|---|
| 0xaeb9650c9511ba48 | 0xc29254e9980e2b00 | 0x9f16b4db47ba5e2 | 0x70928619e93a2c95 | 0x6127f139c6ab535f |
| Oxeb4765feab231d6c | 0xfe0c045818dacaaf | 0x46f8cc6b805e600a | 0x5c05485d970005fa | 0xef36b6725a8f74ea |
| 0x4bcb256be98d9202 | 0xcde07c9d5cc3f829 | 0x3312667ff99273d2 | 0x714e581cb4683b7a | 0x6e9701310cd75a60 |
| Oxde4d701ca3edd55c | 0xe682cee565c93be | 0xbac932365f9230af | 0x5277aadccab828be | 0xb486fd304bbd28ac |
| 0x967b02174ed59218 | 0xa46e5c29dd8e9aa3 | 0x6e2ea2ef283666ca | 0xd6c420d9b32e0e2d | 0x807e3da180ff51a4 |
| 0x97a70942a3cbc84f | 0xe95a7e1bb96c1a90 | 0xafadb586a156f018 | 0x766fe6187bb03882 | 0x8644d7b0e59704c2 |
| 0x3f4134abaa27c677 | 0xf7b54ecb5696b30c | 0xf44bf817201b738a | 0xf386162c8db93dc2 | 0x97a1be2a1b89d925 |
| Oxaca7f8d19c1a4430 | 0xb9cf5ede087e7b22 | 0x7c7bd1a35d9e3cce | 0x5cb5f49dd0f918ae | 0x64f29db878891d2b |
| 0x28e251135cb6c663 | 0x835b0f6ef79bca82 | 0x5cd447bddbf7988 | 0xe67d76cc506f8850 | 0xe57ccc3231efb080 |
| 0xac99730209c26197 | 0xd175452d458a28a0 | 0x5bbb34fdd03f34b6 | 0xfccc9c68a5a6b997 | 0xa7259a332097a2ed |
| 0xe0db8bb402bf9b1f | 0x8ff607ed92ebc08d | 0x92b52b7d38f2ef42 | 0xf1b5ce28eabdb870 | 0xe451d3a900d115c1 |

-continued

| Compilation 2: | | | | |
|---|---|---|---|---|
| 0x4705fe80a3b083e5 | 0x2f116f0f6d83aa98 | 0x3de539330037e7ab | 0xd564e62dad318893 | 0x90669bf820dd072a |
| 0x35ccbd0c2467069b | 0xd08327a94103e028 | 0x19bcdc19c97ae230 | 0x6a871a4cc963b8ac | 0xe0e906f3b593596b |
| 0x6bbb657ec2807354 | 0x9928555a8ffbc18f | 0x6c9965b1a09221c2 | 0x4d66041d7e35a83b | 0x9a16a8204ddbdc4c |

In compilation 2, the unmasked instruction IF A 0 is represented by the stable, hidden instruction: 0x4bcb256be98d9202 0xcde07c9d5cc3f829 0x3312667ff99273d2 0x714e581cb4683b7a 0x6e9701310cd75a60

The first part 0x4bcb256be98d9202 (64 bits) hides the opcode IF: the second and third blocks 0xcde07c9d5cc3f829 0x3312667ff99273d2 (64 bits each) hide the first operand A; the fourth and fifth blocks 0x714e581cb4683b7a 0x6e9701310cd75a60 hide the second operand 0.

As an example of the effectiveness of our hiding procedures, the Hamming distance between the 64-bit. hidden opcode 0xe26e1277a3a579bf in compilation 1, representing SET in unmasked instruction SET A 6, and the 64-bit hidden opcode 0xaeb9650c9511ba48 in compilation 2, also representing SET, is 39. The expected Hamming distance for two hidden opcodes that are statistically independent is 32. The standard deviation is $\sqrt{64}/2$, so 39 is less than two standard deviations away from the expected Hamming distance.

The hiding is also effective for two of the same unmasked opcodes in the same compilation: in compilation 1, the Hamming distance d(0xe26e1277d3a579bf, 0x99a72e62201e3930)=35, where 0xe26e1277d3a579bf represents SET in SET A 6, and 0x99a72e62201e3930 represents SET in SET B 10.

17 Statistical Testing for Two Attacks

The first test searches for a birthday paradox attack with distinct SM compilations of a fixed 64-bit random opcode in the unmasked instruction SET A 6.

We used n=64 for procedure 7 to generate the random opcode for SET, and inputs l=12, m=12, and n=64 for procedure 9. We used input n=128 for procedure 10; and input n=8 for procedure 11; and inputs k=64 and n=128 for procedure 12. We searched for collisions, where 75% of the bits match: that is, where the Hamming distance was greater than 96 for two opcode portions of the instruction SET A 6.

The statistics for 44850 Birthday paradox collision search comparisons are shown below, where each tally is the hamming distance between two 128-bit hidden opcodes, generated from instruction SET A 6. Let hi be the number of pairs of distinct stable instructions whose 128 bits of opcode are a Hamming distance of i bits apart. Between the two dashed lines is the data for a typical run with 300 stable instructions generated from SET A 6.

TOTAL number of Hamming distances $h_i$ computed=44850.

$h_{40}$=1. $h_{41}$=1. $h_{42}$=0. $h_{43}$=2. $h_{44}$=4. $h_{45}$=6. $h_{46}$=14. $h_{47}$=33. $h_{48}$=64. $h_{49}$=87. $h_{50}$=150. $h_{51}$=237. $h_{52}$=328. $h_{53}$=460. $h_{54}$=667. $h_{55}$=902. $h_{56}$=1114. $h_{57}$=1451. $h_{58}$=1809. $h_{59}$=2142. $h_{60}$=2516. $h_{61}$=2795. $h_{62}$=2927. $h_{63}$=3068. $h_{64}$=3157. $h_{65}$=3184. $h_{66}$=2929. $h_{67}$=2729. $h_{68}$=2492. $h_{69}$=2100. $h_{70}$=1809. $h_{71}$=1522. $h_{72}$=1115. $h_{73}$=929. $h_{74}$=676. $h_{75}$=480. $h_{76}$=361. $h_{77}$=219. $h_{78}$=145. $h_{79}$=93. $h_{80}$=57. $h_{81}$=38. $h_{82}$=18. $h_{83}$=12. $h_{84}$=1. $h_{85}$=6. When i>85, $h_i$=0.

Empirical mean=64.02. $\mu$=64. Expected standard deviation $\sigma$=5.66. 30039 $h_i$ are within $\sigma$ of $\mu$. Expected $h_i$ within $\sigma$=30615. 42973 $h_i$ are within $2\sigma$ of $\mu$. Expected $h_i$ within $2\sigma$=42805. 44714 $h_i$ are within 30 of $\mu$. Expected $h_i$ within $3\sigma$=44733.

No Hamming distances were close to 96 (75% of 128).

In test 2, we searched for an attack by looking at multiple compilations of the same instruction at different locations in a single SM compilation of the program. To simplify this search and make an attack easier to find, we built a program with 150 identical instructions: SET A 6. After one compilation, we computed pairwise Hamming distances. Statistics for a typical run of test 2 are shown below between the two dashed lines.

TOTAL number of Hamming distances $h_i$ computed=11175. $h_{43}$=4. $h_{44}$=2. $h_{45}$=3. $h_{46}$=4. $h_{47}$=7. $h_{48}$=15. $h_{49}$=30. $h_{50}$=43. $h_{51}$=43. $h_{52}$=75. $h_{53}$=122. $h_{54}$=167. $h_{55}$=237. $h_{56}$=309. $h_{57}$=389. $h_{58}$=467. $h_{59}$=520. $h_{60}$=648. $h_{61}$=67. $h_{62}$=701. $h_{63}$=753. $h_{64}$=867. $h_{65}$=782. $h_{66}$=697. $h_{67}$=670. $h_{68}$=655. $h_{69}$=535. $h_{70}$=437. $h_{71}$=345. $h_{72}$=259. $h_{73}$=223. $h_{74}$=168. $h_{75}$=117. $h_{76}$=82. $h_{77}$=46. $h_{78}$=37. $h_{79}$=23. $h_{80}$=10. $h_{81}$=7. $h_{82}$=6. $h_{83}$=1. $h_{84}$=1. $h_{85}$=1. When i>85, $h_i$=0.

Empirical mean=63.90. $\mu$=64. Expected standard deviation $\sigma$=5.66 7495 $h_i$ are within $\sigma$ of $\mu$. Expected $h_i$ within $\sigma$=7628. 10735 $h_i$ are within $2\sigma$ of $\mu$. Expected $h_i$ within $2\sigma$=10665. 11139 $h_i$ are within $3\sigma$ of $\mu$. Expected $h_i$ within $3\sigma$=11146.

No Hamming distances were close to 96; the statistics follow a binomial distribution with p=½. In general, we do not expect this attack to be effective for Eve because Alice should not voluntarily compile her plaintext code with static "keys" on plaintext code that repeats the same instruction multiple times on purpose. Furthermore, Eve's potential collisions occur only on "keys" that Eve artificially constructs with the SM tool. In a proper use setting, Alice uses a different set of "keys" and randomized opcodes on each separate compilation on a particular machine, and procedure 13 further reduces the efficacy of this type of attack.

Although the invention(s) have been described with reference to specific embodiments, it will be under-stood by those skilled in the art that various changes may be made and equivalents may be substituted for elements thereof without departing from the true spirit and scope of the invention. In addition, modifications may be made without departing from the essential teachings of the invention.

REFERENCES

[1] Wikipedia. Transmission Control Protocol/Internet Protocol.

[2] Claude Shannon. Communication Theory of Secrecy Systems. 1949.

[3] Charles H. Bennett and Gilles Brassard. Quantum cryptography: Public key distribution and coin tossing. In Proceedings of IEEE International Conference on Computers, Systems and Signal Processing. 175, 175-179. New York, 1984.

[4] Charles H. Bennett, François Bessette, Gilles Brassard, Louis Salvail and John Smolin. Experimental Quantum Cryptography. Journal of Cryptology. 5, No. 1, 3-28, 1992.
[5] P. D. Townsend, J. G. Rarity and P. R. Tapster. Single photon interference in a 10 km long optical fibre interferometer. Electronic Letters. 29, No. 7, 634-635, April 1993.
[6] P. D. Townsend, J. G. Rarity and P. R. Tapster. Enhanced single photon fringe visibility in a 10 km long prototype quantum cryptography channel. Electronic Letters. 29, No. 14, 1291-1293 July 1993.
[7] Nwokedi Idika and Aditya P. Mathur. "A Survey of Malware Detection Techniques." Technical Report. Dept. of Computer Science. Purdue Univ., February 2007.
[8] Andreas Moser, Chris Kruegel and Engin Kirda. "Limits of Static Analysis for Malware Detection." IEEE. 23rd Annual Computer Security Applications Conf., 2007.
[9] Diego Zamboni (editor). Proc. of the 5th Intl. Conf. on Detection of Intrusions and Malware LNCS. Springer. July 2008.
[10] John Mitchell and Elizabeth Stillson. Detection of Malicious Programs. U.S. Pat. No. 7,870,610, 2011.
[11] Fred Cohen. "Computer Viruses Theory and Experiments. Computers and Security." 6 (1) 22-35, February 1987.
[12] Stephen Cook. The P versus NP Problem. Clay Math Institute, 2013.
[13] Eric Filiol. "Malicious Cryptology and Mathematics." Cryptography and Security in Computing. Ch. 2. Intech. Mar. 7, 2012.
[14] Eric Filiol. Computer Viruses: From Theory to Applications. Springer, 2005.
[15] Steven Foster. (2024) "How Much Does Fiber Optic Cable Cost Per Mile." Pulse Wires. May 21.
[16] S. Greengard. (2021) The Internet of Things. MIT Press.
[17] Lov K. Grover. (1996) "A fast quantum mechanical algorithm for database search." Proceedings STOC. 212-219.
[18] Werner Heisenberg. (1927) "Über den anschaulichen Inhalt der quantentheoretischen Kinematik und Mechanik." Zeitschrift für Physik. 43 (3-4), 172-198.
[19] Nitin Jain, et al. (2014) "Trojan-horse attacks threaten the security of practical quantum cryptography." New Journal of Physics. 16, 123030.
[20] D. Lowndes, et. al. (2021) "A low cost, short range quantum key distribution system." EPJ Quantum Technology. 8 (15), Springer, May 26.
[21] SujayKumar Reddy, Chandra Mohan. "Comprehensive Analysis of BB84, A Quantum Key Distribution Protocol." arXiv: 2312.05609v1. Dec. 9, 2023.
[22] P. D. Townsend, J. G. Rarity and P.R. Tapster. (1993) "Single photon interference in a 10 km long optical fibre interferometer." Electronic Letters. 29 (7), 634-635.
[23] P. D. Townsend, et. al. (1993) "Enhanced single photon fringe visibility in a 10 km long prototype quantum cryptography channel." Elec. Letters. 29 (14), 1291-1293.
[24] Cheryl Pellerin. DARPA Goal for Cybersecurity: Change the Game. American Forces Press, Dec. 20, 2010.
[25] Harold Abelson and Gerald J. Sussman with J. Sussman. Structure and Interpretation of Computer Programs. 2nd Edition, MIT Press, 1996.
[26] John Hennessy and David Patterson. Computer Architecture. 5th Edition, Morgan Kaufmann, 2012.
[27] Aleksandr Andronov and Lev Pontrjagin. "Systèmes Grossiers." Dokl. Akad. Nauk., SSSR, 14, 247-251, 1937.
[28] D. Anosov. "Geodesic flows on closed Riemannian manifolds of negative curvature." Proc. Steklov. Inst. Math. 90, 1967.
[29] Jacob Palis and Stephen Smale. "Structural Stability Theorems." Proc. Symp. Pure Math. AMS. 14, 223-232, 1970.
[30] Keonhee Lee and Kazuhiro Sakai. "Structural stability of vector fields with shadowing." Journal of Differential Equations. 232, 303-313, 2007.
[31] Clark Robinson. Dynamical Systems. Stability, Symbolic Dynamics and Chaos. CRC Press, 1996.
[32] James R. Munkres. Topology. Prentice-Hall, 1975.
[33] Leigh Van Valen. An Evolutionary Law. 1-30, 1973.
[34] Craig Gentry. A Fully Homomorphic Encryption Scheme. Ph.D. Thesis, Stanford University, 2009.
[35] Ilaria Chillotti, Nicolas Gama, Mariya Georgieva, and Malika Izabachene. TFHE: Fast Fully Homomorphic Encryption over the Torus.
[36] Ravital Solomon. An Intro to Fully Homomorphic Encryption for Engineers. Apr. 25, 2021. (https://ravital-.github.io)
[37] Gaurav S. Kc, et. al. "Countering Code-Injection Attacks With Instruction-Set Randomization." CCS 2003. ACM, Oct. 27-30, 2003.
[38] Andrew Yao. "Protocols for Secure Computations." 23rd Annual Symposium on Foundations of Computer Science. IEEE Computer Society, 160-164, 1982.
[39] David Evans, et. al. A Pragmatic Introduction to Secure Multi-Party Computation. NOW, 2021.
[40] Raul Rojas. "Conditional Branching is not Necessary for Universal Computation in von Neumann Computers." Journal of Universal Computer Science. 2, No. 11, 756-768, 1996.
[41] Karl S. Lashley. Studies of cerebral function in learning XII. Loss of the maze habit after occipital lesions in blind rats. Journal of Comparative Neurology. 79, Issue 3, 431-462, December 1943.
[42] Karl S. Lashley. In search of the engram. Society of Experimental Biology Symposium 4: Physiological Mechanisms in Animal Behavior, 454-482, Cambridge University Press, 1950.
[43] Brian Kernighan and Dennis Ritchie. The C Programming Language. 2nd Edition, Prentice Hall, 1988.
[44] Gilbert Vernam. Cipher printing telegraph systems for secret wire and radio telegraphic communications. J. Americ. Inst. Elect. Eng. 55, 109-15, 1926.
[45] Alan M. Turing. On computable numbers, with an application to the Entscheidungsproblem. Proc. London Math. Soc. Series 2 42 (Parts 3 and 4), 230-265, 1936. A correction, ibid. 43, 544-546, 1937.
[46] Simon Kochen and Ernst P. Specker. The Problem of Hidden Variables in Quantum Mechanics. Journal of Mathematics and Mechanics (now Indiana Univ. Math Journal) 17 No. 1, 59-87, 1967.
[47] John Conway and Simon Kochen. The Strong Free Will Theorem. Notices of the American Mathematical Society. 56 (2), 226-232, February 2009.
[48] NIST. Advanced Encryption Standard (AES), FIPS 197. November 2001.
[49] Ross Anderson, Eli Biham, Lars Knudsen. A Proposal for the Advanced Encryption Standard.
[50] R. L. Rivest, A. Shamir, and L. Adleman. A method for obtaining digital signatures and public-key cryptosystems. Communications of the ACM. 21, 120-126, 1978.
[51] Klint Finley. Chinese Supercomputer Is Still the World's Most Powerful. Wired Magazine. Nov. 18, 2013.

[52] A. F. Webster and S. E. Tavares. On the Design of S-Boxes. Advances in Cryptology. CRYPTO 85 Proceedings. LNCS 218. Springer, 523-534, 1986.
[53] NIST. FIPS-180-2: Secure Hash Standard, August 2002.
[54] Guido Bertoni, Joan Daemen, Michael Peeters, Gilles Van Assche. Keccak Reference 3.0 2011.
[55] Jean-Philippe Aumasson, Samuel Neves, Zooko Wilcox-O'Hearn, Christian Winnerlein. BLAKE.
[56] Praveen Gauravaram, Lars Knudsen, Krystian Matusiewicz, Florian Mendel, Christian Rechberger, Martin Schlaffer, and Soren S. Thomsen. GrØstl—a SHA-3 candidate.
[57] Hongjun Wu. The Hash Function JH. 2011.
[58] Niels Ferguson, Stefan Lucks, Bruce Schneier, Doug Whiting, Mihir Bellare, Tadayoshi Kohno, Jon Callas, Jesse Walker. The Skein Hash Function Family. 2010.
[59] Thomas Bayes. An essay towards solving a problem in the doctrine of chances. Philosophical Transactions of the Royal Society of London. 53, 370-418, 1764.
[60] William Feller. An Introduction to Probability Theory and Its Applications. Volume II. John Wiley. 1966.
[61] Harald Cramer. Mathematical Methods of Statistics. Princeton University Press. 1946.
[62] Abraham De Moivre. The Doctrine of Chances: or, A Method of Calculating the Probabilities of Events in play. 1st Edition London, 1718; 2nd edition 1738; 3rd edition 1756.
[63] Ralph C. Merkle. Secure Communications over Insecure Channels. Communications of the ACM. 21 (4), 294-299, April 1978.
[64] Whitfield Diffie and Martin Hellman. New directions in cryptography. IEEE Transactions on Information Theory 22, 644-654, 1976.
[65] Joseph H. Silverman and John Tate. Rational Points on Elliptic Curves. Springer-Verlag, 1992.
[66] Harold Edwards. A normal form for elliptic curves. Bulletin of the American Mathematical Society. 44:393-422, April 2007.
[67] Peter Montgomery. Speeding the Pollard and Elliptic Curve Methods of Factorization. Mathematics of Computation 48 (177): 243-264, 1987.
[68] A. J. Menezes, P. C. van Oorshot, and S. A. Vanstone. Handbook of Applied Cryptography. CRC Press, NY, 1997.
[69] P. C. van Oorschot and M. J. Wiener. On Diffie-Hellman Key Agreement with Short Exponents. Eurocrypt 1996, LNCS 1070, Springer, 332-343, 1996.
[70] A. C. Geary. Analysis of a Man-In-The-Middle-Attack on the Diffie-Hellman Key Exchange Protocol. NPS, 2009.
[71] Peter W. Shor. Algorithms for quantum computation: discrete log and factoring. In Proceedings of the 35th Annual IEEE Symposium on Foundations of Computer Science, pages 2-22, 1994.
[72] John Proos and Christof Zalka. Shor's discrete logarithm quantum algorithm for elliptic curves, 2003.
[73] Mihir Bellare, Ran Canetti and Hugo Krawczyk. Keying Hash Functions for Message Authentication. Advances in Cryptology—Crypto 96 Proceedings. LNCS 1109, N. Koblitz ed., Springer, 1996.
[74] Mark Wegman and J. Lawrence Carter. New Hash Functions and Their Use in Authentication and Set Equality. Journal of Computer and System Sciences. 22, 265-279, 1981.
[75] George Marsaglia. (1995) "The Marsaglia Diehard Battery of Tests of Randomness." Florida State Univ.
[76] R. G. Brown, D. Eddelbuettel, D. Bauer. (2015) "Dieharder: A Random Number Test Suite." Duke Univ.
[77] Serge Vaudenay. Secure Communications over Insecure Channels Based on Short Authenticated Strings. Advances in Cryptology-CRYPTO 2005. 309-326, 2005.
[78] Daniel Bernstein. Curve25519: new Diffie-Hellman speed records. Public Key Cryptography. LNCS 3958. New York, Springer. 207-228, 2006.
[79] Richard W. Hamming. "Error Detecting and Error Correcting Codes." The Bell System Technical Journal. 29 (2), 147-160, April 1950.
[80] Zhijie Jerry Shi and Ruby B. Lee. Implementation Complexity of Bit Permutation Instructions. Proceedings of the Asimolar Conference on Signals, Systems, and Computers. 879-886, 2003.

The invention claimed is:

1. A machine-implemented method comprising:

a first party executes a machine having a processor system and a memory system;

the processor system including one or more processors;

the first party generates a first map;

the first party generates random noise;

the first party generates a random nonce;

the first party derives a second map, based on the first map and the nonce;

the first party hides data inside the noise, based on the second map;

the first party hides the nonce at bit locations based on the first map;

a second party executes a machine having a processor system and a memory system;

the processor system including one or more processors;

the first party sends the hidden data and hidden nonce to the second party;

the second party extracts the hidden nonce with the first map;

the second party computes the second map, based on the hidden nonce and the first map;

and the second party extracts the hidden data, based on the second map.

2. The machine-implemented method of 1 further comprising:

the random noise is generated from an electronic circuit.

3. The machine-implemented method of 2 further comprising:

wherein the circuit has a light emitting diode.

4. The machine-implemented method of 2 further comprising:

the electronic circuit detects quantum events.

5. The machine-implemented method of 1 further comprising:

the bit locations of the nonce are distinct from the bit locations of the hidden data.

6. The machine-implemented method of 1 further comprising:

the hidden data consists of bits of one or more public keys.

7. The machine-implemented method of 6 further comprising:

wherein the one or more public keys are derived from at least some elliptic curve computations.

8. The machine-implemented method of 7 further comprising:

wherein the elliptic curve is a Montgomery curve over a finite field.

9. The machine-implemented method of 7 further comprising:

wherein the elliptic curve is an Edwards curve over a finite field.

10. The machine-implemented method of 1 further comprising:

the first party transmits the first map to a second party.

11. The machine-implemented method of 1 further comprising:

the first map is a permutation.

12. The machine-implemented method of 1 further comprising:

the second map is a permutation.

13. A machine-implemented method comprising:

a first party executes a machine having a processor system and a memory system;

the processor system including one or more processors;

the first party generates a first map;

the first party generates random noise;

the first party generates a random nonce;

the first party generates a second map, based on the first map and the nonce;

the first party hides a signal inside the noise, based on the second map;

the first party shares the first map with a second party;

the second party sends the nonce and hidden signal to the second party;

the second party generates the second map, based on the first map and the nonce;

and the second party extracts the hidden signal, based on the second map.

14. The machine-implemented method of 13 further comprising:

the noise and the nonce are generated by an electronic circuit;

the electronic circuit has one or more flip-flops and a light emitting diode;

the light emitting diode emits one or more photons to a photon detector;

the photon detector absorbs one or more photons;

and the photon detector is connected to one or more of the flip-flops.

15. The machine-implemented method of 14 further comprising:

wherein the one or more photons absorbed by the photon detector cause the state of one or more of the flip-flops to change.

16. The machine-implemented method of 14 further comprising:

wherein the one or more photons absorbed by the photon detector cause the voltage of one or more of the flip-flops to change.

17. The machine-implemented method of 15 further comprising:

some of the one or more flip-flops act as a counter.

18. The machine-implemented method of 14 further comprising:

wherein at least one of the flip-flops is a D flip-flop.

19. The machine-implemented method of 14 further comprising:

wherein at least one of the flip-flops is a T flip-flop.

20. The machine-implemented method of 19 further comprising:

wherein the circuit contains two or more T flip-flops;

wherein two or more of the T flip-flops make up a counter that stores one or more random bits.

* * * * *